(12) United States Patent
Landry et al.

(10) Patent No.: US 8,456,125 B2
(45) Date of Patent: Jun. 4, 2013

(54) DEBRIS SENSOR FOR CLEANING APPARATUS

(75) Inventors: Gregg W. Landry, Gloucester, MA (US); David A. Cohen, Brookline, MA (US); Daniel Ozick, Newton, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 13/326,997

(22) Filed: Dec. 15, 2011

(65) Prior Publication Data
US 2012/0085368 A1    Apr. 12, 2012

Related U.S. Application Data

(63) Continuation of application No. 12/255,393, filed on Oct. 21, 2008, which is a continuation of application No. 11/860,272, filed on Sep. 24, 2007, now Pat. No. 7,459,871, which is a continuation of application No. 11/533,294, filed on Sep. 19, 2006, now Pat. No. 7,288,912, which is a continuation of application No. 11/109,832, filed on Apr. 19, 2005, now abandoned, which is a continuation of application No. 10/766,303, filed on Jan. 28, 2004, now Pat. No. 6,956,348.

(51) Int. Cl.
*B64C 13/18* (2006.01)
*G05D 1/00* (2006.01)

(52) U.S. Cl.
USPC ........ 318/587; 318/568.12; 15/319; 700/245; 700/253

(58) Field of Classification Search
USPC ............... 318/587, 568.12; 700/23, 245, 259, 700/262, 253; 15/319.98, 319; 382/153
See application file for complete search history.

(56) References Cited

U.S. PATENT DOCUMENTS

| | | | |
|---|---|---|---|
| 1,755,054 A | 4/1930 | Darst | |
| 1,780,221 A | 11/1930 | Buchmann | |
| 1,970,302 A | 8/1934 | Gerhardt | |
| 2,136,324 A | 11/1938 | John | |
| 2,302,111 A | 11/1942 | Dow et al. | |
| 2,353,621 A | 7/1944 | Sav et al. | |
| 2,770,825 A | 11/1956 | Pullen | |
| 2,930,055 A | 3/1960 | Fallen et al. | |

(Continued)

FOREIGN PATENT DOCUMENTS

| | | | |
|---|---|---|---|
| AU | 2003275566 A1 | 6/2004 | |
| DE | 2128842 C3 | 12/1980 | |

(Continued)

OTHER PUBLICATIONS

Borges et al. "Optimal Mobile Robot Pose Estimation Using Geometrical Maps", IEEE Transactions on Robotics and Automation, vol. 18, No. 1, pp. 87-94, Feb. 2002.

(Continued)

*Primary Examiner* — Paul Ip
(74) *Attorney, Agent, or Firm* — Fish & Richardson P.C.

(57) ABSTRACT

A piezoelectric debris sensor and associated signal processor responsive to debris strikes enable an autonomous or non-autonomous cleaning device to detect the presence of debris and in response, to select a behavioral mode, operational condition or pattern of movement, such as spot coverage or the like. Multiple sensor channels (e.g., left and right) can be used to enable the detection or generation of differential left/right debris signals and thereby enable an autonomous device to steer in the direction of debris.

21 Claims, 10 Drawing Sheets

U.S. PATENT DOCUMENTS

| | | |
|---|---|---|
| 3,119,369 A | 1/1964 | Harland et al. |
| 3,166,138 A | 1/1965 | Dunn |
| 3,333,564 A | 8/1967 | Waters |
| 3,375,375 A | 3/1968 | Robert et al. |
| 3,381,652 A | 5/1968 | Schaeffer et al. |
| 3,457,575 A | 7/1969 | Bienek |
| 3,550,714 A | 12/1970 | Bellinger |
| 3,569,727 A | 3/1971 | Aggarwal et al. |
| 3,649,981 A | 3/1972 | Woodworth |
| 3,674,316 A | 7/1972 | De Brey |
| 3,678,882 A | 7/1972 | Kinsella |
| 3,690,559 A | 9/1972 | Rudloff |
| 3,744,586 A | 7/1973 | Leinauer |
| 3,756,667 A | 9/1973 | Bombardier et al. |
| 3,809,004 A | 5/1974 | Leonheart |
| 3,816,004 A | 6/1974 | Bignardi |
| 3,845,831 A | 11/1974 | James |
| RE28,268 E | 12/1974 | Autrand |
| 3,851,349 A | 12/1974 | Lowder |
| 3,853,086 A | 12/1974 | Asplund |
| 3,863,285 A | 2/1975 | Hukuba |
| 3,888,181 A | 6/1975 | Kups |
| 3,937,174 A | 2/1976 | Haaga |
| 3,952,361 A | 4/1976 | Wilkins |
| 3,989,311 A | 11/1976 | Debrey |
| 3,989,931 A | 11/1976 | Phillips |
| 4,004,313 A | 1/1977 | Capra |
| 4,012,681 A | 3/1977 | Finger et al. |
| 4,070,170 A | 1/1978 | Leinfelt |
| 4,099,284 A | 7/1978 | Shinozaki et al. |
| 4,119,900 A | 10/1978 | Kremnitz |
| 4,175,589 A | 11/1979 | Nakamura et al. |
| 4,175,892 A | 11/1979 | De Brey |
| 4,196,727 A | 4/1980 | Verkaart et al. |
| 4,198,727 A | 4/1980 | Farmer |
| 4,199,838 A | 4/1980 | Simonsson |
| 4,209,254 A | 6/1980 | Reymond et al. |
| D258,901 S | 4/1981 | Keyworth |
| 4,297,578 A | 10/1981 | Carter |
| 4,305,234 A | 12/1981 | Pichelman |
| 4,306,329 A | 12/1981 | Yokoi |
| 4,309,758 A | 1/1982 | Halsall et al. |
| 4,328,545 A | 5/1982 | Halsall et al. |
| 4,367,403 A | 1/1983 | Miller |
| 4,369,543 A | 1/1983 | Chen et al. |
| 4,401,909 A | 8/1983 | Gorsek |
| 4,416,033 A | 11/1983 | Specht |
| 4,445,245 A | 5/1984 | Lu |
| 4,465,370 A | 8/1984 | Yuasa et al. |
| 4,477,998 A | 10/1984 | You |
| 4,481,692 A | 11/1984 | Kurz |
| 4,482,960 A | 11/1984 | Pryor |
| 4,492,058 A | 1/1985 | Goldfarb et al. |
| 4,513,469 A | 4/1985 | Godfrey et al. |
| D278,732 S | 5/1985 | Ohkado |
| 4,518,437 A | 5/1985 | Sommer |
| 4,534,637 A | 8/1985 | Suzuki et al. |
| 4,556,313 A | 12/1985 | Miller et al. |
| 4,575,211 A | 3/1986 | Matsumura et al. |
| 4,580,311 A | 4/1986 | Kurz |
| 4,601,082 A | 7/1986 | Kurz |
| 4,618,213 A | 10/1986 | Chen |
| 4,620,285 A | 10/1986 | Perdue |
| 4,624,026 A | 11/1986 | Olson et al. |
| 4,626,995 A | 12/1986 | Lofgren et al. |
| 4,628,454 A | 12/1986 | Ito |
| 4,638,445 A | 1/1987 | Mattaboni |
| 4,644,156 A | 2/1987 | Takahashi et al. |
| 4,649,504 A | 3/1987 | Krouglicof et al. |
| 4,652,917 A | 3/1987 | Miller |
| 4,654,492 A | 3/1987 | Koerner et al. |
| 4,654,924 A | 4/1987 | Getz et al. |
| 4,660,969 A | 4/1987 | Sorimachi et al. |
| 4,662,854 A | 5/1987 | Fang |
| 4,674,048 A | 6/1987 | Okumura |
| 4,679,152 A | 7/1987 | Perdue |
| 4,680,827 A | 7/1987 | Hummel |
| 4,696,074 A | 9/1987 | Cavalli |
| D292,223 S | 10/1987 | Trumbull |
| 4,700,301 A | 10/1987 | Dyke |
| 4,700,427 A | 10/1987 | Knepper |
| 4,703,820 A | 11/1987 | Reinaud |
| 4,709,773 A | 12/1987 | Clement et al. |
| 4,710,020 A | 12/1987 | Maddox et al. |
| 4,712,740 A | 12/1987 | Duncan et al. |
| 4,716,621 A | 1/1988 | Zoni |
| 4,728,801 A | 3/1988 | O'Connor |
| 4,733,343 A | 3/1988 | Yoneda et al. |
| 4,733,430 A | 3/1988 | Westergren |
| 4,733,431 A | 3/1988 | Martin |
| 4,735,136 A | 4/1988 | Lee et al. |
| 4,735,138 A | 4/1988 | Gawler et al. |
| 4,748,336 A | 5/1988 | Fujie et al. |
| 4,748,833 A | 6/1988 | Nagasawa |
| 4,756,049 A | 7/1988 | Uehara |
| 4,767,213 A | 8/1988 | Hummel |
| 4,769,700 A | 9/1988 | Pryor |
| 4,777,416 A | 10/1988 | George et al. |
| D298,766 S | 11/1988 | Tanno et al. |
| 4,782,550 A | 11/1988 | Jacobs |
| 4,796,198 A | 1/1989 | Boultinghouse et al. |
| 4,806,751 A | 2/1989 | Abe et al. |
| 4,811,228 A | 3/1989 | Hyyppa |
| 4,813,906 A | 3/1989 | Matsuyama et al. |
| 4,815,157 A | 3/1989 | Tsuchiya |
| 4,817,000 A | 3/1989 | Eberhardt |
| 4,818,875 A | 4/1989 | Weiner |
| 4,829,442 A | 5/1989 | Kadonoff et al. |
| 4,829,626 A | 5/1989 | Harkonen et al. |
| 4,832,098 A | 5/1989 | Palinkas et al. |
| 4,851,661 A | 7/1989 | Everett |
| 4,854,000 A | 8/1989 | Takimoto |
| 4,854,006 A | 8/1989 | Nishimura et al. |
| 4,855,915 A | 8/1989 | Dallaire |
| 4,857,912 A | 8/1989 | Everett et al. |
| 4,858,132 A | 8/1989 | Holmquist |
| 4,867,570 A | 9/1989 | Sorimachi et al. |
| 4,880,474 A | 11/1989 | Koharagi et al. |
| 4,887,415 A | 12/1989 | Martin |
| 4,891,762 A | 1/1990 | Chotiros |
| 4,893,025 A | 1/1990 | Lee |
| 4,901,394 A | 2/1990 | Nakamura et al. |
| 4,905,151 A | 2/1990 | Weiman et al. |
| 4,909,972 A | 3/1990 | Britz |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,920,060 A | 4/1990 | Parrent et al. |
| 4,920,605 A | 5/1990 | Takashima |
| 4,933,864 A | 6/1990 | Evans et al. |
| 4,937,912 A | 7/1990 | Kurz |
| 4,953,253 A | 9/1990 | Fukuda et al. |
| 4,954,962 A | 9/1990 | Evans et al. |
| 4,955,714 A | 9/1990 | Stotler et al. |
| 4,956,891 A | 9/1990 | Wulff |
| 4,961,303 A | 10/1990 | McCarty et al. |
| 4,961,304 A | 10/1990 | Ovsborn et al. |
| 4,962,453 A | 10/1990 | Pong et al. |
| 4,967,862 A | 11/1990 | Pong et al. |
| 4,971,591 A | 11/1990 | Raviv et al. |
| 4,973,912 A | 11/1990 | Kaminski et al. |
| 4,974,283 A | 12/1990 | Holsten et al. |
| 4,977,618 A | 12/1990 | Allen |
| 4,977,639 A | 12/1990 | Takahashi et al. |
| 4,986,663 A | 1/1991 | Cecchi et al. |
| 5,001,635 A | 3/1991 | Yasutomi et al. |
| 5,002,145 A | 3/1991 | Wakaumi et al. |
| 5,012,886 A | 5/1991 | Jonas et al. |
| 5,018,240 A | 5/1991 | Holman |
| 5,020,186 A | 6/1991 | Lessig et al. |
| 5,022,812 A | 6/1991 | Coughlan et al. |
| 5,023,788 A | 6/1991 | Kitazume et al. |
| 5,024,529 A | 6/1991 | Svetkoff et al. |
| D318,500 S | 7/1991 | Malewicki et al. |
| 5,032,775 A | 7/1991 | Mizuno et al. |
| 5,033,151 A | 7/1991 | Kraft et al. |

| Patent No. | Date | Inventor |
|---|---|---|
| 5,033,291 A | 7/1991 | Podoloff et al. |
| 5,040,116 A | 8/1991 | Evans et al. |
| 5,045,769 A | 9/1991 | Everett |
| 5,049,802 A | 9/1991 | Mintus et al. |
| 5,051,906 A | 9/1991 | Evans et al. |
| 5,062,819 A | 11/1991 | Mallory |
| 5,070,567 A | 12/1991 | Holland |
| 5,084,934 A | 2/1992 | Lessig et al. |
| 5,086,535 A | 2/1992 | Grossmeyer et al. |
| 5,090,321 A | 2/1992 | Abouav |
| 5,093,955 A | 3/1992 | Blehert et al. |
| 5,094,311 A | 3/1992 | Akeel |
| 5,098,262 A | 3/1992 | Wecker et al. |
| 5,105,502 A | 4/1992 | Takashima |
| 5,105,550 A | 4/1992 | Shenoha |
| 5,109,566 A * | 5/1992 | Kobayashi et al. ............. 15/319 |
| 5,111,401 A | 5/1992 | Everett et al. |
| 5,115,538 A | 5/1992 | Cochran et al. |
| 5,127,128 A | 7/1992 | Lee |
| 5,136,675 A | 8/1992 | Hodson |
| 5,136,750 A | 8/1992 | Takashima et al. |
| 5,142,985 A | 9/1992 | Stearns et al. |
| 5,144,471 A | 9/1992 | Takanashi et al. |
| 5,144,714 A | 9/1992 | Mori et al. |
| 5,144,715 A | 9/1992 | Matsuyo et al. |
| 5,152,028 A | 10/1992 | Hirano |
| 5,152,202 A | 10/1992 | Strauss |
| 5,155,684 A | 10/1992 | Burke et al. |
| 5,163,202 A | 11/1992 | Kawakami et al. |
| 5,163,320 A | 11/1992 | Goshima et al. |
| 5,164,579 A | 11/1992 | Pryor et al. |
| 5,165,064 A | 11/1992 | Mattaboni |
| 5,170,352 A | 12/1992 | McTamaney et al. |
| 5,173,881 A | 12/1992 | Sindle |
| 5,182,833 A | 2/1993 | Yamaguchi et al. |
| 5,187,662 A | 2/1993 | Kamimura et al. |
| 5,202,742 A | 4/1993 | Frank et al. |
| 5,204,814 A | 4/1993 | Noonan et al. |
| 5,206,500 A | 4/1993 | Decker et al. |
| 5,208,521 A | 5/1993 | Aoyama |
| 5,216,777 A | 6/1993 | Moro et al. |
| 5,222,786 A | 6/1993 | Sovis et al. |
| 5,227,985 A | 7/1993 | DeMenthon |
| 5,233,682 A | 8/1993 | Abe et al. |
| 5,239,720 A | 8/1993 | Wood et al. |
| 5,251,358 A | 10/1993 | Moro et al. |
| 5,261,139 A | 11/1993 | Lewis |
| 5,276,618 A | 1/1994 | Everett |
| 5,276,939 A | 1/1994 | Uenishi |
| 5,277,064 A | 1/1994 | Knigga et al. |
| 5,279,672 A | 1/1994 | Betker et al. |
| 5,284,452 A | 2/1994 | Corona |
| 5,284,522 A | 2/1994 | Kobayashi et al. |
| 5,293,955 A | 3/1994 | Lee |
| D345,707 S | 4/1994 | Alister |
| 5,303,448 A | 4/1994 | Hennessey et al. |
| 5,307,273 A | 4/1994 | Oh et al. |
| 5,309,592 A | 5/1994 | Hiratsuka |
| 5,310,379 A | 5/1994 | Hippely et al. |
| 5,315,227 A | 5/1994 | Pierson et al. |
| 5,319,827 A | 6/1994 | Yang |
| 5,319,828 A | 6/1994 | Waldhauser et al. |
| 5,321,614 A | 6/1994 | Ashworth |
| 5,323,483 A | 6/1994 | Baeg |
| 5,324,948 A | 6/1994 | Dudar et al. |
| 5,331,713 A | 7/1994 | Tipton |
| 5,341,186 A | 8/1994 | Kato |
| 5,341,540 A | 8/1994 | Soupert et al. |
| 5,341,549 A | 8/1994 | Wirtz et al. |
| 5,345,649 A | 9/1994 | Whitlow |
| 5,352,901 A | 10/1994 | Poorman |
| 5,353,224 A | 10/1994 | Lee et al. |
| 5,363,305 A | 11/1994 | Cox et al. |
| 5,363,935 A | 11/1994 | Schempf et al. |
| 5,369,347 A | 11/1994 | Yoo |
| 5,369,838 A | 12/1994 | Wood et al. |
| 5,386,862 A | 2/1995 | Glover et al. |
| 5,399,951 A | 3/1995 | Lavallee et al. |
| 5,400,244 A | 3/1995 | Watanabe et al. |
| 5,404,612 A | 4/1995 | Ishikawa |
| 5,410,479 A | 4/1995 | Coker |
| 5,435,405 A | 7/1995 | Schempf et al. |
| 5,440,216 A | 8/1995 | Kim |
| 5,442,358 A | 8/1995 | Keeler et al. |
| 5,444,965 A | 8/1995 | Colens |
| 5,446,356 A | 8/1995 | Kim |
| 5,446,445 A | 8/1995 | Bloomfield et al. |
| 5,451,135 A | 9/1995 | Schempf et al. |
| 5,454,129 A | 10/1995 | Kell |
| 5,455,982 A | 10/1995 | Armstrong et al. |
| 5,465,525 A | 11/1995 | Mifune et al. |
| 5,465,619 A | 11/1995 | Sotack et al. |
| 5,467,273 A | 11/1995 | Faibish et al. |
| 5,471,560 A | 11/1995 | Allard et al. |
| 5,491,670 A | 2/1996 | Weber |
| 5,497,529 A | 3/1996 | Boesi |
| 5,498,948 A | 3/1996 | Bruni et al. |
| 5,502,638 A | 3/1996 | Takenaka |
| 5,505,072 A | 4/1996 | Oreper |
| 5,507,067 A | 4/1996 | Hoekstra et al. |
| 5,510,893 A | 4/1996 | Suzuki |
| 5,511,147 A | 4/1996 | Abdel |
| 5,515,572 A | 5/1996 | Hoekstra et al. |
| 5,534,762 A | 7/1996 | Kim |
| 5,535,476 A | 7/1996 | Kresse et al. |
| 5,537,017 A | 7/1996 | Feiten et al. |
| 5,537,711 A | 7/1996 | Tseng |
| 5,539,953 A | 7/1996 | Kurz |
| 5,542,146 A | 8/1996 | Hoekstra et al. |
| 5,542,148 A | 8/1996 | Young |
| 5,546,631 A | 8/1996 | Chambon |
| 5,548,511 A | 8/1996 | Bancroft |
| 5,551,119 A | 9/1996 | Worwag |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,608,306 A | 3/1997 | Rybeck et al. |
| 5,608,894 A | 3/1997 | Kawakami et al. |
| 5,608,944 A | 3/1997 | Gordon |
| 5,610,488 A | 3/1997 | Miyazawa |
| 5,611,106 A | 3/1997 | Wulff |
| 5,611,108 A | 3/1997 | Knowlton et al. |
| 5,613,261 A * | 3/1997 | Kawakami et al. ............... 15/98 |
| 5,613,269 A | 3/1997 | Miwa |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,636,402 A | 6/1997 | Kubo et al. |
| 5,642,299 A | 6/1997 | Hardin et al. |
| 5,646,494 A | 7/1997 | Han |
| 5,647,554 A | 7/1997 | Ikegami et al. |
| 5,650,702 A | 7/1997 | Azumi |
| 5,652,489 A | 7/1997 | Kawakami |
| 5,682,313 A | 10/1997 | Edlund et al. |
| 5,682,839 A | 11/1997 | Grimsley et al. |
| 5,696,675 A | 12/1997 | Nakamura et al. |
| 5,698,861 A | 12/1997 | Oh |
| 5,709,007 A | 1/1998 | Chiang |
| 5,710,506 A | 1/1998 | Broell et al. |
| 5,714,119 A | 2/1998 | Kawagoe et al. |
| 5,717,169 A | 2/1998 | Liang et al. |
| 5,717,484 A | 2/1998 | Hamaguchi et al. |
| 5,720,077 A | 2/1998 | Nakamura et al. |
| 5,722,109 A * | 3/1998 | Delmas et al. .................. 15/319 |
| 5,732,401 A | 3/1998 | Conway |
| 5,735,017 A | 4/1998 | Barnes et al. |
| 5,735,959 A | 4/1998 | Kubo et al. |
| 5,742,975 A | 4/1998 | Knowlton et al. |
| 5,745,235 A | 4/1998 | Vercammen et al. |
| 5,752,871 A | 5/1998 | Tsuzuki |
| 5,756,904 A | 5/1998 | Oreper et al. |
| 5,761,762 A | 6/1998 | Kubo |
| 5,764,888 A | 6/1998 | Bolan et al. |
| 5,767,437 A | 6/1998 | Rogers |

| | | | | | | |
|---|---|---|---|---|---|---|
| 5,767,960 | A | 6/1998 | Orman | 6,038,501 | A | 3/2000 | Kawakami |
| 5,777,596 | A | 7/1998 | Herbert | 6,040,669 | A | 3/2000 | Hog |
| 5,778,486 | A | 7/1998 | Kim | 6,041,471 | A | 3/2000 | Charky et al. |
| 5,781,697 | A | 7/1998 | Jeong | 6,041,472 | A | 3/2000 | Kasen et al. |
| 5,781,960 | A | 7/1998 | Kilstrom et al. | 6,046,800 | A | 4/2000 | Ohtomo et al. |
| 5,784,755 | A | 7/1998 | Karr et al. | 6,049,620 | A | 4/2000 | Dickinson et al. |
| 5,786,602 | A | 7/1998 | Pryor et al. | 6,050,648 | A | 4/2000 | Keleny |
| 5,787,545 | A | 8/1998 | Colens | 6,052,821 | A | 4/2000 | Chouly et al. |
| 5,793,900 | A | 8/1998 | Nourbakhsh et al. | 6,055,042 | A | 4/2000 | Sarangapani |
| 5,794,297 | A | 8/1998 | Muta | 6,055,702 | A | 5/2000 | Imamura et al. |
| 5,802,665 | A | 9/1998 | Knowlton et al. | 6,061,868 | A | 5/2000 | Moritsch et al. |
| 5,812,267 | A | 9/1998 | Everett et al. | 6,065,182 | A | 5/2000 | Wright et al. |
| 5,814,808 | A | 9/1998 | Takada et al. | 6,070,290 | A | 6/2000 | Schwarze et al. |
| 5,815,880 | A | 10/1998 | Nakanishi | 6,073,432 | A | 6/2000 | Schaedler |
| 5,815,884 | A | 10/1998 | Imamura et al. | 6,076,025 | A | 6/2000 | Ueno et al. |
| 5,819,008 | A | 10/1998 | Asama et al. | 6,076,026 | A | 6/2000 | Jambhekar et al. |
| 5,819,360 | A | 10/1998 | Fujii | 6,076,226 | A | 6/2000 | Reed |
| 5,819,936 | A | 10/1998 | Saveliev et al. | 6,076,227 | A | 6/2000 | Schallig et al. |
| 5,820,821 | A | 10/1998 | Kawagoe et al. | 6,081,257 | A | 6/2000 | Zeller |
| 5,821,730 | A | 10/1998 | Drapkin | 6,088,020 | A | 7/2000 | Mor |
| 5,825,981 | A | 10/1998 | Matsuda | 6,094,775 | A | 8/2000 | Behmer |
| 5,828,770 | A | 10/1998 | Leis et al. | 6,099,091 | A | 8/2000 | Campbell |
| 5,831,597 | A | 11/1998 | West et al. | 6,101,670 | A | 8/2000 | Song |
| 5,836,045 | A | 11/1998 | Anthony et al. | 6,101,671 | A | 8/2000 | Song |
| 5,839,156 | A | 11/1998 | Park et al. | 6,108,031 | A | 8/2000 | King et al. |
| 5,839,532 | A | 11/1998 | Yoshiji et al. | 6,108,067 | A | 8/2000 | Okamoto |
| 5,841,259 | A | 11/1998 | Kim et al. | 6,108,076 | A | 8/2000 | Hanseder |
| 5,867,800 | A | 2/1999 | Leif | 6,108,269 | A | 8/2000 | Kabel |
| 5,867,861 | A | 2/1999 | Kasen et al. | 6,108,597 | A | 8/2000 | Kirchner et al. |
| 5,869,910 | A | 2/1999 | Colens | 6,108,859 | A | 8/2000 | Burgoon |
| 5,894,621 | A | 4/1999 | Kubo | 6,112,143 | A | 8/2000 | Allen et al. |
| 5,896,611 | A | 4/1999 | Haaga | 6,112,996 | A | 9/2000 | Matsuo |
| 5,903,124 | A | 5/1999 | Kawakami | 6,119,057 | A | 9/2000 | Kawagoe |
| 5,905,209 | A | 5/1999 | Oreper | 6,122,798 | A | 9/2000 | Kobayashi et al. |
| 5,907,886 | A | 6/1999 | Buscher | 6,124,694 | A | 9/2000 | Bancroft et al. |
| 5,910,700 | A | 6/1999 | Crotzer | 6,125,498 | A | 10/2000 | Roberts et al. |
| 5,911,260 | A | 6/1999 | Suzuki | 6,131,237 | A | 10/2000 | Kasper et al. |
| 5,916,008 | A | 6/1999 | Wong | 6,138,063 | A | 10/2000 | Himeda |
| 5,924,167 | A | 7/1999 | Wright et al. | 6,142,252 | A | 11/2000 | Kinto et al. |
| 5,926,909 | A | 7/1999 | McGee | 6,146,041 | A | 11/2000 | Chen et al. |
| 5,933,102 | A | 8/1999 | Miller et al. | 6,146,278 | A | 11/2000 | Kobayashi |
| 5,933,913 | A | 8/1999 | Wright et al. | 6,154,279 | A | 11/2000 | Thayer |
| 5,935,179 | A | 8/1999 | Kleiner et al. | 6,154,694 | A | 11/2000 | Aoki et al. |
| 5,935,333 | A | 8/1999 | Davis | 6,160,479 | A | 12/2000 | Åhlen et al. |
| 5,940,346 | A | 8/1999 | Sadowsky et al. | 6,167,332 | A | 12/2000 | Kurtzberg et al. |
| 5,940,927 | A | 8/1999 | Haegermarck et al. | 6,167,587 | B1 | 1/2001 | Kasper et al. |
| 5,940,930 | A | 8/1999 | Oh et al. | 6,192,548 | B1 | 2/2001 | Huffman |
| 5,942,869 | A | 8/1999 | Katou et al. | 6,192,549 | B1 | 2/2001 | Kasen et al. |
| 5,943,730 | A | 8/1999 | Boomgaarden | 6,202,243 | B1 | 3/2001 | Beaufoy et al. |
| 5,943,733 | A | 8/1999 | Tagliaferri | 6,216,307 | B1 | 4/2001 | Kaleta et al. |
| 5,943,933 | A | 8/1999 | Evans et al. | 6,220,865 | B1 | 4/2001 | Macri et al. |
| 5,947,225 | A | 9/1999 | Kawakami et al. | 6,226,830 | B1 | 5/2001 | Hendriks et al. |
| 5,950,408 | A | 9/1999 | Schaedler | 6,230,362 | B1 | 5/2001 | Kasper et al. |
| 5,959,423 | A | 9/1999 | Nakanishi et al. | 6,237,741 | B1 | 5/2001 | Guidetti |
| 5,968,281 | A | 10/1999 | Wright et al. | 6,240,342 | B1 | 5/2001 | Fiegert et al. |
| 5,974,348 | A | 10/1999 | Rocks | 6,243,913 | B1 | 6/2001 | Frank et al. |
| 5,974,365 | A | 10/1999 | Mitchell | 6,255,793 | B1 | 7/2001 | Peless et al. |
| 5,983,448 | A | 11/1999 | Wright et al. | 6,259,979 | B1 | 7/2001 | Holmquist |
| 5,984,880 | A | 11/1999 | Lander et al. | 6,261,379 | B1 | 7/2001 | Conrad et al. |
| 5,989,700 | A | 11/1999 | Krivopal | 6,263,539 | B1 | 7/2001 | Baig |
| 5,991,951 | A | 11/1999 | Kubo et al. | 6,263,989 | B1 | 7/2001 | Won |
| 5,995,883 | A | 11/1999 | Nishikado | 6,272,936 | B1 | 8/2001 | Oreper et al. |
| 5,995,884 | A | 11/1999 | Allen et al. | 6,276,478 | B1 | 8/2001 | Hopkins et al. |
| 5,996,167 | A | 12/1999 | Close | 6,278,918 | B1 | 8/2001 | Dickson et al. |
| 5,998,953 | A | 12/1999 | Nakamura et al. | 6,279,196 | B2 | 8/2001 | Kasen et al. |
| 5,998,971 | A | 12/1999 | Corbridge | 6,282,526 | B1 | 8/2001 | Ganesh |
| 6,000,088 | A | 12/1999 | Wright et al. | 6,283,034 | B1 | 9/2001 | Miles |
| 6,009,358 | A | 12/1999 | Angott et al. | 6,285,778 | B1 | 9/2001 | Nakajima et al. |
| 6,012,618 | A | 1/2000 | Matsuo | 6,285,930 | B1 | 9/2001 | Dickson et al. |
| 6,021,545 | A | 2/2000 | Delgado et al. | 6,286,181 | B1 | 9/2001 | Kasper et al. |
| 6,023,813 | A | 2/2000 | Thatcher et al. | 6,300,737 | B1 | 10/2001 | Bergvall et al. |
| 6,023,814 | A | 2/2000 | Imamura | 6,321,337 | B1 | 11/2001 | Reshef et al. |
| 6,025,687 | A | 2/2000 | Himeda et al. | 6,321,515 | B1 | 11/2001 | Colens |
| 6,026,539 | A | 2/2000 | Mouw et al. | 6,323,570 | B1 | 11/2001 | Nishimura et al. |
| 6,030,464 | A | 2/2000 | Azevedo | 6,324,714 | B1 | 12/2001 | Walz et al. |
| 6,030,465 | A | 2/2000 | Marcussen et al. | 6,327,741 | B1 | 12/2001 | Reed |
| 6,032,327 | A | 3/2000 | Oka et al. | 6,332,400 | B1 | 12/2001 | Meyer |
| 6,032,542 | A | 3/2000 | Warnick et al. | 6,339,735 | B1 | 1/2002 | Peless et al. |
| 6,036,572 | A | 3/2000 | Sze | 6,362,875 | B1 | 3/2002 | Burkley |

| | | |
|---|---|---|
| 6,370,453 B2 | 4/2002 | Sommer |
| 6,374,155 B1 | 4/2002 | Wallach et al. |
| 6,374,157 B1 | 4/2002 | Takamura |
| 6,381,802 B2 | 5/2002 | Park |
| 6,385,515 B1 | 5/2002 | Dickson et al. |
| 6,388,013 B1 | 5/2002 | Saraf et al. |
| 6,389,329 B1 * | 5/2002 | Colens .................... 700/262 |
| 6,397,429 B1 | 6/2002 | Legatt et al. |
| 6,400,048 B1 | 6/2002 | Nishimura et al. |
| 6,401,294 B2 | 6/2002 | Kasper |
| 6,408,226 B1 | 6/2002 | Byrne et al. |
| 6,412,141 B2 | 7/2002 | Kasper et al. |
| 6,415,203 B1 | 7/2002 | Inoue et al. |
| 6,418,586 B2 | 7/2002 | Fulghum |
| 6,421,870 B1 | 7/2002 | Basham et al. |
| 6,427,285 B1 | 8/2002 | Legatt et al. |
| 6,430,471 B1 | 8/2002 | Kintou et al. |
| 6,431,296 B1 | 8/2002 | Won |
| 6,437,227 B1 | 8/2002 | Theimer |
| 6,437,465 B1 | 8/2002 | Nishimura et al. |
| 6,438,456 B1 | 8/2002 | Feddema et al. |
| 6,438,793 B1 | 8/2002 | Miner et al. |
| 6,442,476 B1 | 8/2002 | Poropat |
| 6,442,789 B1 | 9/2002 | Legatt et al. |
| 6,443,509 B1 | 9/2002 | Levin et al. |
| 6,444,003 B1 | 9/2002 | Sutcliffe |
| 6,446,302 B1 | 9/2002 | Kasper et al. |
| 6,454,036 B1 | 9/2002 | Airey et al. |
| D464,091 S | 10/2002 | Christianson |
| 6,457,206 B1 | 10/2002 | Judson |
| 6,459,955 B1 | 10/2002 | Bartsch et al. |
| 6,463,368 B1 | 10/2002 | Feiten et al. |
| 6,465,982 B1 | 10/2002 | Bergvall et al. |
| 6,473,167 B1 | 10/2002 | Odell |
| 6,480,762 B1 | 11/2002 | Uchikubo et al. |
| 6,481,515 B1 | 11/2002 | Kirkpatrick et al. |
| 6,482,252 B1 | 11/2002 | Conrad et al. |
| 6,490,539 B1 | 12/2002 | Dickson et al. |
| 6,491,127 B1 | 12/2002 | Holmberg et al. |
| 6,493,612 B1 | 12/2002 | Bisset et al. |
| 6,493,613 B2 | 12/2002 | Peless et al. |
| 6,496,754 B2 | 12/2002 | Song et al. |
| 6,496,755 B2 | 12/2002 | Wallach et al. |
| 6,502,657 B2 | 1/2003 | Kerrebrock et al. |
| 6,504,610 B1 | 1/2003 | Bauer et al. |
| 6,507,773 B2 | 1/2003 | Parker et al. |
| 6,519,808 B2 | 2/2003 | Legatt et al. |
| 6,525,509 B1 | 2/2003 | Petersson et al. |
| D471,243 S | 3/2003 | Cioffi et al. |
| 6,530,102 B1 | 3/2003 | Pierce et al. |
| 6,530,117 B2 | 3/2003 | Peterson |
| 6,532,404 B2 * | 3/2003 | Colens .................... 700/262 |
| 6,535,793 B2 | 3/2003 | Allard |
| 6,540,424 B1 | 4/2003 | Hall et al. |
| 6,540,607 B2 | 4/2003 | Mokris et al. |
| 6,543,210 B2 | 4/2003 | Rostoucher et al. |
| 6,548,982 B1 | 4/2003 | Papanikolopoulos et al. |
| 6,553,612 B1 | 4/2003 | Dyson et al. |
| 6,556,722 B1 | 4/2003 | Russell et al. |
| 6,556,892 B2 | 4/2003 | Kuroki et al. |
| 6,557,104 B2 | 4/2003 | Vu et al. |
| D474,312 S | 5/2003 | Stephens et al. |
| 6,563,130 B2 | 5/2003 | Dworkowski et al. |
| 6,571,415 B2 | 6/2003 | Gerber et al. |
| 6,571,422 B1 | 6/2003 | Gordon et al. |
| 6,572,711 B2 | 6/2003 | Sclafani et al. |
| 6,574,536 B1 | 6/2003 | Kawagoe et al. |
| 6,580,246 B2 | 6/2003 | Jacobs |
| 6,581,239 B1 | 6/2003 | Dyson et al. |
| 6,584,376 B1 | 6/2003 | Van Kommer |
| 6,586,908 B2 | 7/2003 | Petersson et al. |
| 6,587,573 B1 | 7/2003 | Stam et al. |
| 6,590,222 B1 | 7/2003 | Bisset et al. |
| 6,594,551 B2 | 7/2003 | McKinney et al. |
| 6,594,844 B2 | 7/2003 | Jones |
| D478,884 S | 8/2003 | Slipy et al. |
| 6,601,265 B1 | 8/2003 | Burlington |
| 6,604,021 B2 | 8/2003 | Imai et al. |
| 6,604,022 B2 | 8/2003 | Parker et al. |
| 6,605,156 B1 | 8/2003 | Clark et al. |
| 6,609,269 B2 | 8/2003 | Kasper |
| 6,611,120 B2 | 8/2003 | Song et al. |
| 6,611,734 B2 | 8/2003 | Parker et al. |
| 6,611,738 B2 | 8/2003 | Ruffner |
| 6,615,108 B1 | 9/2003 | Peless et al. |
| 6,615,434 B1 | 9/2003 | Davis et al. |
| 6,615,885 B1 | 9/2003 | Ohm |
| 6,622,465 B2 | 9/2003 | Jerome et al. |
| 6,624,744 B1 | 9/2003 | Wilson et al. |
| 6,625,843 B2 | 9/2003 | Kim et al. |
| 6,629,028 B2 | 9/2003 | Paromtchik et al. |
| 6,633,150 B1 | 10/2003 | Wallach et al. |
| 6,637,546 B1 | 10/2003 | Wang |
| 6,639,659 B2 | 10/2003 | Granger |
| 6,658,325 B2 | 12/2003 | Zweig |
| 6,658,354 B2 | 12/2003 | Lin |
| 6,658,692 B2 | 12/2003 | Lenkiewicz et al. |
| 6,658,693 B1 | 12/2003 | Reed |
| 6,661,239 B1 | 12/2003 | Ozick |
| 6,662,889 B2 | 12/2003 | De Fazio et al. |
| 6,668,951 B2 | 12/2003 | Won |
| 6,670,817 B2 | 12/2003 | Fournier et al. |
| 6,671,592 B1 | 12/2003 | Bisset et al. |
| 6,671,925 B2 | 1/2004 | Field et al. |
| 6,677,938 B1 | 1/2004 | Maynard |
| 6,687,571 B1 | 2/2004 | Byrne et al. |
| 6,690,134 B1 | 2/2004 | Jones et al. |
| 6,690,993 B2 | 2/2004 | Foulke et al. |
| 6,697,147 B2 | 2/2004 | Ko et al. |
| 6,705,332 B2 | 3/2004 | Field et al. |
| 6,711,280 B2 | 3/2004 | Stafsudd et al. |
| 6,732,826 B2 | 5/2004 | Song et al. |
| 6,735,811 B2 | 5/2004 | Field et al. |
| 6,735,812 B2 | 5/2004 | Hekman et al. |
| 6,737,591 B1 | 5/2004 | Lapstun et al. |
| 6,741,054 B2 | 5/2004 | Koselka et al. |
| 6,741,364 B2 | 5/2004 | Lange et al. |
| 6,748,297 B2 | 6/2004 | Song et al. |
| 6,756,703 B2 | 6/2004 | Chang |
| 6,760,647 B2 | 7/2004 | Nourbakhsh et al. |
| 6,764,373 B1 | 7/2004 | Osawa et al. |
| 6,769,004 B2 | 7/2004 | Barrett |
| 6,774,596 B1 | 8/2004 | Bisset |
| 6,779,380 B1 | 8/2004 | Nieuwkamp |
| 6,781,338 B2 | 8/2004 | Jones et al. |
| 6,801,015 B2 * | 10/2004 | Bertram et al. ............... 320/127 |
| 6,809,490 B2 | 10/2004 | Jones et al. |
| 6,810,305 B2 | 10/2004 | Kirkpatrick |
| 6,810,350 B2 | 10/2004 | Blakley |
| 6,830,120 B1 | 12/2004 | Yashima et al. |
| 6,832,407 B2 | 12/2004 | Salem et al. |
| 6,836,701 B2 | 12/2004 | McKee |
| 6,841,963 B2 | 1/2005 | Song et al. |
| 6,845,297 B2 | 1/2005 | Allard |
| 6,848,146 B2 | 2/2005 | Wright et al. |
| 6,854,148 B1 | 2/2005 | Rief et al. |
| 6,856,811 B2 | 2/2005 | Burdue et al. |
| 6,859,010 B2 | 2/2005 | Jeon et al. |
| 6,859,682 B2 | 2/2005 | Naka et al. |
| 6,860,206 B1 | 3/2005 | Rudakevych et al. |
| 6,865,447 B2 | 3/2005 | Lau et al. |
| 6,870,792 B2 | 3/2005 | Chiappetta |
| 6,871,115 B2 | 3/2005 | Huang et al. |
| 6,883,201 B2 | 4/2005 | Jones et al. |
| 6,886,651 B1 | 5/2005 | Slocum et al. |
| 6,888,333 B2 | 5/2005 | Laby |
| 6,901,624 B2 | 6/2005 | Mori et al. |
| 6,906,702 B1 | 6/2005 | Tanaka et al. |
| 6,101,670 C1 | 7/2005 | Song |
| 6,914,403 B2 | 7/2005 | Tsurumi |
| 6,917,854 B2 | 7/2005 | Bayer |
| 6,925,357 B2 | 8/2005 | Wang et al. |
| 6,925,679 B2 | 8/2005 | Wallach et al. |
| 6,929,548 B2 | 8/2005 | Wang |
| D510,066 S | 9/2005 | Hickey et al. |
| 6,938,298 B2 | 9/2005 | Aasen |
| 6,940,291 B1 | 9/2005 | Ozick |
| 6,941,199 B1 | 9/2005 | Bottomley et al. |

| | | | | | |
|---|---|---|---|---|---|
| 6,956,348 B2 | 10/2005 | Landry et al. | 7,459,871 B2 | 12/2008 | Landry et al. |
| 6,957,712 B2 | 10/2005 | Song et al. | 7,467,026 B2 | 12/2008 | Sakagami et al. |
| 6,960,986 B2 | 11/2005 | Asama et al. | 7,474,941 B2 | 1/2009 | Kim et al. |
| 6,965,209 B2 | 11/2005 | Jones et al. | 7,503,096 B2 | 3/2009 | Lin |
| 6,965,211 B2 | 11/2005 | Tsurumi | 7,515,991 B2 | 4/2009 | Egawa et al. |
| 6,968,592 B2 | 11/2005 | Takeuchi et al. | 7,539,557 B2 | 5/2009 | Yamauchi |
| 6,971,140 B2 | 12/2005 | Kim | 7,555,363 B2 | 6/2009 | Augenbraun et al. |
| 6,975,246 B1 | 12/2005 | Trudeau | 7,557,703 B2 | 7/2009 | Yamada et al. |
| 6,980,229 B1 | 12/2005 | Ebersole | 7,568,259 B2 | 8/2009 | Yan |
| 6,985,556 B2 | 1/2006 | Shanmugavel et al. | 7,571,511 B2 | 8/2009 | Jones et al. |
| 6,993,954 B1 | 2/2006 | George et al. | 7,578,020 B2 | 8/2009 | Jaworski et al. |
| 6,999,850 B2 | 2/2006 | McDonald | 7,600,521 B2 | 10/2009 | Woo |
| 7,013,527 B2 | 3/2006 | Thomas et al. | 7,603,744 B2 | 10/2009 | Reindle |
| 7,024,278 B2 | 4/2006 | Chiappetta et al. | 7,611,583 B2 | 11/2009 | Buckley et al. |
| 7,024,280 B2 | 4/2006 | Parker et al. | 7,617,557 B2 | 11/2009 | Reindle |
| 7,027,893 B2 | 4/2006 | Perry et al. | 7,620,476 B2 | 11/2009 | Morse et al. |
| 7,030,768 B2 | 4/2006 | Wanie | 7,636,928 B2 | 12/2009 | Uno |
| 7,031,805 B2 | 4/2006 | Lee et al. | 7,636,982 B2 | 12/2009 | Jones et al. |
| 7,032,469 B2 | 4/2006 | Bailey | 7,647,144 B2 | 1/2010 | Haegermarck |
| 7,040,869 B2 | 5/2006 | Beenker | 7,650,666 B2 | 1/2010 | Jang |
| 7,051,399 B2 | 5/2006 | Field et al. | 7,660,650 B2 | 2/2010 | Kawagoe et al. |
| 7,053,578 B2 | 5/2006 | Diehl et al. | 7,663,333 B2 | 2/2010 | Jones et al. |
| 7,054,716 B2 | 5/2006 | McKee et al. | 7,693,605 B2 | 4/2010 | Park |
| 5,987,383 C1 | 6/2006 | Keller et al. | 7,706,917 B1 | 4/2010 | Chiappetta et al. |
| 7,055,210 B2 | 6/2006 | Keppler et al. | 6,925,357 C1 | 5/2010 | Wang et al. |
| 7,057,120 B2 | 6/2006 | Ma et al. | 7,761,954 B2 | 7/2010 | Ziegler et al. |
| 7,057,643 B2 | 6/2006 | Iida et al. | 7,765,635 B2 | 8/2010 | Park |
| 7,059,012 B2 | 6/2006 | Song et al. | 7,784,147 B2 | 8/2010 | Burkholder et al. |
| 7,065,430 B2 | 6/2006 | Naka et al. | 7,801,645 B2 | 9/2010 | Taylor et al. |
| 7,066,291 B2 | 6/2006 | Martins et al. | 7,805,220 B2 | 9/2010 | Taylor et al. |
| 7,069,124 B1 | 6/2006 | Whittaker et al. | 7,809,944 B2 | 10/2010 | Kawamoto |
| 7,079,923 B2 | 7/2006 | Abramson et al. | 7,832,048 B2 | 11/2010 | Harwig et al. |
| 7,085,623 B2 | 8/2006 | Siegers | 7,849,555 B2 | 12/2010 | Hahm et al. |
| 7,085,624 B2 | 8/2006 | Aldred et al. | 7,853,645 B2 | 12/2010 | Brown et al. |
| 7,113,847 B2 | 9/2006 | Chmura et al. | 7,920,941 B2 | 4/2011 | Park et al. |
| 7,133,746 B2 | 11/2006 | Abramson et al. | 7,937,800 B2 | 5/2011 | Yan |
| 7,142,198 B2 | 11/2006 | Lee | 7,957,836 B2 | 6/2011 | Myeong et al. |
| 7,148,458 B2 | 12/2006 | Schell et al. | 8,087,117 B2 | 1/2012 | Kapoor et al. |
| 7,155,308 B2 | 12/2006 | Jones | 2001/0004719 A1 | 6/2001 | Sommer |
| 7,166,983 B2 * | 1/2007 | Jung ............................ 318/587 | 2001/0013929 A1 | 8/2001 | Torsten |
| 7,167,775 B2 | 1/2007 | Abramson et al. | 2001/0020200 A1 | 9/2001 | Das et al. |
| 7,171,285 B2 | 1/2007 | Kim et al. | 2001/0025183 A1 | 9/2001 | Shahidi |
| 7,173,391 B2 | 2/2007 | Jones et al. | 2001/0037163 A1 | 11/2001 | Allard |
| 7,174,238 B1 | 2/2007 | Zweig | 2001/0043509 A1 | 11/2001 | Green et al. |
| 7,188,000 B2 | 3/2007 | Chiappetta et al. | 2001/0045883 A1 | 11/2001 | Holdaway et al. |
| 7,193,384 B1 | 3/2007 | Norman et al. | 2001/0047231 A1 | 11/2001 | Peless et al. |
| 7,196,487 B2 | 3/2007 | Jones et al. | 2001/0047895 A1 | 12/2001 | De Fazio |
| 7,201,786 B2 | 4/2007 | Wegelin et al. | 2002/0011367 A1 | 1/2002 | Kolesnik |
| 7,206,677 B2 | 4/2007 | Huldén | 2002/0011813 A1 | 1/2002 | Koselka et al. |
| 7,211,980 B1 | 5/2007 | Bruemmer et al. | 2002/0016649 A1 | 2/2002 | Jones |
| 7,225,500 B2 | 6/2007 | Diehl et al. | 2002/0021219 A1 | 2/2002 | Edwards |
| 7,233,122 B2 * | 6/2007 | Kim et al. ................. 318/568.12 | 2002/0027652 A1 | 3/2002 | Paromtchik et al. |
| 7,246,405 B2 | 7/2007 | Yan | 2002/0036779 A1 | 3/2002 | Kiyoi et al. |
| 7,248,951 B2 | 7/2007 | Huldén | 2002/0081937 A1 | 6/2002 | Yamada et al. |
| 7,251,853 B2 * | 8/2007 | Park et al. ......................... 15/319 | 2002/0095239 A1 | 7/2002 | Wallach et al. |
| 7,275,280 B2 | 10/2007 | Haegermarck et al. | 2002/0097400 A1 | 7/2002 | Jung et al. |
| 7,283,892 B1 | 10/2007 | Boillot et al. | 2002/0104963 A1 | 8/2002 | Mancevski |
| 7,288,912 B2 | 10/2007 | Landry et al. | 2002/0108209 A1 | 8/2002 | Peterson |
| 7,318,248 B1 | 1/2008 | Yan | 2002/0112742 A1 | 8/2002 | Bredo et al. |
| 7,320,149 B1 | 1/2008 | Huffman et al. | 2002/0113973 A1 | 8/2002 | Ge |
| 7,321,807 B2 | 1/2008 | Laski | 2002/0116089 A1 | 8/2002 | Kirkpatrick |
| 7,324,870 B2 | 1/2008 | Lee | 2002/0120364 A1 * | 8/2002 | Colens .......................... 700/262 |
| 7,328,196 B2 | 2/2008 | Peters | 2002/0124343 A1 | 9/2002 | Reed |
| 7,332,890 B2 | 2/2008 | Cohen et al. | 2002/0153185 A1 | 10/2002 | Song et al. |
| 7,346,428 B1 | 3/2008 | Huffman et al. | 2002/0156556 A1 | 10/2002 | Ruffner |
| 7,352,153 B2 | 4/2008 | Yan | 2002/0159051 A1 | 10/2002 | Guo |
| 7,359,766 B2 | 4/2008 | Jeon et al. | 2002/0166193 A1 | 11/2002 | Kasper |
| 7,360,277 B2 | 4/2008 | Moshenrose et al. | 2002/0169521 A1 | 11/2002 | Goodman et al. |
| 7,363,108 B2 | 4/2008 | Noda et al. | 2002/0173877 A1 | 11/2002 | Zweig |
| 7,388,879 B2 | 6/2008 | Sabe et al. | 2002/0189871 A1 | 12/2002 | Won |
| 7,389,156 B2 | 6/2008 | Ziegler et al. | 2003/0009259 A1 | 1/2003 | Hattori et al. |
| 7,389,166 B2 | 6/2008 | Harwig et al. | 2003/0019071 A1 | 1/2003 | Field et al. |
| 7,408,157 B2 | 8/2008 | Yan | 2003/0023356 A1 | 1/2003 | Keable |
| 7,418,762 B2 | 9/2008 | Arai et al. | 2003/0024986 A1 | 2/2003 | Mazz et al. |
| 7,430,455 B2 | 9/2008 | Casey et al. | 2003/0025472 A1 * | 2/2003 | Jones et al. ............. 318/568.12 |
| 7,430,462 B2 | 9/2008 | Chiu et al. | 2003/0026472 A1 * | 2/2003 | Abe ........................ 382/144 |
| 7,441,298 B2 | 10/2008 | Svendsen et al. | 2003/0028286 A1 | 2/2003 | Glenn et al. |
| 7,444,206 B2 | 10/2008 | Abramson et al. | 2003/0030399 A1 | 2/2003 | Jacobs |
| 7,448,113 B2 | 11/2008 | Jones et al. | 2003/0058262 A1 | 3/2003 | Sato et al. |

| | | | | | | |
|---|---|---|---|---|---|---|
| 2003/0060928 | A1 | 3/2003 | Abramson et al. | 2005/0021181 A1 | 1/2005 | Kim et al. |
| 2003/0067451 | A1 | 4/2003 | Tagg et al. | 2005/0022330 A1* | 2/2005 | Park et al. ............ 15/319 |
| 2003/0097875 | A1 | 5/2003 | Lentz et al. | 2005/0028316 A1 | 2/2005 | Thomas et al. |
| 2003/0120389 | A1 | 6/2003 | Abramson et al. | 2005/0053912 A1 | 3/2005 | Roth et al. |
| 2003/0124312 | A1 | 7/2003 | Autumn | 2005/0055796 A1 | 3/2005 | Wright et al. |
| 2003/0126352 | A1 | 7/2003 | Barrett | 2005/0067994 A1 | 3/2005 | Jones et al. |
| 2003/0137268 | A1 | 7/2003 | Papanikolopoulos et al. | 2005/0085947 A1 | 4/2005 | Aldred et al. |
| 2003/0146384 | A1 | 8/2003 | Logsdon et al. | 2005/0091782 A1 | 5/2005 | Gordon et al. |
| 2003/0146739 | A1* | 8/2003 | Bertram et al. ............ 320/135 | 2005/0091786 A1 | 5/2005 | Wright et al. |
| 2003/0159232 | A1 | 8/2003 | Hekman et al. | 2005/0137749 A1 | 6/2005 | Jeon et al. |
| 2003/0168081 | A1 | 9/2003 | Lee et al. | 2005/0138764 A1* | 6/2005 | Grey ............ 15/377 |
| 2003/0175138 | A1 | 9/2003 | Beenker | 2005/0144751 A1 | 7/2005 | Kegg et al. |
| 2003/0192144 | A1 | 10/2003 | Song et al. | 2005/0150074 A1 | 7/2005 | Diehl et al. |
| 2003/0193657 | A1 | 10/2003 | Uomori et al. | 2005/0150519 A1 | 7/2005 | Keppler et al. |
| 2003/0216834 | A1 | 11/2003 | Allard | 2005/0154795 A1 | 7/2005 | Kuz et al. |
| 2003/0221114 | A1 | 11/2003 | Hino et al. | 2005/0156562 A1 | 7/2005 | Cohen et al. |
| 2003/0229421 | A1 | 12/2003 | Chmura et al. | 2005/0163119 A1 | 7/2005 | Ito et al. |
| 2003/0229474 | A1 | 12/2003 | Suzuki et al. | 2005/0165508 A1 | 7/2005 | Kanda et al. |
| 2003/0233171 | A1 | 12/2003 | Heiligensetzer | 2005/0166354 A1 | 8/2005 | Uehigashi |
| 2003/0233177 | A1 | 12/2003 | Johnson et al. | 2005/0166355 A1* | 8/2005 | Tani ............ 15/319 |
| 2003/0233870 | A1 | 12/2003 | Mancevski | 2005/0171644 A1* | 8/2005 | Tani ............ 700/253 |
| 2003/0233930 | A1 | 12/2003 | Ozick | 2005/0172445 A1 | 8/2005 | Diehl et al. |
| 2004/0016077 | A1 | 1/2004 | Song et al. | 2005/0183229 A1 | 8/2005 | Uehigashi |
| 2004/0020000 | A1 | 2/2004 | Jones | 2005/0183230 A1 | 8/2005 | Uehigashi |
| 2004/0030448 | A1 | 2/2004 | Solomon | 2005/0187678 A1 | 8/2005 | Myeong et al. |
| 2004/0030449 | A1 | 2/2004 | Solomon | 2005/0192707 A1 | 9/2005 | Park et al. |
| 2004/0030450 | A1 | 2/2004 | Solomon | 2005/0204505 A1* | 9/2005 | Kashiwagi ............ 15/319 |
| 2004/0030451 | A1 | 2/2004 | Solomon | 2005/0204717 A1 | 9/2005 | Colens |
| 2004/0030570 | A1 | 2/2004 | Solomon | 2005/0209736 A1 | 9/2005 | Kawagoe |
| 2004/0030571 | A1 | 2/2004 | Solomon | 2005/0211880 A1 | 9/2005 | Schell et al. |
| 2004/0031113 | A1 | 2/2004 | Wosewick et al. | 2005/0212478 A1* | 9/2005 | Takenaka ............ 320/107 |
| 2004/0045117 | A1* | 3/2004 | Alowonle et al. ............ 15/319 | 2005/0212680 A1* | 9/2005 | Uehigashi ............ 340/632 |
| 2004/0049877 | A1* | 3/2004 | Jones et al. ............ 15/319 | 2005/0212929 A1 | 9/2005 | Schell et al. |
| 2004/0055163 | A1 | 3/2004 | McCambridge et al. | 2005/0213082 A1 | 9/2005 | DiBernardo et al. |
| 2004/0068351 | A1 | 4/2004 | Solomon | 2005/0213109 A1 | 9/2005 | Schell et al. |
| 2004/0068415 | A1 | 4/2004 | Solomon | 2005/0217042 A1 | 10/2005 | Reindle |
| 2004/0068416 | A1 | 4/2004 | Solomon | 2005/0218852 A1 | 10/2005 | Landry et al. |
| 2004/0074038 | A1 | 4/2004 | Im et al. | 2005/0222933 A1 | 10/2005 | Wesby |
| 2004/0074044 | A1 | 4/2004 | Diehl et al. | 2005/0229340 A1 | 10/2005 | Sawalski et al. |
| 2004/0076324 | A1 | 4/2004 | Burl et al. | 2005/0229355 A1 | 10/2005 | Crouch et al. |
| 2004/0083570 | A1 | 5/2004 | Song et al. | 2005/0234595 A1* | 10/2005 | Tani ............ 700/245 |
| 2004/0085037 | A1 | 5/2004 | Jones et al. | 2005/0235451 A1 | 10/2005 | Yan |
| 2004/0088079 | A1 | 5/2004 | Lavarec et al. | 2005/0251292 A1 | 11/2005 | Casey et al. |
| 2004/0093122 | A1 | 5/2004 | Galibraith | 2005/0255425 A1 | 11/2005 | Pierson |
| 2004/0098167 | A1 | 5/2004 | Yi et al. | 2005/0258154 A1 | 11/2005 | Blankenship et al. |
| 2004/0111184 | A1 | 6/2004 | Chiappetta et al. | 2005/0273967 A1 | 12/2005 | Taylor et al. |
| 2004/0111821 | A1 | 6/2004 | Lenkiewicz et al. | 2005/0288819 A1 | 12/2005 | de Guzman |
| 2004/0113777 | A1 | 6/2004 | Matsuhira et al. | 2006/0000050 A1 | 1/2006 | Cipolla et al. |
| 2004/0117064 | A1 | 6/2004 | McDonald | 2006/0009879 A1 | 1/2006 | Lynch et al. |
| 2004/0117846 | A1 | 6/2004 | Karaoguz et al. | 2006/0010638 A1 | 1/2006 | Shimizu et al. |
| 2004/0118998 | A1 | 6/2004 | Wingett et al. | 2006/0020369 A1 | 1/2006 | Taylor et al. |
| 2004/0128028 | A1 | 7/2004 | Miyamoto et al. | 2006/0020370 A1 | 1/2006 | Abramson |
| 2004/0133316 | A1 | 7/2004 | Dean | 2006/0021168 A1 | 2/2006 | Nishikawa |
| 2004/0134336 | A1 | 7/2004 | Solomon | 2006/0025134 A1 | 2/2006 | Cho et al. |
| 2004/0134337 | A1 | 7/2004 | Solomon | 2006/0037170 A1 | 2/2006 | Shimizu |
| 2004/0143919 | A1 | 7/2004 | Wilder | 2006/0042042 A1 | 3/2006 | Mertes et al. |
| 2004/0148419 | A1 | 7/2004 | Chen et al. | 2006/0044546 A1 | 3/2006 | Lewin et al. |
| 2004/0148731 | A1 | 8/2004 | Damman et al. | 2006/0056677 A1* | 3/2006 | Tani ............ 382/153 |
| 2004/0153212 | A1 | 8/2004 | Profio et al. | 2006/0060216 A1 | 3/2006 | Woo |
| 2004/0156541 | A1 | 8/2004 | Jeon et al. | 2006/0061657 A1 | 3/2006 | Rew et al. |
| 2004/0158357 | A1 | 8/2004 | Lee et al. | 2006/0064828 A1 | 3/2006 | Stein et al. |
| 2004/0181706 | A1 | 9/2004 | Chen et al. | 2006/0087273 A1 | 4/2006 | Ko et al. |
| 2004/0187249 | A1* | 9/2004 | Jones et al. ............ 15/319 | 2006/0089765 A1 | 4/2006 | Pack et al. |
| 2004/0187457 | A1 | 9/2004 | Colens | 2006/0100741 A1 | 5/2006 | Jung |
| 2004/0196451 | A1 | 10/2004 | Aoyama | 2006/0107894 A1 | 5/2006 | Buckley et al. |
| 2004/0200505 | A1 | 10/2004 | Taylor et al. | 2006/0119839 A1 | 6/2006 | Bertin et al. |
| 2004/0204792 | A1* | 10/2004 | Taylor et al. ............ 700/245 | 2006/0143295 A1 | 6/2006 | Costa-Requena et al. |
| 2004/0204804 | A1 | 10/2004 | Lee et al. | 2006/0146776 A1 | 7/2006 | Kim |
| 2004/0210345 | A1 | 10/2004 | Noda et al. | 2006/0150361 A1 | 7/2006 | Aldred et al. |
| 2004/0210347 | A1 | 10/2004 | Sawada et al. | 2006/0184293 A1 | 8/2006 | Konandreas et al. |
| 2004/0211444 | A1 | 10/2004 | Taylor et al. | 2006/0185690 A1 | 8/2006 | Song et al. |
| 2004/0221790 | A1 | 11/2004 | Sinclair et al. | 2006/0190133 A1 | 8/2006 | Konandreas et al. |
| 2004/0236468 | A1 | 11/2004 | Taylor et al. | 2006/0190134 A1 | 8/2006 | Ziegler et al. |
| 2004/0244138 | A1 | 12/2004 | Taylor et al. | 2006/0190146 A1 | 8/2006 | Morse et al. |
| 2004/0255425 | A1 | 12/2004 | Arai et al. | 2006/0196003 A1 | 9/2006 | Song et al. |
| 2005/0000543 | A1 | 1/2005 | Taylor et al. | 2006/0200281 A1 | 9/2006 | Ziegler et al. |
| 2005/0010330 | A1 | 1/2005 | Abramson et al. | 2006/0220900 A1 | 10/2006 | Ceskutti et al. |
| 2005/0010331 | A1 | 1/2005 | Taylor et al. | 2006/0229774 A1 | 10/2006 | Park et al. |
| 2005/0015913 | A1 | 1/2005 | Kim et al. | 2006/0238157 A1* | 10/2006 | Kim et al. ............ 318/568.12 |

| | | | |
|---|---|---|---|
| 2006/0238159 A1* | 10/2006 | Jung .......................... 318/587 |
| 2006/0241814 A1* | 10/2006 | Jung .......................... 700/259 |
| 2006/0253224 A1* | 11/2006 | Tani et al. ................... 700/245 |
| 2006/0259194 A1 | 11/2006 | Chiu |
| 2006/0259212 A1* | 11/2006 | Jeon ............................. 701/23 |
| 2006/0259494 A1 | 11/2006 | Watson et al. |
| 2006/0278161 A1 | 12/2006 | Burkholder et al. |
| 2006/0288519 A1 | 12/2006 | Jaworski et al. |
| 2006/0293787 A1 | 12/2006 | Kanda et al. |
| 2006/0293808 A1 | 12/2006 | Qian |
| 2007/0006404 A1 | 1/2007 | Cheng et al. |
| 2007/0016328 A1 | 1/2007 | Ziegler et al. |
| 2007/0017061 A1 | 1/2007 | Yan |
| 2007/0028574 A1 | 2/2007 | Yan |
| 2007/0032904 A1 | 2/2007 | Kawagoe et al. |
| 2007/0042716 A1 | 2/2007 | Goodall et al. |
| 2007/0043459 A1 | 2/2007 | Abbott et al. |
| 2007/0061041 A1 | 3/2007 | Zweig |
| 2007/0061043 A1 | 3/2007 | Ermakov et al. |
| 2007/0096676 A1* | 5/2007 | Im et al. ....................... 318/587 |
| 2007/0114975 A1 | 5/2007 | Cohen et al. |
| 2007/0142964 A1 | 6/2007 | Abramson |
| 2007/0150096 A1 | 6/2007 | Yeh et al. |
| 2007/0156286 A1 | 7/2007 | Yamauchi |
| 2007/0157415 A1 | 7/2007 | Lee et al. |
| 2007/0157420 A1 | 7/2007 | Lee et al. |
| 2007/0179670 A1 | 8/2007 | Chiappetta et al. |
| 2007/0226949 A1 | 10/2007 | Hahm et al. |
| 2007/0234492 A1 | 10/2007 | Svendsen et al. |
| 2007/0244610 A1 | 10/2007 | Ozick et al. |
| 2007/0245511 A1 | 10/2007 | Hahm et al. |
| 2007/0250212 A1 | 10/2007 | Halloran et al. |
| 2007/0261193 A1 | 11/2007 | Gordon et al. |
| 2007/0266508 A1 | 11/2007 | Jones et al. |
| 2008/0007203 A1 | 1/2008 | Cohen et al. |
| 2008/0039974 A1 | 2/2008 | Sandin et al. |
| 2008/0052846 A1 | 3/2008 | Kapoor et al. |
| 2008/0091304 A1 | 4/2008 | Ozick et al. |
| 2008/0109126 A1 | 5/2008 | Sandin et al. |
| 2008/0134458 A1 | 6/2008 | Ziegler et al. |
| 2008/0140255 A1 | 6/2008 | Ziegler et al. |
| 2008/0155768 A1 | 7/2008 | Ziegler et al. |
| 2008/0184518 A1 | 8/2008 | Taylor |
| 2008/0276407 A1 | 11/2008 | Schnittman et al. |
| 2008/0281470 A1 | 11/2008 | Gilbert et al. |
| 2008/0282494 A1 | 11/2008 | Won et al. |
| 2008/0294288 A1 | 11/2008 | Yamauchi |
| 2008/0302586 A1 | 12/2008 | Yan |
| 2008/0307590 A1 | 12/2008 | Jones et al. |
| 2009/0007366 A1 | 1/2009 | Svendsen et al. |
| 2009/0038089 A1 | 2/2009 | Landry et al. |
| 2009/0048727 A1 | 2/2009 | Hong et al. |
| 2009/0049640 A1 | 2/2009 | Lee et al. |
| 2009/0055022 A1 | 2/2009 | Casey et al. |
| 2009/0102296 A1 | 4/2009 | Greene et al. |
| 2009/0292393 A1 | 11/2009 | Casey et al. |
| 2010/0006028 A1 | 1/2010 | Buckley et al. |
| 2010/0011529 A1 | 1/2010 | Won et al. |
| 2010/0049365 A1 | 2/2010 | Jones et al. |
| 2010/0063628 A1 | 3/2010 | Landry et al. |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0268384 A1 | 10/2010 | Jones et al. |
| 2010/0293742 A1 | 11/2010 | Chung et al. |
| 2010/0312429 A1 | 12/2010 | Jones et al. |

FOREIGN PATENT DOCUMENTS

| | | |
|---|---|---|
| DE | 3317376 A1 | 11/1984 |
| DE | 3536907 C2 | 2/1989 |
| DE | 3404202 C2 | 12/1992 |
| DE | 199311014 U1 | 10/1993 |
| DE | 4414683 A1 | 10/1995 |
| DE | 4338841 C2 | 8/1999 |
| DE | 19849978 | 2/2001 |
| DE | 19849978 C2 | 2/2001 |
| DE | 10242257 A1 | 4/2003 |
| DE | 102004038074 B3 | 6/2005 |
| DE | 10357636 A1 | 7/2005 |
| DE | 102004041021 B3 | 8/2005 |
| DE | 102004041021 B3 | 8/2005 |
| DE | 102005046813 A1 | 4/2007 |
| DE | 102005046813 A1 | 4/2007 |
| DK | 198803389 A | 12/1988 |
| EP | 114926 A2 | 8/1984 |
| EP | 265542 A1 | 5/1988 |
| EP | 281085 A2 | 9/1988 |
| EP | 286328 A1 | 10/1988 |
| EP | 352045 A2 | 1/1990 |
| EP | 307381 A3 | 7/1990 |
| EP | 358628 A3 | 5/1991 |
| EP | 437024 A1 | 7/1991 |
| EP | 389459 A3 | 10/1991 |
| EP | 433697 A3 | 12/1992 |
| EP | 479273 A3 | 5/1993 |
| EP | 294101 B1 | 12/1993 |
| EP | 554978 A3 | 3/1994 |
| EP | 615719 A1 | 9/1994 |
| EP | 861629 A1 | 9/1998 |
| EP | 792726 B1 | 6/1999 |
| EP | 930040 A3 | 10/1999 |
| EP | 845237 B1 | 4/2000 |
| EP | 1018315 A1 | 7/2000 |
| EP | 1172719 A1 | 1/2002 |
| EP | 1228734 A3 | 6/2003 |
| EP | 1331537 A1 | 7/2003 |
| EP | 1139847 B1 | 8/2003 |
| EP | 1380245 A1 | 1/2004 |
| EP | 1380246 A3 | 3/2005 |
| EP | 1553472 A1 | 7/2005 |
| EP | 1557730 A1 | 7/2005 |
| EP | 1642522 A3 | 11/2007 |
| EP | 1672455 A4 | 12/2007 |
| EP | 1836941 A3 | 10/2009 |
| ES | 2238196 B1 | 11/2006 |
| FR | 722755 A | 3/1932 |
| FR | 2601443 B1 | 11/1991 |
| FR | 2828589 B1 | 12/2003 |
| GB | 702426 A | 1/1954 |
| GB | 2128842 B | 4/1986 |
| GB | 2213047 A | 8/1989 |
| GB | 2225221 A | 5/1990 |
| GB | 2284957 A | 6/1995 |
| GB | 2267360 B | 12/1995 |
| GB | 2283838 B | 12/1997 |
| GB | 2300082 B | 9/1999 |
| GB | 2344747 B | 5/2002 |
| GB | 2404330 B | 7/2005 |
| GB | 2409966 A | 7/2005 |
| GB | 2417354 A | 2/2006 |
| JP | 53021869 U | 2/1978 |
| JP | 53110257 A | 9/1978 |
| JP | 53110257 A2 | 9/1978 |
| JP | 57014726 A2 | 1/1982 |
| JP | 57064217 A | 4/1982 |
| JP | 59005315 B | 2/1984 |
| JP | 59033511 U | 3/1984 |
| JP | 59094005 A | 5/1984 |
| JP | 59099308 U | 7/1984 |
| JP | 59112311 U | 7/1984 |
| JP | 59033511 B | 8/1984 |
| JP | 59120124 U | 8/1984 |
| JP | 59131668 U | 9/1984 |
| JP | 59164973 A | 9/1984 |
| JP | 59184917 A | 10/1984 |
| JP | 2283343 A | 11/1984 |
| JP | 59212924 A | 12/1984 |
| JP | 59226909 A | 12/1984 |
| JP | 60089213 | 5/1985 |
| JP | 60089213 U | 6/1985 |
| JP | 60211510 A | 10/1985 |
| JP | 60259895 A | 12/1985 |
| JP | 61023221 A2 | 1/1986 |
| JP | 61097712 A | 5/1986 |
| JP | 61023221 B | 6/1986 |
| JP | 61160366 A | 7/1986 |
| JP | 62074018 A | 4/1987 |
| JP | 62070709 U | 5/1987 |

| | | | | | | |
|---|---|---|---|---|---|---|
| JP | 62120510 | U | 7/1987 | JP | 8256960 A | 10/1996 |
| JP | 62154008 | U | 9/1987 | JP | 8256960 A2 | 10/1996 |
| JP | 62164431 | U | 10/1987 | JP | 8263137 A | 10/1996 |
| JP | 62263507 | A | 11/1987 | JP | 8286741 A | 11/1996 |
| JP | 62263508 | A | 11/1987 | JP | 8286741 A2 | 11/1996 |
| JP | 62189057 | U | 12/1987 | JP | 8286744 A | 11/1996 |
| JP | 63079623 | A | 4/1988 | JP | 8286744 A2 | 11/1996 |
| JP | 61383032 | A | 7/1988 | JP | 8286745 A | 11/1996 |
| JP | 63158032 | A | 7/1988 | JP | 8286747 A | 11/1996 |
| JP | 63203483 | A | 8/1988 | JP | 8322774 A2 | 12/1996 |
| JP | 63241610 | A | 10/1988 | JP | 8335112 A | 12/1996 |
| JP | 1118752 | A | 5/1989 | JP | 8339297 A | 12/1996 |
| JP | 2006312 | U1 | 1/1990 | JP | 83222774 A | 12/1996 |
| JP | 2006312 | Y2 | 2/1990 | JP | 9044240 A | 2/1997 |
| JP | 2283343 | A | 11/1990 | JP | 94047413 A | 2/1997 |
| JP | 3051023 | A2 | 3/1991 | JP | 9066855 A | 3/1997 |
| JP | 3197758 | A | 8/1991 | JP | 9145309 A | 6/1997 |
| JP | 3201903 | A | 9/1991 | JP | 9160644 A | 6/1997 |
| JP | 4019586 | B | 3/1992 | JP | 9160644 A2 | 6/1997 |
| JP | 4084921 | A | 3/1992 | JP | 9179625 A | 7/1997 |
| JP | 04300516 | | 10/1992 | JP | 9179625 A2 | 7/1997 |
| JP | 5023269 | B | 4/1993 | JP | 9179685 A2 | 7/1997 |
| JP | 5091604 | A2 | 4/1993 | JP | 9185410 A | 7/1997 |
| JP | 05095879 | | 4/1993 | JP | 9192069 A | 7/1997 |
| JP | 5095879 | A | 4/1993 | JP | 9192069 A2 | 7/1997 |
| JP | 5042076 | U | 6/1993 | JP | 9204223 A | 8/1997 |
| JP | 5046246 | U | 6/1993 | JP | 9204223 A2 | 8/1997 |
| JP | 5150827 | A | 6/1993 | JP | 9204224 A | 8/1997 |
| JP | 5150829 | A | 6/1993 | JP | 9206258 A | 8/1997 |
| JP | 5046239 | B | 7/1993 | JP | 9206258 A2 | 8/1997 |
| JP | 5054620 | U | 7/1993 | JP | 9233712 A | 9/1997 |
| JP | 5054620 | U | 7/1993 | JP | 09251318 | 9/1997 |
| JP | 5060049 | U | 8/1993 | JP | 9251318 A | 9/1997 |
| JP | 5040519 | Y2 | 10/1993 | JP | 9265319 A | 10/1997 |
| JP | 5257527 | A | 10/1993 | JP | 9269807 A | 10/1997 |
| JP | 5257533 | A | 10/1993 | JP | 9269810 A | 10/1997 |
| JP | 5285861 | A | 11/1993 | JP | 9269824 A | 10/1997 |
| JP | 5302836 | A | 11/1993 | JP | 02555263 Y2 | 11/1997 |
| JP | 5312514 | A | 11/1993 | JP | 9319431 A2 | 12/1997 |
| JP | 5091604 | U | 12/1993 | JP | 9319432 A | 12/1997 |
| JP | 5341904 | A | 12/1993 | JP | 9319434 A | 12/1997 |
| JP | 6003251 | Y2 | 1/1994 | JP | 9325812 A | 12/1997 |
| JP | 6038912 | A | 2/1994 | JP | 10027020 A | 1/1998 |
| JP | 6154143 | A | 6/1994 | JP | 10055215 A | 2/1998 |
| JP | 6293095 | A | 10/1994 | JP | 10105233 A | 4/1998 |
| JP | 6327598 | A | 11/1994 | JP | 10117973 A | 5/1998 |
| JP | 6105781 | B | 12/1994 | JP | 10117973 A2 | 5/1998 |
| JP | 7047046 | A | 2/1995 | JP | 10118963 A | 5/1998 |
| JP | 7059702 | A2 | 3/1995 | JP | 10165738 | 6/1998 |
| JP | 7129239 | A | 5/1995 | JP | 10165738 A | 6/1998 |
| JP | 7059702 | B | 6/1995 | JP | 10177414 A | 6/1998 |
| JP | 7222705 | A | 8/1995 | JP | 10214114 A | 8/1998 |
| JP | 7222705 | A2 | 8/1995 | JP | 10214114 A2 | 8/1998 |
| JP | 7270518 | A | 10/1995 | JP | 10228316 | 8/1998 |
| JP | 7281742 | A2 | 10/1995 | JP | 10240342 A | 9/1998 |
| JP | 7281752 | A | 10/1995 | JP | 10240342 A2 | 9/1998 |
| JP | 7295636 | A | 11/1995 | JP | 10240343 A | 9/1998 |
| JP | 7311041 | A | 11/1995 | JP | 10260727 A | 9/1998 |
| JP | 7311041 | A2 | 11/1995 | JP | 10260727 A2 | 9/1998 |
| JP | 7313417 | A | 12/1995 | JP | 10295595 A | 11/1998 |
| JP | 7319542 | A | 12/1995 | JP | 10314088 A | 12/1998 |
| JP | 7319542 | A2 | 12/1995 | JP | 11015941 A | 1/1999 |
| JP | 8000393 | B2 | 1/1996 | JP | 11065655 A | 3/1999 |
| JP | 8000393 | Y2 | 1/1996 | JP | 11065655 A2 | 3/1999 |
| JP | 8016241 | A2 | 1/1996 | JP | 11065657 A | 3/1999 |
| JP | 8016241 | B | 2/1996 | JP | 11085269 A2 | 3/1999 |
| JP | 8016776 | B | 2/1996 | JP | 11102219 A | 4/1999 |
| JP | 8016776 | B2 | 2/1996 | JP | 11102219 A2 | 4/1999 |
| JP | 8063229 | A | 3/1996 | JP | 11102220 A | 4/1999 |
| JP | 8063229 | A2 | 3/1996 | JP | 11162454 A | 6/1999 |
| JP | 8083125 | A | 3/1996 | JP | 11174145 A | 7/1999 |
| JP | 8083125 | A2 | 3/1996 | JP | 11175149 A | 7/1999 |
| JP | 8084696 | A | 4/1996 | JP | 11178765 A | 7/1999 |
| JP | 8089449 | A | 4/1996 | JP | 11212642 A | 8/1999 |
| JP | 8089451 | A | 4/1996 | JP | 11212642 A2 | 8/1999 |
| JP | 2520732 | B2 | 5/1996 | JP | 11213157 A | 8/1999 |
| JP | 8123548 | A | 5/1996 | JP | 11508810 A | 8/1999 |
| JP | 8152916 | A | 6/1996 | JP | 11248806 A | 9/1999 |
| JP | 8152916 | A2 | 6/1996 | JP | 11510935 A | 9/1999 |

| | | | | | | | |
|---|---|---|---|---|---|---|---|
| JP | 11282532 | A | 10/1999 | JP | 2004148021 | A | 5/2004 |
| JP | 11282533 | A | 10/1999 | JP | 2004160102 | A | 6/2004 |
| JP | 11295412 | A | 10/1999 | JP | 2004166968 | A | 6/2004 |
| JP | 11346964 | A | 12/1999 | JP | 2004174228 | A | 6/2004 |
| JP | 11346964 | A2 | 12/1999 | JP | 2004198330 | A | 7/2004 |
| JP | 2000047728 | A | 2/2000 | JP | 2004219185 | A | 8/2004 |
| JP | 2000056006 | A | 2/2000 | JP | 2004351234 | A | 12/2004 |
| JP | 2000056831 | A | 2/2000 | JP | 2005118354 | A | 5/2005 |
| JP | 2000060782 | A | 2/2000 | JP | 2005135400 | A | 5/2005 |
| JP | 2000066722 | A | 3/2000 | JP | 2005211360 | A | 8/2005 |
| JP | 2000075925 | A | 3/2000 | JP | 2005224265 | A | 8/2005 |
| JP | 2000102499 | A | 4/2000 | JP | 2005230032 | A | 9/2005 |
| JP | 10240343 | A2 | 5/2000 | JP | 2005245916 | A | 9/2005 |
| JP | 03051023 | B2 | 6/2000 | JP | 2005296511 | A | 10/2005 |
| JP | 2000275321 | A | 10/2000 | JP | 2005346700 | A | 12/2005 |
| JP | 2000279353 | A | 10/2000 | JP | 2005346700 | A2 | 12/2005 |
| JP | 2000342497 | A | 12/2000 | JP | 2005352707 | A | 12/2005 |
| JP | 2000353014 | A | 12/2000 | JP | 2006043071 | A | 2/2006 |
| JP | 2000353014 | A2 | 12/2000 | JP | 2006079145 | A | 3/2006 |
| JP | 2001022443 | A | 1/2001 | JP | 2006079157 | A | 3/2006 |
| JP | 2001067588 | A | 3/2001 | JP | 2006155274 | A | 6/2006 |
| JP | 2001087182 | | 4/2001 | JP | 2006164223 | A | 6/2006 |
| JP | 2001087182 | A | 4/2001 | JP | 2006227673 | A | 8/2006 |
| JP | 2001121455 | A | 5/2001 | JP | 2006247467 | A | 9/2006 |
| JP | 2001125641 | A | 5/2001 | JP | 2006260161 | A | 9/2006 |
| JP | 2001507572 | A | 6/2001 | JP | 2006293662 | A | 10/2006 |
| JP | 2001197008 | A | 7/2001 | JP | 2007034866 | A | 2/2007 |
| JP | 2001216482 | A | 8/2001 | JP | 2007213180 | A | 8/2007 |
| JP | 2001258807 | A | 9/2001 | JP | 04074285 | B2 | 4/2008 |
| JP | 2001265437 | A | 9/2001 | JP | 2009015611 | A | 1/2009 |
| JP | 2001275908 | A | 10/2001 | JP | 04300516 | B2 | 7/2009 |
| JP | 2001289939 | A | 10/2001 | JP | 2010198552 | A | 9/2010 |
| JP | 2001306170 | A | 11/2001 | KR | 1020010032583 | | 4/2001 |
| JP | 2001320781 | A | 11/2001 | WO | WO9526512 | A1 | 10/1995 |
| JP | 2001525567 | A | 12/2001 | WO | WO9530887 | A1 | 11/1995 |
| JP | 2002078650 | A | 3/2002 | WO | WO9617258 | A3 | 2/1997 |
| JP | 2002204768 | A | 7/2002 | WO | WO9715224 | A1 | 5/1997 |
| JP | 2002204769 | A | 7/2002 | WO | WO9740734 | A1 | 11/1997 |
| JP | 2002247510 | A | 8/2002 | WO | WO9741451 | A1 | 11/1997 |
| JP | 2002532178 | A | 10/2002 | WO | WO9853456 | A1 | 11/1998 |
| JP | 2002532180 | A | 10/2002 | WO | WO9905580 | A2 | 2/1999 |
| JP | 2002323925 | A | 11/2002 | WO | WO9916078 | A1 | 4/1999 |
| JP | 2002333920 | A | 11/2002 | WO | WO9928800 | A1 | 6/1999 |
| JP | 03356170 | B1 | 12/2002 | WO | WO9938056 | A1 | 7/1999 |
| JP | 2002355206 | A | 12/2002 | WO | WO9938237 | A1 | 7/1999 |
| JP | 2002360471 | A | 12/2002 | WO | WO9943250 | A1 | 9/1999 |
| JP | 2002360479 | A | 12/2002 | WO | WO9959042 | A1 | 11/1999 |
| JP | 2002360482 | A | 12/2002 | WO | WO0004430 | A8 | 4/2000 |
| JP | 2002366227 | A | 12/2002 | WO | WO0036962 | A1 | 6/2000 |
| JP | 2002369778 | A | 12/2002 | WO | WO0038026 | A1 | 6/2000 |
| JP | 2002369778 | A2 | 12/2002 | WO | WO0038028 | A1 | 6/2000 |
| JP | 2003010076 | A | 1/2003 | WO | WO0038029 | A1 | 6/2000 |
| JP | 2003010088 | A | 1/2003 | WO | WO0078410 | A1 | 12/2000 |
| JP | 2003015740 | A | 1/2003 | WO | WO0106904 | A1 | 2/2001 |
| JP | 2003028528 | A | 1/2003 | WO | WO0106905 | A9 | 6/2001 |
| JP | 03375843 | B2 | 2/2003 | WO | WO0180703 | A1 | 11/2001 |
| JP | 2003036116 | A | 2/2003 | WO | WO0191623 | A2 | 12/2001 |
| JP | 2003038401 | A | 2/2003 | WO | WO0239864 | A1 | 5/2002 |
| JP | 2003038402 | A | 2/2003 | WO | WO0239868 | A1 | 5/2002 |
| JP | 2003047579 | A | 2/2003 | WO | WO02058527 | A1 | 8/2002 |
| JP | 2003052596 | A | 2/2003 | WO | WO02062194 | A1 | 8/2002 |
| JP | 2003505127 | A | 2/2003 | WO | WO02067744 | A1 | 9/2002 |
| JP | 2003061882 | A | 3/2003 | WO | WO02067745 | A1 | 9/2002 |
| JP | 2003084994 | A | 3/2003 | WO | WO02067752 | A1 | 9/2002 |
| JP | 2003167628 | A | 6/2003 | WO | WO02069774 | A1 | 9/2002 |
| JP | 2003180586 | A | 7/2003 | WO | WO02071175 | A1 | 9/2002 |
| JP | 2003180587 | A | 7/2003 | WO | WO02075350 | A1 | 9/2002 |
| JP | 2003186539 | A | 7/2003 | WO | WO02075356 | A1 | 9/2002 |
| JP | 2003190064 | A | 7/2003 | WO | WO02075469 | A1 | 9/2002 |
| JP | 2003190064 | A2 | 7/2003 | WO | WO02075470 | A1 | 9/2002 |
| JP | 2003241836 | A | 8/2003 | WO | WO02081074 | A1 | 10/2002 |
| JP | 2003262520 | A | 9/2003 | WO | WO03015220 | A1 | 2/2003 |
| JP | 2003285288 | A | 10/2003 | WO | WO03024292 | A2 | 3/2003 |
| JP | 2003304992 | A | 10/2003 | WO | WO0269775 | A3 | 5/2003 |
| JP | 2003310489 | A | 11/2003 | WO | WO03040546 | A1 | 5/2003 |
| JP | 2003310509 | A | 11/2003 | WO | WO03040845 | A1 | 5/2003 |
| JP | 2003330543 | A | 11/2003 | WO | WO03040846 | A1 | 5/2003 |
| JP | 1020043088 | | 1/2004 | WO | WO03062850 | A2 | 7/2003 |
| JP | 2004123040 | A | 4/2004 | WO | WO03062852 | A1 | 7/2003 |

| | | |
|---|---|---|
| WO | WO02101477 A3 | 10/2003 |
| WO | WO03026474 A3 | 11/2003 |
| WO | WO2004004533 A1 | 1/2004 |
| WO | WO2004004534 A1 | 1/2004 |
| WO | WO2004005956 A1 | 1/2004 |
| WO | WO2004006034 A2 | 1/2004 |
| WO | WO2004025947 A3 | 5/2004 |
| WO | WO2004043215 A1 | 5/2004 |
| WO | WO2004058028 | 7/2004 |
| WO | WO2004058028 A2 | 7/2004 |
| WO | WO2004059409 A1 | 7/2004 |
| WO | WO2005006935 A1 | 1/2005 |
| WO | WO2005036292 A1 | 4/2005 |
| WO | WO2005037496 A1 | 4/2005 |
| WO | WO2005055795 A1 | 6/2005 |
| WO | WO2005055796 A2 | 6/2005 |
| WO | WO2005076545 A1 | 8/2005 |
| WO | WO2005077243 A1 | 8/2005 |
| WO | WO2005077244 A1 | 8/2005 |
| WO | WO2005081074 A1 | 9/2005 |
| WO | WO2005082223 A1 | 9/2005 |
| WO | WO2005083541 A1 | 9/2005 |
| WO | WO2005098475 A1 | 10/2005 |
| WO | WO2005098476 A1 | 10/2005 |
| WO | WO2006046400 A1 | 5/2006 |
| WO | WO2006061133 A1 | 6/2006 |
| WO | WO2006068403 A1 | 6/2006 |
| WO | WO2006073248 A1 | 7/2006 |
| WO | WO2006089307 A2 | 8/2006 |
| WO | WO2007028049 A2 | 3/2007 |
| WO | WO2007036490 A3 | 5/2007 |
| WO | WO2007065033 A2 | 6/2007 |
| WO | WO2007137234 A2 | 11/2007 |

OTHER PUBLICATIONS

Braunstingl et al. "Fuzzy Logic Wall Following of a Mobile Robot Based on the Concept of General Perception" ICAR '95, 7th International Conference on Advanced Robotics, Sant Feliu De Guixols, Spain, pp. 367-376, Sep. 1995.

Bulusu, et al. "Self Configuring Localization systems: Design and Experimental Evaluation", ACM Transactions on Embedded Computing Systems vol. 3 No. 1 pp. 24-60, 2003.

Caccia, et al. "Bottom-Following for Remotely Operated Vehicles", 5th IFAC conference, Alaborg, Denmark, pp. 245-250 Aug. 1, 2000.

Chae, et al. "StarLITE: A new artificial landmark for the navigation of mobile robots", http://www.irc.atr.jp/jk-nrs2005/pdf/Starlite.pdf, 4 pages, 2005.

Chamberlin et al. "Team 1: Robot Locator Beacon System" NASA Goddard SFC, Design Proposal, 15 pages, Feb. 17, 2006.

Champy "Physical management of IT assets in Data Centers using RFID technologies", RFID 2005 University, Oct. 12-14, 2005 (NPL0126).

Chiri "Joystick Control for Tiny OS Robot", http://www.eecs.berkeley.edu/Programs/ugrad/superb/papers2002/chiri.pdf. 12 pages, Aug. 8, 2002.

Christensen et al. "Theoretical Methods for Planning and Control in Mobile Robotics" 1997 First International Conference on Knowledge-Based Intelligent Electronic Systems, Adelaide, Australia, pp. 81-86, May 21-27, 1997.

Andersen et al., "Landmark based navigation strategies", SPIE Conference on Mobile Robots XIII, SPIE vol. 3525, pp.

Clerentin, et al. "A localization method based on two omnidirectional perception systems cooperation" Proc of IEEE International Conference on Robotics & Automation, San Francisco, CA vol. 2, pp. 1219-1224, Apr. 2000.

Corke "High Performance Visual serving for robots end-point control". SPIE vol. 2056 Intelligent robots and computer vision 1993.

Cozman et al. "Robot Localization using a Computer Vision Sextant", IEEE International Midwest Conference on Robotics and Automation, pp. 106-111, 1995.

D'Orazio, et al. "Model based Vision System for mobile robot position estimation", SPIE vol. 2058 Mobile Robots VIII, pp. 38-49, 1992.

De Bakker, et al. "Smart PSD—array for sheet of light range imaging", Proc. Of SPIE vol. 3965, pp. 1-12, May 15, 2000.

Desaulniers, et al. "An Efficient Algorithm to find a shortest path for a car-like Robot", IEEE Transactions on robotics and Automation vol. 11 No. 6, pp. 819-828, Dec. 1995.

Dorfmüller-Ulhaas "Optical Tracking From User Motion to 3D Interaction", http://www.cg.tuwien.ac.at/research/publications/2002/Dorimueller-Ulhaas-thesis, 182 pages, 2002.

Dorsch, et al. "Laser Triangulation: Fundamental uncertainty in distance measurement", Applied Optics, vol. 33 No. 7, pp. 1306-1314, Mar. 1, 1994.

Yuta, et al. "Implementation of an Active Optical Range sensor Using Laser Slit for In-Door Intelligent Mobile Robot", IEE/RSJ International workshop on Intelligent Robots and systems (IROS 91) vol. 1, Osaka, Japan, pp. 415-420, Nov. 3-5, 1991.

Doty et al. "Sweep Strategies for a Sensory-Driven, Behavior-Based Vacuum Cleaning Agent", AAAI 1993 Fall Symposium Series, Instantiating Real-World Agents, pp. 1-6, Oct. 22-24, 1993 (NPL0129).

Euroflex Intelligente Monstre Mauele (English only except).

Dyson's Robot Vacuum Cleaner—the DC06, May 2, 2004 http://www.gizmag.com/go/1282/ accessed Novmber 11, 2011.

Electrolux Trilobite, http://www.electrolux-ui.com:8080/2002%5C822%5C833102EN.pdf 10 pages.

Electrolux Trilobite, Time to enjoy life, 38 pages http://www.robocon.co.kr/trilobite/Presentation_Trilobite_Kor_030104.ppt accessed Dec. 22, 2011.

Dudek, et al. "Localizing A Robot with Minimum Travel" Proceedings of the sixth annual ACM-SIAM symposium on Discrete algorithms, vol. 27 No. 2 pp. 583-604, Apr. 1998.

Facts on the Trilobite http://www.frc.ri.cmu.edu/~hpm/talks/Extras/trilobite.desc.html 2 pages accessed Nov. 1, 2011.

Euroflex Jan. 1, 2006 http://www.euroflex.tv/novita_dett.php?id=15 1 page accessed Nov. 1, 2011.

FloorBotics, VR-8 Floor Cleaning Robot, Product Description for Manufacturers, http://www.consensus.com.au/SoftwareAwards/CSAarchive/CSA2004/CSAart04/FloorBot/F.

CleanMate 365, Intelligent Automatic Vacuum Cleaner, Model No. QQ-1, User Manual www.metapo.com/support/user_manual.pdf 11 pages.

Dulimarta, et al. "Mobile Robot Localization in Indoor Environment", Pattern Recognition, vol. 30, No. 1, pp. 99-111, 1997.

EBay "Roomba Timer → Timed Cleaning—Floorvac Robotic Vacuum", Cgi.ebay.com/ws/eBaylSAP|.dll?viewitem&category=43526&item=4375198387&rd=1, 5 pages, Apr. 20, 2005.

Electrolux "designed for the well-lived home", http://www.electroluxusa.com/node57.as[?currentURL=nodel42.asp%3F, accessed Mar. 18, 2005, 5 pgs.

Electrolux "Welcome to the Electrolux trilobite" www.electroluxusa.com/node57.asp?currentURL=node142.asp%3F, 2 pages, Mar. 18, 2005.

Eren, et al. "Accuracy in position estimation of mobile robots based on coded infrared signal transmission", Proceedings: Integrating Intelligent Instrumentation and Control, Instrumentation and Measurement Technology Conference, 1995. IMTC/95. pp. 548-551, 1995.

Eren, et al. "Operation of Mobile Robots in a Structured Infrared Environment", Proceedings. 'Sensing, Processing, Networking', IEEE Instrumentation and Measurement Technology Conference, 1997 (IMTC/97), Ottawa, Canada vol. 1, pp. 20-25, May 19-21, 1997.

eVac Robotic Vacuum S1727 Instruction Manual, Sharper Image Corp, Copyright 2004, 16 pages.

Barker, "Navigation by the Star—Ben Barker 4th Year Project" Power point pp. 1-20.

Everyday Robots "Everyday Robots: Reviews, Discussion and News for Consumers", www.everydayrobots.com/index.php?option=content&task=view&id=9, Apr. 20, 2005, 7 pages.

Evolution Robotics "NorthStar—Low-cost Indoor Localiztion—How it Works", E Evolution robotics, 2 pages, 2005.

Becker, et al. "Reliable Navigation Using Landmarks" IEEE International Conference on Robotics and Automation, 0-7803-1965-6, pp. 401-406, 1995.

Benayad-Cherif, et al., "Mobile Robot Navigation Sensors" SPIE vol. 1831 Mobile Robots, VII, pp. 378-387, 1992.

Facchinetti, Claudio et al. "Using and Learning Vision-Based Self-Positioning for Autonomous Robot Navigation", ICARCV '94, vol. 3 pp. 1694-1698, 1994.
Betke, et al., "Mobile Robot localization using Landmarks" Proceedings of the IEEE/RSJ/GI International Conference on Intelligent Robots and Systems '94 "Advanced Robotic Systems and the Real World" (IROS '94), vol. 1994.
Facchinetti, Claudio et al. "Self-Positioning Robot Navigation Using Ceiling Images Sequences", ACCV '95, 5 pages, Dec. 5-8, 1995.
Facts on Trilobite webpage: http://trilobiteelectroluxse/presskit_en/model11335asp?print=yes&pressID= accessed Dec. 13, 2003, 2 pages.
Fairfield, Nathaniel et al. "Mobile Robot Localization with Sparse Landmarks", SPIE vol. 4573 pp. 148-155, 2002.
Favre-Bulle, Bernard "Efficient tracking of 3D—Robot Position by Dynamic Triangulation", IEEE Instrumentation and Measurement Technology Conference IMTC 98 Session on Instrumentation and Measurement in Robotics, vol. 1, pp. 446-449, May 18-21, 1998.
Fayman "Exploiting Process Integration and Composition in the context of Active Vision", IEEE Transactions on Systems, Man, and Cybernetics—Part C: Application and reviews, vol. 29 No. 1, pp. 73-86, Feb. 1999.
Bison, P. et al., "Using a structured beacon for cooperative position estimation" Robotics and Autonomous Systems vol. 29, No. 1, pp. 33-40, Oct. 1999.
Blaasvaer, et al. "AMOR—An Autonomous Mobile Robot Navigation System", Proceedings of the IEEE International Conference on Systems, Man, and Cybernetics, pp. 2266-2271, 1994.
Prassler et al., "A Short History of Cleaning Robots", Autonomous Robots 9, 211-226, 2000, 16 pages.
Put Your Roomba . . . On "Automatic" webpages: "http://www.acomputeredge.com/roomba," accessed Apr. 20, 2005, 5 pages.
Radio Frequency Identification: Tracking ISS Consumables, Author Unknown, 41 pages (NPL0127).
Remazeilles, et al. "Image based robot navigation in 3D environments", Proc. of SPIE, vol. 6052, pp. 1-14, Dec. 6, 2005.
Rives, et al. "Visual servoing based on ellipse features", SPIE vol. 2056 Intelligent Robots and Computer Vision pp. 356-367, 1993.
Robotics World Jan. 2001: "A Clean Sweep" (Jan. 2001).
RoboMaid Sweeps Your Floors So You Won't Have to, the Official Site, website: http://therobomaid.com/, accessed Mar. 18, 2005, 2 pages.
Robot Review Samsung Robot Vacuum (VC-RP30W), website: http://www.onrobo.com/review/At_Home/Vacuum_Cleaners/on00vcrp30rosam/index.htm, accessed Mar. 18, 2005, 11 pages.
Robotic Vacuum Cleaner-Blue website: http://www.shaperimage.com/us/en/catalog/productview.jhtml?sku=S1727BLU, accessed Mar. 18, 2005, 3 pages.
Ronnback "On Methods for Assistive Mobile Robots", http://www.openthesis.org/documents/methods-assistive-mobile-robots-595019.html, 218 pages, Jan. 1, 2006.
Roth-Tabak, et al. "Environment Model for mobile Robots Indoor Navigation", SPIE vol. 1388 Mobile Robots pp. 453-463, 1990.
Sadath M Malik et al. "Virtual Prototyping for Conceptual Design of a Tracked Mobile Robot". Electrical and Computer Engineering, Canadian Conference on, IEEE, Pl. May 1, 2006, pp. 2349-2352.
Sahin, et al. "Development of a Visual Object Localization Module for Mobile Robots", 1999 Third European Workshop on Advanced Mobile Robots, (Eurobot '99), pp. 65-72, 1999.
Salomon, et al. "Low-Cost Optical Indoor Localization system for Mobile Objects without Image Processing", IEEE Conference on Emerging Technologies and Factory Automation, 2006. (ETFA '06), pp. 629-632, Sep. 20-22, 2006.
Sato "Range Imaging Based on Moving Pattern Light and Spatio-Temporal Matched Filter", Proceedings International Conference on Image Processing, vol. 1, Lausanne, Switzerland, pp. 33-36, Sep. 16-19, 1996.
Schenker, et al. "Lightweight rovers for Mars science exploration and sample return", Intelligent Robots and Computer Vision XVI, SPIE Proc. 3208, pp. 24-36, 1997.
Schofield Monica "Neither Master Nor slave" A Practical Study in the Development and Employment of Cleaning Robots, Emerging Technologies and Factory Automation, 1999 Proceedings ETFA '99 1999 7th IEEE International Conference on Barcelona, Spain, Oct. 18-21, 1999, pp. 1427-1434.
Sebastian Thrun, Learning Occupancy Grid Maps With Forward Sensor Models, School of Computer Science, Carnegie Mellon University, pp. 1-28.
Shimoga et al. "Touch and Force Reflection for Telepresence Surgery", Engineering in Medicine and Biology Society, 1994. Engineering Advances: New Opportunities for Biomedical Engineers. Proceedings of the 16th Annual International Conference of the IEEE, Baltimore, MD, pp. 1049-1050, 1994.
Sim, et al "Learning Visual Landmarks for Pose Estimation", IEEE International Conference on Robotics and Automation, vol. 3, Detroit, MI, pp. 1972-1978, May 10-15, 1999.
Sobh et al. "Case Studies in Web-Controlled Devices and Remote Manipulation", Automation Congress, 2002 Proceedings of the 5th Biannual World, pp. 435-440, Dec. 10, 2002.
Stella, et al. "Self-Location for Indoor Navigation of Autonomous Vehicles", Part of the SPIE conference on Enhanced and Synthetic Vision SPIE vol. 3364 pp. 298-302, 1998.
Summet "Tracking Locations of Moving Hand-held Displays Using Projected Light", Pervasive 2005, LNCS 3468 pp. 37-46 (2005).
Svedman et al. "Structure from Stereo Vision using Unsynchronized Cameras for Simultaneous Localization and Mapping", 2005 IEEE/RSJ International Conference on Intelligent Robots and Systems, pp. 2993-2998, 2005.
Takio et al. "Real-Time Position and Pose Tracking Method of Moving Object Using Visual Servo System", 47th IEEE International Symposium on Circuits and Systems, pp. 167-170, 2004.
Teller "Pervasive pose awareness for people, Objects and Robots", http://www.ai.mit.edu/lab/dangerous-ideas/Spring2003/teller-pose.pdf, 6 pages, Apr. 30, 2003.
Terada et al. "An Acquisition of the Relation between Vision and Action using Self-Organizing Map and Reinforcement Learning", 1998 Second International Conference on Knowledge-Based Intelligent Electronic Systems, Adelaide, Australiam pp. 429-434, Apr. 21-23, 1998.
The Sharper Image "e-Vac Robotic Vacuum, S1727 Instructions"www.sharperimage.com, 18 pages.
The Sharper Image "Robotic Vacuum Cleaner—Blue" www.Sharperimage.com, 2 pages, Mar. 18, 2005.
The Sharper Image "E Vac Robotic Vacuum", www.sharperiamge.com/us/en/templates/products/pipmorework1printable.jhtml, 2 pages, Mar. 18, 2005.
TheRobotStore.com "Friendly Robotics Robotic Vacuum RV400—The Robot Store", www.therobotstore.com/s.nl/sc.9/category.-109/it.A/id.43/1, 1 page, Apr. 20, 2005.
TotalVac.com RC3000 RoboCleaner website Mar. 18, 2005.
Trebi-Ollennu et al. "Mars Rover Pair Cooperatively Transporting a Long Payload", Proceedings of the 2002 IEEE International Conference on Robotics & Automation, Washington, D.C. pp. 3136-3141, May 2002.
Tribelhorn et al., "Evaluating the Roomba: A low-cost, ubiquitous platform for robotics research and education," 2007, IEEE, p. 1393-1399.
Tse et al. "Design of a Navigation System for a Household Mobile Robot Using Neural Networks", Department of Manufacturing Engg. & Engg. Management, City University of Hong Kong, pp. 2151-2156, 1998.
UAMA (Asia) Industrial Co., Ltd. "RobotFamily", 2005.
Watanabe et al. "Position Estimation of Mobile Robots With Internal and External Sensors Using Uncertainty Evolution Technique", 1990 IEEE International Conference on Robotics and Automation, Cincinnati, OH, pp. 2011-2016, May 13-18, 1990.
Watts "Robot, boldly goes where no man can", The Times- pp. 20, Jan. 1985.
Wijk et al. "Triangulation-Based Fusion of Sonar Data with Application in Robot Pose Tracking ", IEEE Transactions on Robotics and Automation, vol. 16, No. 6, pp. 740-752, Dec. 2000.
Wired News: Robot Vacs are in the House, website: http://www.wired.com/news/print/0,1294,59237,00.html, accessed Mar. 18, 2005, 6 pages.

Wolf et al. "Robust Vision-based Localization for Mobile Robots Using an Image Retrieval System Based on Invariant Features", Proceedings of the 2002 IEEE International Conference on Robotics & Automation, Washington, D.C. pp. 359-365, May 2002.
Roboking—not just a vacuum cleaner, a robot! Jan. 21, 2004, 5 pages.
Robovacc1999.
SVET Computers—New Technologies—Robot vacuum cleaner, 1 page.
Popco.net Make your digital life http://www.popco.net/zboard/view.php?id=tr_review&no=40 accessed Nov. 1, 2011.
Robot Buying Guide, LG announces the first robotic vacuum cleaner for Korea, Apr. 21, 2003 http://robotbg.com/news12003/04122/lg_announces_the_first_robotic_vacu.
UBOT, cleaning robot capable of wiping with a wet duster, http://us.aving.net/news/view.php?articleId=23031, 4 pages accessed Nov. 1, 2011.
Taipei Times, Robotic vacuum by Matsuhita about of undergo testing, Mar. 26, 2002 http://www.taipeitimes.com/News/worldbiz/archives/2002/03/2610000129338 accessed.
Tech-on! http://techon.nikkeibp.co.jp/members/01db/200203/1006501/, 4 pages, accessed Nov. 1, 2011.
Special Reports, Vacuum Cleaner Robot Operated in Conjunction with 3G Celluar Phone vol. 59, No. 9 (2004) 3 pages http://www.toshiba.co.jp/tech/review/2004/09/59_0, 2004.
Andersen et al., "Landmark based navigation strategies", SPIE Conference on Mobile Robots XIII, SPIE vol. 3525, pp. 170-181, Jan. 8, 1999.
Ascii, Mar. 25, 2002, http://ascii.jp/elem/000/000/330/330024/ accessed Nov. 1, 2011.
Certified copy of U.S. Appl. No. 60/605,066 as provided to WIPO in PCT/US2005/030422, corresponding to U.S. Appl. No. 11/574,290, U.S. publication 2008/0184518, filing date Aug. 27, 2004.
Certified copy of U.S. Appl. No. 60/605,181 as provided to WIPO in PCT/US2005/030422, corresponding to U.S. Appl. No. 11/574,290, U.S. publication 2008/0184518, filing date Aug. 27, 2004.
Derek Kurth, "Range-Only Robot Localization and SLAM with Radio", http://www.ri.cmu.edu/pub_files/pub4/kurth_derek_2004_1/kurth_derek_2004_1.pdf. 60 pages, May 2004, accessed Jul. 27, 2012.
Electrolux Trilobite, Jan. 12, 2001, http://www.electrolux-ui.com:8080/2002%5C822%5C833102EN.pdf, accessed Jul. 2, 2012, 10 pages.
Florbot GE Plastics, 1989-1990, 2 pages, available at http://fuseid.com/, accessed Sep. 27, 2012.
Gregg et al., "Autonomous Lawn Care Applications," 2006 Florida Conference on Recent Advances in Robotics, Miami, Florida, May 25-26, 2006, Florida International University, 5 pages.
Hitachi 'Feature', http://kadenfan.hitachi.co.jp/robot/feature/feature.html, 1 page, Nov. 19, 2008.
Hitachi, http://www.hitachi.co.jp/New/cnews/hi_030529_hi_030529.pdf, 8 pages, May 29, 2003.
Home Robot—UBOT; Microbotusa.com, retrieved from the WWW at www.microrobotusa.com, accessed Dec. 2, 2008
King and Weiman, "Helpmate™ Autonomous Mobile Robots Navigation Systems," SPIE vol. 1388 Mobile Robots, pp. 190-198 (1990).
Li et al. "Robust Statistical Methods for Securing Wireless Localization in Sensor Networks," Information Procesing in Sensor Networks, 2005, Fourth International Symposium on, pp. 91-98, Apr. 2005.
Martishevcky, "The Accuracy of point light target coordinate determination by dissectoral tracking system", SPIE vol. 2591, pp. 25-30, Oct. 23, 2005.
Maschinemarkt Würzburg 105, Nr. 27, pp. 3, 30, Jul. 5, 1999.
Miwako Doi "Using the symbiosis of human and robots from approaching Research and Development Center," Toshiba Corporation, 16 pages, available at http://warp.ndl.go.jp/info:ndljp/pid/258151/www.soumu.go.jp/joho_tsusin/policyreports/chousa/netrobot/pdf/030214_1_33_a.pdf, Feb. 26, 2003.
Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.f/~paromt/infos/papers/paromtchik:asama:sci:2000.ps.gz, accessed Jul. 3, 2012.
Roboking—not just a vacuum cleaner, a robot!, Jan. 21, 2004, infocom.uz/2004/01/21/robokingne-prosto-pyilesos-a-robot/, accessed Oct. 10, 2011, 7 pages.
Sebastian Thrun, "Learning Occupancy Grid Maps With Forward Sensor Models," Autonomous Robots 15, 111-127, Sep. 1, 2003.
SVET Computers—New Technologie—Robot Vacuum Cleaner, Oct., 1999, available at http://www.sk.rs/1999/10/sknt01.html, accessed Nov. 1, 2011.
Written Opinion of the International Searching Authority, PCT/US2004/001504, Aug. 20, 2012, 9 pages.
Jarosiewicz et al. "Final Report—Lucid", University of Florida, Departmetn of Electrical and Computer Engineering, EEL 5666—Intelligent Machine Design Laboratory, 50 pages, Aug. 4, 1999.
Jensfelt, et al. "Active Global Localization for a mobile robot using multiple hypothesis tracking", IEEE Transactions on Robots and Automation vol. 17, No. 5, pp. 748-760, Oct. 2001.
Jeong, et al. "An intelligent map-building system for indoor mobile robot using low cost photo sensors", SPIE vol. 6042 6 pages, 2005.
Kahney, "Robot Vacs are in the House," www.wired.com/news/technology/o,1282,59237,00.html, 6 pages, Jun. 18, 2003.
Karcher "Product Manual Download Karch", www.karcher.com, 17 pages, 2004.
Karcher Product Manual Download webpage: http://www.karcher.com/bta/download.en.shtml?ACTION=SELECTTEILENR&ID=rc3000&submitButtonName=Select+Product+Manual and associated .pdf file "5959-915en.pdf (4.7 MB) English/English" accessed Jan. 21, 2004 (16 pages).
Karcher "Karcher RoboCleaner RC 3000", www.robocleaner.de/english/screen3.html, 4 pages, Dec. 12, 2003.
Karcher USA "RC 3000 Robotics cleaner", www.karcher-usa.com, 3 pages, Mar. 18, 2005.
Karcher RC 3000 Cleaning Robot-user manual Manufacturer: Alfred-Karcher GmbH & Co, Cleaning Systems, Alfred Karcher-Str 28-40, PO Box 160, D-71349 Winnenden, Germany, Dec. 2002.
Karcher RoboCleaner RC 3000 Product Details, webpages: "http://wwwrobocleaner.de/english/screen3.html" through ". . . screen6.html" Dec. 12, 2003, 4 pages.
Karcher USA, RC3000 Robotic Cleaner, website: http://www.karcher-usa.com/showproducts.php?op=view prod¶m1=143&param2=&param3=, accessed Mar. 18, 2005, 6 pages.
Karlsson et al., The vSLAM Algorithm for Robust Localization and Mapping, Proceedings of the 2005 IEEE International Conference on Robotics and Automation, Barcelona, Spain, pp. 24-29, Apr. 2005.
Karlsson, et al Core Technologies for service Robotics, IEEE/RSJ International Conference on Intelligent Robots and Systems (IROS 2004), vol. 3, pp. 2979-2984, Sep. 28-Oct. 2, 2004.
King "Heplmate-TM—Autonomous mobile Robots Navigation Systems", SPIE vol. 1388 Mobile Robots pp. 190-198, 1990.
Kleinberg, The Localization Problem for Mobile Robots, Laboratory for Computer Science, Massachusetts Institute of Technology, 1994 IEEE, pp. 521-531, 1994.
Knight, et al., "Localization and Identification of Visual Landmarks", Journal of Computing Sciences in Colleges, vol. 16 Issue 4, 2001 pp. 312-313, May 2001.
Kolodko et al. "Experimental System for Real-Time Motion Estimation", Proceedings of the 2003 IEEE/ASME International Conference on Advanced Intelligent Mechatronics (AIM 2003), pp. 981-986, 2003.
Komoriya et al., Planning of Landmark Measurement for the Navigation of a Mobile Robot, Proceedings of the 1992 IEEE/RSJ International Cofnerence on Intelligent Robots and Systems, Raleigh, NC pp. 1476-1481, Jul. 7-10, 1992.
koolvac Robotic Vacuum Cleaner Owner's Manual, Koolatron, Undated, 26 pages.
Koolatron "KOOLVAC—Owner's Manual", 13 pages.
Krotov, et al. "Digital Sextant", Downloaded from the internet at: http://www.cs.cmu.edu/~epk/, 1 page, 1995.
Krupa et al., IEEE "Autonomous 3-D Positioning of Surgical Instruments in Robotized Laparoscopic Surgery Using Visual Servoing", IEEE Transactions on Robotics and Automation, vol. 19, No. 5, pp. 842-853, Oct. 5, 2003.

Kuhl, et al. "Self Localization in Environments using Visual Angles", VRCAI '04 Proceedings of the 2004 ACM SIGGRAPH international conference on Virtual Reality continuum and its applications in industry, pp. 472-475, 2004.

Friendly Robotics, 18 pages http://www.robotsandrelax.com/PDFs/RV400Manual.pdf accessed Dec. 22, 2011.

It's eye, 2003 www.hitachi.co.jp/rd/pdf/topics/hitac2003_10.pdf 2 pages.

http://ascii.jp/elem/000/000/330/330024/.

IT media http://www.itmedia.co.jp/news/0111/16/robofesta_m.html accessed Nov. 1, 2011.

Grumet "Robots Clean House", Popular Mechanics, N0vember 2003.

Kurs et al, Wireless Power transfer via Strongly Coupled Magnetic Resonances, Downloaded from www.sciencemag.org, Aug. 17, 2007.

Florbot GE Plastics Image (1989-1990).

Franz, et al. "Biomimetric robot navigation", Robotics and Autonomous Systems vol. 30 pp. 133-153, 2000.

Friendly Robotics "Friendly Robotics—Friendly Vac, Robotic Vacuum Cleaner", www.friendlyrobotics.com/vac.htm. 5 pages, Apr. 20, 2005.

Friendly Robotics Robotic Vacuum RV400—The Robot Store website: www.therobotstore.com/s.nl/sc.9/category,-109/it.A/id.43/.f, accessed Apr. 20, 2005, 5 pages.

Fuentes, et al. "Mobile Robotics 1994", University of Rochester. Computer Science Department, TR 588, 44 pages, Dec. 7, 1994.

Fukuda, et al. "Navigation System based on Ceiling Landmark Recognition for Autonomous mobile robot", 1995 IEEE/RSJ International Conference on Intelligent Robots and Systems 95. 'Human Robot Interaction and Cooperative Robots', Pittsburgh, PA, pp. 1466/1471, Aug. 5-9, 1995.

Gat, Erann "Robust Low-Computation Sensor-driven Control for Task-Directed Navigation", Proc Of IEEE International Conference on robotics and Automation , Sacramento, CA pp. 2484-2489, Apr. 1991.

Gionis"A hand-held optical surface scanner for environmental Modeling and Virtual Reality", Virtual Reality World, 16 pages 1996.

Goncalves et al. "A Visual Front-End for Simultaneous Localization and Mapping", Proceedings of the 2005 IEEE International Conference on Robotics and Automation, Barcelona, Spain, pp. 44-49, Apr. 2005.

Gregg et al. "Autonomous Lawn Care Applications", 2006 Florida Conference on Recent Advances in Robotics, FCRAR 2006, pp. 1-5, May 25-26, 2006.

Hamamatsu "SI PIN Diode S5980, S5981 S5870—Multi-element photodiodes for surface mounting", Hamatsu Photonics, 2 pages Apr. 2004.

Hammacher Schlemmer "Electrolux Trilobite Robotic Vacuum" www.hammacher.com/publish/71579.asp? promo=xsells, 3 pages Mar. 18, 2005.

Haralick et al. " Pose Estimation from Corresponding Point Data", IEEE Transactions on systems, Man, and Cybernetics, vol. 19, No. 6, pp. 1426-1446, Nov. 1989.

Hausler "About the Scaling Behaviour of Optical Range Sensors", Fringe '97, Proceedings of the 3rd International Workshop on Automatic Processing of Fringe Pattern, Bremen, Germany, pp. 147-155. Sep. 15-17, 1997.

Hitachi "Feature", http://kadenfan.hitachi.co.jp/robot/feature/feature.html , 1 page Nov. 19, 2008.

Hitachi: News release: "The home cleaning robot of the autonomous movement type (experimental machine)", www.i4u.com./japanreleases/hitachirobot.htm, 5 pages, Mar. 18, 2005.

Hoag, et al. "Navigation and Guidance in interstellar space", ACTA Astronautica vol. 2, pp. 513-533, Feb. 14, 1975.

Home Robot—UBOT; Microbotusa.com, retrieved from the WWW at www.microrobotusa.com, accessed Dec. 2, 2008.

Huntsberger et al. "CAMPOUT: A Control Architecture for Tightly Coupled Coordination of Multirobot Systems for Planetary Surface Exploration", IEEE Transactions on Systems, Man, and Cybernetics—Part A: Systems and Humans, vol. 33, No. 5, pp. 550-559, Sep. 2003.

Iirobotics.com "Samsung Unveils Its Multifunction Robot Vacuum", www.iirobotics.com/webpages/hotstuff.php?ubre=111, 3 pages, Mar. 18, 2005.

InMach "Intelligent Machines", www.inmach.de/inside.html, 1 page, Nov. 19, 2008.

Kurth, "Range-Only Robot Localization and Slam with Radio", http://www.ri.cmu.edu/pub_files/pub4/kurth_derek_2004_1/kurth_derek_2004_1.pdf. 60 pages, May 2004.

Lambrinos, et al. "A mobile robot employing insect strategies for navigation", http://www8.cs.umu.se/kurser/TDBD17/VT04/dl/Assignment%20Papers/lambrinos-RAS-2000.pdf, 38 pages, Feb. 19, 1999.

Lang et al. "Visual Measurement of Orientation Using Ceiling Features", 1994 IEEE, pp. 552-555, 1994.

Lapin, "Adaptive position estimation for an automated guided vehicle", SPIE vol. 1831 Mobile Robots VII, pp. 82-94, 1992.

Morland,"Autonomous Lawnmower Control", Downloaded from the internet at: http://cns.bu.edu/~cjmorlan/robotics/lawnmower/report.pdf, 10 pages, Jul. 24, 2002.

LaValle et al. "Robot Motion Planning in a Changing, Partially Predictable Environment", 1994 IEEE International Symposium on Intelligent Control, Columbus, OH, pp. 261-266, Aug. 16-18, 1994.

Lee, et al. "Localization Of a Mobile Robot Using the Image of a Moving Object", IEEE Transaction on Industrial Electronics, vol. 50, No. 3 pp. 612-619, Jun. 2003.

Lee, et al. "Development of Indoor Navigation system for Humanoid Robot Using Multi-sensors Integration", ION NTM, San Diego, CA pp. 798-805, Jan. 22-24, 2007.

Leonard, et al. "Mobile Robot Localization by tracking Geometric Beacons", IEEE Transaction on Robotics and Automation, vol. 7, No. 3 pp. 376-382, Jun. 1991.

Li et al. "Robost Statistical Methods for Securing Wireless Localization in Sensor Networks", Wireless Information Network Laboratory, Rutgers University.

Li et al. "Making a Local Map of Indoor Environments by Swiveling a Camera and a Sonar", Proceedings of the 1999 IEEE/RSJ International Conference on Intelligent Robots and Systems, pp. 954-959, 1999.

Lin, et al. "Mobile Robot Navigation Using Artificial Landmarks", Journal of robotics System 14(2). pp. 93-106, 1997.

Linde "Dissertation, "On Aspects of Indoor Localization""" https://eldorado.tu-dortmund.de/handle/2003/22854, University of Dortmund, 138 pages, Aug. 28, 2006.

Lumelsky, et al. "An Algorithm for Maze Searching with Azimuth Input", 1994 IEEE International Conference on Robotics and Automation, San Diego, CA vol. 1, pp. 111-116, 1994.

Luo et al., "Real-time Area-Covering Operations with Obstacle Avoidance for Cleaning Robots," 2002, IEeE, p. 2359-2364.

Ma "Thesis: Documentation On Northstar", California Institute of Technology, 14 pages, May 17, 2006.

Madsen, et al. "Optimal landmark selection for triangulation of robot position", Journal of Robotics and Autonomous Systems vol. 13 pp. 277-292, 1998.

Martishevcky, "The Accuracy of point light target coordinate determination by dissectoral tracking system", SPIE vol. 2591 pp. 25-30.

Matsutek Enterprises Co. Ltd "Automatic Rechargeable Vacuum Cleaner", http://matsutek.manufacturer.globalsources.com/si/6008801427181/pdtl/Home-vacuum/10 . . . , Apr. 23, 2007.

McGillem, et al. "Infra-red Lacation System for Navigation and Autonomous Vehicles", 1988 IEEE International Conference on Robotics and Automation, vol. 2, pp. 1236-1238, Apr. 24-29, 1988.

McGillem,et al. "A Beacon Navigation Method for Autonomous Vehicles", IEEE Transactions on Vehicular Technology, vol. 38, No. 3, pp. 132-139, Aug. 1989.

Michelson "Autonomous Navigation", 2000 Yearbook of Science & Technology, McGraw-Hill, New York, ISBN 0-07-052771-7, pp. 28-30, 1999.

Miro, et al. "Towards Vision Based Navigation in Large Indoor Environments", Proceedings of the IEEE/RSJ International Conference on Intelligent Robots and Systems, Beijing, China, pp. 2096-2102, Oct. 9-15, 2006.

MobileMag "Samsung Unveils High-tech Robot Vacuum Cleaner", http://www.mobilemag.com/content/100/102/C2261/, 4 pages, Mar. 18, 2005.
Monteiro, et al. "Visual Servoing for Fast Mobile Robot: Adaptive Estimation of Kinematic Parameters", Proceedings of the IECON '93, International Conference on Industrial Electronics, Maui, HI, pp. 1588-1593, Nov. 15-19, 1993.
Moore, et al. A simple Map-bases Localization strategy using range measurements, SPIE vol. 5804 pp. 612-620, 2005.
Munich et al. "SIFT-ing Through Features with ViPR", IEEE Robotics & Automation Magazine, pp. 72-77, Sep. 2006.
Munich et al. "ERSP: A Software Platform and Architecture for the Service Robotics Industry", Intelligent Robots and Systems, 2005. (IROS 2005), pp. 460-467, Aug. 2-6, 2005.
Nam, et al. "Real-Time Dynamic Visual Tracking Using Psd Sensors and extended Trapezoidal Motion Planning", Applied Intelligence 10, pp. 53-70, 1999.
Nitu et al. "Optomechatronic System for Position Detection of a Mobile Mini-Robot", IEEE Ttransactions on Industrial Electronics, vol. 52, No. 4, pp. 969-973, Aug. 2005.
On Robo "Robot Reviews Samsung Robot Vacuum (VC-RP3OW)", www.onrobo.com/reviews/AT_Home/vacuum_cleaners/on00vcrb30rosam/index.htm. 2 pages, 2005.
OnRobo "Samsung Unveils Its Multifunction Robot Vacuum", www.onrobo.com/enews/0210/samsung_vacuum.shtml, 3 pages, Mar. 18, 2005.
Pages et al. "Optimizing Plane-to-Plane Positioning Tasks by Image-Based Visual Servoing and Structured Light", IEEE Transactions on Robotics, vol. 22, No. 5, pp. 1000-1010, Oct. 2006.
Pages et al. "A camera-projector system for robot positioning by visual servoing", Proceedings of the 2006 Conference on Computer Vision and Pattern Recognition Workshop (CVPRW06), 8 pages, Jun. 17-22, 2006.
Pages, et al. "Robust decoupled visual servoing based on structured light", 2005 IEEE/RSJ Int. Conf. on Intelligent Robots and Systems, pp. 2676-2681, 2005.
Park et al. "A Neural Network Based Real-Time Robot Tracking Controller Using Position Sensitive Detectors," IEEE World Congress on Computational Intelligence, 1994 IEEE International Conference on Neutral Networks, Orlando, Florida pp. 2754-2758, Jun. 27-Jul. 2, 1994.
Park, et al. "Dynamic Visual Servo Control of Robot Manipulators using Neutral Networks", The Korean Institute Telematics and Electronics, vol. 29-B, No. 10, pp. 771-779, Oct. 1992.
Paromtchik "Toward Optical Guidance of Mobile Robots".
Paromtchik, et al. "Optical Guidance System for Multiple mobile Robots", Proceedings 2001 ICRA. IEEE International Conference on Robotics and Automation, vol. 3, pp. 2935-2940 (May 21-26, 2001).
Penna, et al. "Models for Map Building and Navigation", IEEE Transactions on Systems. Man. And Cybernetics. vol. 23 No. 5, pp. 1276-1301, Sep./Oct. 1993.
Pirjanian "Reliable Reaction", Proceedings of the 1996 IEEE/SICE/RSJ International Conference on Multisensor Fusion and Integration for Intelligent Systems, pp. 158-165, 1996.
Pirjanian "Challenges for Standards for consumer Robotics", IEEE Workshop on Advanced Robotics and its Social impacts, pp. 260-264, Jun. 12-15, 2005.
Pirjanian et al. "Distributed Control for a Modular, Reconfigurable Cliff Robot", Proceedings of the 2002 IEEE International Conference on Robotics & Automation, Washington, D.C. pp. 4083-4088, May 2002.
Pirjanian et al. "Representation and Execution of Plan Sequences for Multi-Agent Systems", Proceedings of the 2001 IEEE/RSJ International Conference on Intelligent Robots and Systems, Maui, Hawaii, pp. 2117-2123, Oct. 29-Nov. 3, 2001.
Pirjanian et al. "Multi-Robot Target Acquisition using Multiple Objective Behavior Coordination", Proceedings of the 2000 IEEE International Conference on Robotics & Automation, San Francisco, CA, pp. 2696-2702, Apr. 2000.
Pirjanian et al. "A decision-theoretic approach to fuzzy behavior coordination", 1999 IEEE International Symposium on Computational Intelligence in Robotics and Automation, 1999. CIRA '99, Monterey, CA, pp. 101-106, Nov. 8-9, 1999.
Pirjanian et al. "Improving Task Reliability by Fusion of Redundant Homogeneous Modules Using Voting Schemes", Proceedings of the 1997 IEEE International Conference on Robotics and Automation, Albuquerque, NM, pp. 425-430, Apr. 1997.
Matsumura Camera Online Shop http://www.rakuten.co.jp/matsucame/587179/711512/ accessed Nov. 1, 2011.
McLurkin "The Ants: A community of Microrobots", Paper submitted for requirements of BSEE at MIT, May 12, 1995.
McLurkin Stupid Robot Tricks: A Behavior-based Distributed Algorithm Library for Programming Swarms of Robots, Paper submitted for requirements of BSEE at MIT, May 2004.
Wolf et al. "Robust Vision-Based Localization by Combining an Image-Retrieval System with Monte Carol Localization", IEEE Transactions on Robotics, vol. 21, No. 2, pp. 208-216, Apr. 2005.
Wong "EIED Online>> Robot Business", ED Online ID# 13114, 17 pages, Jul. 2006.
Yamamoto et al. "Optical Sensing for Robot Perception and Localization", 2005 IEEE Workshop on Advanced Robotics and its Social Impacts, pp. 14-17, 2005.
Yata et al. "Wall Following Using Angle Information Measured by a Single Ultrasonic Transducer", Proceedings of the 1998 IEEE, International Conference on Robotics & Automation, Leuven, Belgium, pp. 1590-1596, May 1998.
Yun, et al. "Image-Based Absolute Positioning System for Mobile Robot Navigation", IAPR International Workshops SSPR, Hong Kong, pp. 261-269, Aug. 17-19, 2006.
Yun, et al. "Robust Positioning a Mobile Robot with Active Beacon Sensors", Lecture Notes in Computer Science, 2006, vol. 4251, pp. 890-897, 2006.
Zha et al. "Mobile Robot Localization Using Incomplete Maps for Change Detection in a Dynamic Environment", Advanced Intelligent Mechatronics '97. Final Program and Abstracts., IEEE/ASME International Conference, pp. 110, Jun. 16-20, 1997.
Zhang, et al. "A Novel Mobile Robot Localization Based on Vision", SPIE vol. 6279, 6 pages Jan. 29, 2007.
Zoombot Remote Controlled Vaccuum-RV-500 New Roomba 2, website: http://cgi.ebay.com/ws/eBaylSAPl.dll?ViewItem&category=43526&item=4373497618&rd=1, accessed Apr. 20, 2005, 7 pages.
Yujin Robotics, an intelligent cleaning robot 'iclebo Q' AVING USA http://us.aving.net/newslview.php?articleId=7257, 8 pages accessed Nov. 4, 2011.

* cited by examiner

DETECT LEFT AND RIGHT DEBRIS SIGNALS REPRESENTATIVE OF INSTANTANEOUS DEBRIS STRIKES/PRESENCE/QUANTITY/VOLUME/ DIRECTION OF/VECTOR TO DEBRIS OR DEBRIS FIELD, 802

→ SELECT OPERATIONAL MODE OR PATTERN OF MOVEMENT (e.g., SPOT MODE) BASED ON DEBRIS SIGNAL VALUES, 804

→ SELECT DIRECTION OF MOVEMENT BASED ON DIFFERENTIAL (LEFT/RIGHT) SIGNAL VALUES (e.g., STEERING TOWARD SIDE WITH MORE DEBRIS), 806

→ GENERATE USER PERCEPTIBLE SIGNAL (e.g., ILLUMINATE AN LED OR LIGHT), 808

→ VARY OR CONTROL OPERATIONAL CONDITION (POWER/OTHER), 810

→ CALCULATE DEBRIS GRADIENT AND CONTROL MOVEMENT, 812

FIG. 8

DEBRIS SENSOR FOR CLEANING APPARATUS

CROSS-REFERENCE TO RELATED PATENT DOCUMENTS

This application for patent is a continuation of, and claims priority from U.S. patent application Ser. No. 12/255,393, filed on Oct. 21, 2008, which is a continuation of and claims priority from U.S. patent application Ser. No. 11/860,272, filed on Sep. 24, 2007, now U.S. Pat. No. 7,459,871, which is a continuation of and claims priority from U.S. patent application Ser. No. 11/533,294, filed Sep. 19, 2006 (now U.S. Pat. No. 7,288,912), which is a continuation of and claims priority from U.S. patent application Ser. No. 11/109,832 filed Apr. 19, 2005, which is a continuation of and claims priority from U.S. patent application Ser. No. 10/766,303, filed Jan. 28, 2004 (now U.S. Pat. No. 6,956,348). This application is related to the following commonly-owned U.S. patent applications or patents, incorporated by reference as if fully set forth herein:

U.S. patent application Ser. No. 09/768,773 filed Jan. 24, 2001, now U.S. Pat. No. 6,594,844, entitled Robot Obstacle Detection System; U.S. Provisional Patent Application Ser. No. 60/345,764 filed Jan. 3, 2002, entitled Cleaning Mechanisms for Autonomous Robot; U.S. patent application Ser. No. 10/056,804, filed Jan. 24, 2002, entitled Method and System for Robot Localization and Confinement; U.S. patent application Ser. No. 10/167,851 filed Jun. 12, 2002, entitled Method and System for Multi-Mode Coverage for an Autonomous Robot; U.S. patent application Ser. No. 10/320,729 filed Dec. 16, 2002, entitled Autonomous Floor-Cleaning Robot; and U.S. patent application Ser. No. 10/661,835 filed Sep. 12, 2003, entitled Navigational Control System for Robotic Device.

FIELD OF THE INVENTION

The present invention relates generally to cleaning apparatus, and, more particularly, to a debris sensor for sensing instantaneous strikes by debris in a cleaning path of a cleaning apparatus, and for enabling control of an operational mode of the cleaning apparatus. The term "debris" is used herein to collectively denote dirt, dust, and/or other particulates or objects that might be collected by a vacuum cleaner or other cleaning apparatus, whether autonomous or non-autonomous.

BACKGROUND OF THE INVENTION

Debris sensors, including some suitable for cleaning apparatus, are known in the art. Debris sensors can be useful in autonomous cleaning devices like those disclosed in the above-referenced patent applications, and can also be useful in non-autonomous cleaning devices, whether to indicate to the user that a particularly dirty area is being entered, to increase a power setting in response to detection of debris, or to modify some other operational setting.

Examples of debris sensors are disclosed in the following:

| | |
|---|---|
| De Brey | 3,674,316 |
| De Brey | 3,989,311 |
| De Brey | 4,175,892 |
| Kurz | 4,601,082 |
| Westergren | 4,733,430 |
| Martin | 4,733,431 |
| Harkonen | 4,829,626 |
| Takashima | 5,105,502 |
| Takashima | 5,136,750 |
| Kawakami | 5,163,202 |
| Yang | 5,319,827 |
| Kim | 5,440,216 |
| Gordon | 5,608,944 |
| Imamura | 5,815,884 |
| Imamura | 6,023,814 |
| Kasper | 6,446,302 |
| Gordon | 6,571,422 |

Among the examples disclosed therein, many such debris sensors are optical in nature, using a light emitter and detector. In typical designs used in, e.g., a vacuum cleaner, the light transmitter and the light receiver of the optical sensor are positioned such that they are exposed into the suction passage or cleaning pathway through which dust flows. During usage of the vacuum cleaner, therefore, dust particles tend to adhere to the exposed surfaces of the light transmitter and the light receiver, through which light is emitted and detected, eventually degrading the performance of the optical sensor.

Accordingly, it would be desirable to provide a debris sensor that is not subject to degradation by accretion of debris.

In addition, debris sensors typical of the prior art are sensitive to a level of built-up debris in a reservoir or cleaning pathway, but not particularly sensitive to instantaneous debris strikes or encounters.

It would therefore be desirable to provide a debris sensor that is capable of instantaneously sensing and responding to debris strikes, and which is immediately responsive to debris on a floor or other surface to be cleaned, with reduced sensitivity to variations in airflow, instantaneous power, or other operational conditions of the cleaning device.

It would be also be useful to provide an autonomous cleaning device having operational modes, patterns of movement or behaviors responsive to detected debris, for example, by steering the device toward "dirtier" areas based on signals generated by a debris sensor.

In addition, it would be desirable to provide a debris sensor that could be used to control, select or vary operational modes of either an autonomous or non-autonomous cleaning apparatus.

SUMMARY OF THE INVENTION

The present invention provides a debris sensor, and apparatus utilizing such a debris sensor, wherein the sensor is instantaneously responsive to debris strikes, and can be used to control, select or vary the operational mode of an autonomous or non-autonomous cleaning apparatus containing such a sensor.

One aspect of the invention is an autonomous cleaning apparatus including a drive system operable to enable movement of the cleaning apparatus; a controller in communication with the drive system, the controller including a processor operable to control the drive system to provide at least one pattern of movement of the cleaning apparatus; and a debris sensor for generating a debris signal indicating that the cleaning apparatus has encountered debris; wherein the processor is responsive to the debris signal to select an operative mode from among predetermined operative modes of the cleaning apparatus.

The selection of operative mode could include selecting a pattern of movement of the cleaning apparatus.

The pattern of movement can include spot coverage of an area containing debris, or steering the cleaning apparatus toward an area containing debris. The debris sensor could include spaced-apart first and second debris sensing elements respectively operable to generate first and second debris signals; and the processor can be responsive to the respective first and second debris signals to select a pattern of movement, such as steering toward a side (e.g., left or right side) with more debris.

The debris sensor can include a piezoelectric sensor element located proximate to a cleaning pathway of the cleaning apparatus and responsive to a debris strike to generate a signal indicative of such strike.

The debris sensor of the invention can also be incorporated into a non-autonomous cleaning apparatus. This aspect of the invention can include a piezoelectric sensor located proximate to a cleaning pathway and responsive to a debris strike to generate a debris signal indicative of such strike; and a processor responsive to the debris signal to change an operative mode of the cleaning apparatus. The change in operative mode could include illuminating a user-perceptible indicator light, changing a power setting (e.g., higher power setting when more debris is encountered), or slowing or reducing a movement speed of the apparatus.

A further aspect of the invention is a debris sensor, including a piezoelectric element located proximate to or within a cleaning pathway of the cleaning apparatus and responsive to a debris strike to generate a first signal indicative of such strike; and a processor operable to process the first signal to generate a second signal representative of a characteristic of debris being encountered by the cleaning apparatus. That characteristic could be, for example, a quantity or volumetric parameter of the debris, or a vector from a present location of the cleaning apparatus to an area containing debris.

Another aspect of the invention takes advantage of the motion of an autonomous cleaning device across a floor or other surface, processing the debris signal in conjunction with knowledge of the cleaning device's movement to calculate a debris gradient. The debris gradient is representative of changes in debris strikes count as the autonomous cleaning apparatus moves along a surface. By examining the sign of the gradient (positive or negative, associated with increasing or decreasing debris), an autonomous cleaning device controller can continuously adjust the path or pattern of movement of the device to clean a debris field most effectively.

These and other aspects, features and advantages of the invention will become more apparent from the following description, in conjunction with the accompanying drawings, in which embodiments of the invention are shown and described by way of illustrative example.

BRIEF DESCRIPTION OF THE DRAWINGS

A more complete understanding of the present invention and the attendant features and advantages thereof may be had by reference to the following detailed description of the invention when considered in conjunction with the accompanying drawings wherein:

FIG. 8 is a flowchart of a method according to one practice of the invention.

DETAILED DESCRIPTION OF THE INVENTION

While the debris sensor of the present invention can be incorporated into a wide range of autonomous cleaning devices (and indeed, into non-autonomous cleaning devices as shown by way of example in FIG. 7), it will first be described in the context of an exemplary autonomous cleaning device shown in FIGS. 1-3. Further details of the structure, function and behavioral modes of such an autonomous cleaning device are set forth in the patent applications cited above in the Cross-Reference section, each of which is incorporated herein by reference. Accordingly, the following detailed description is organized into the following sections:
I. Exemplary Autonomous Cleaning Device
II. Behavioral Modes of an Autonomous Cleaning Device
III. Debris Sensor Structure
IV. Signal Processing
V. Conclusions

I. AUTONOMOUS CLEANING DEVICE

Figure 1:
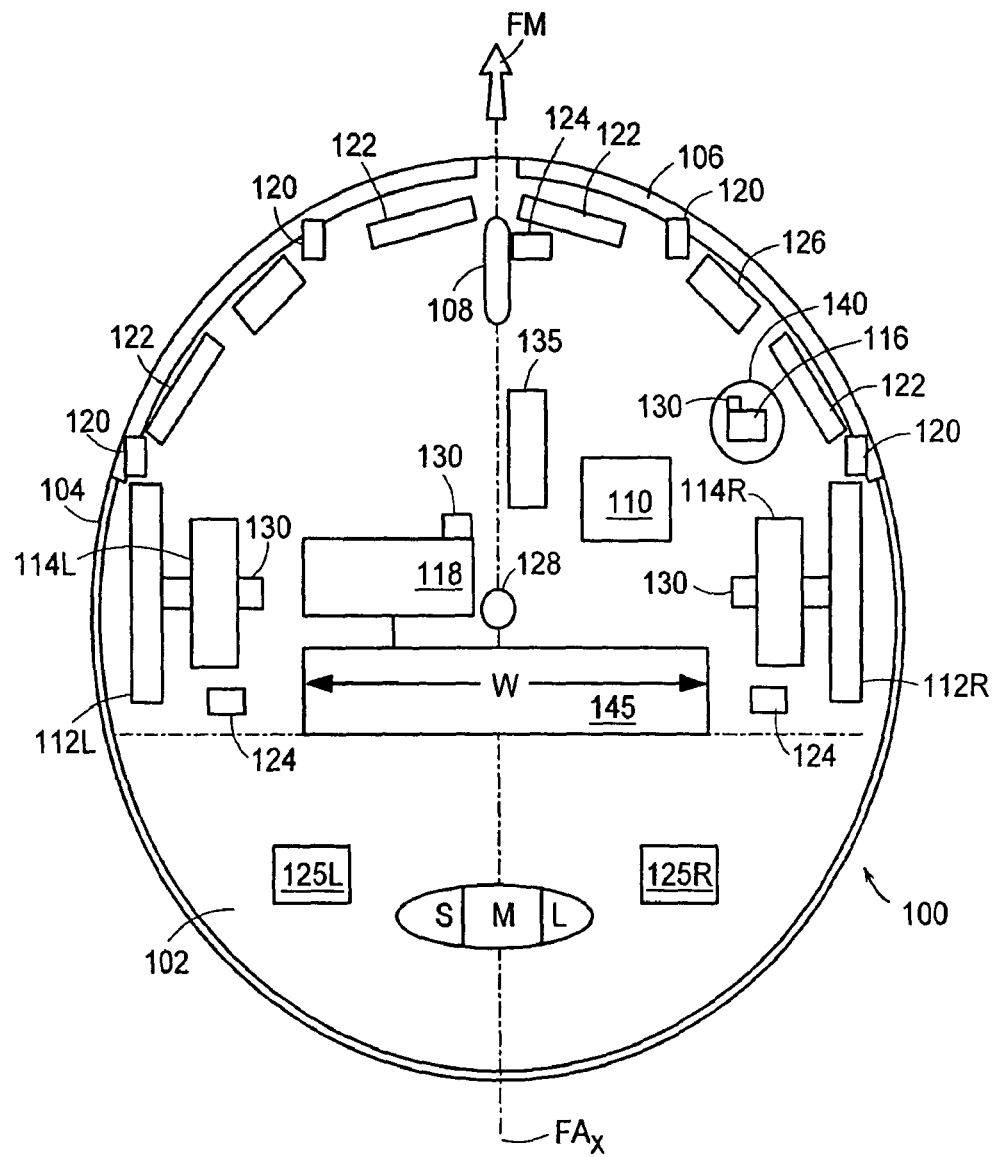
FIG. 1 is a top-view schematic of an exemplary autonomous cleaning device in which the debris sensor of the invention can be employed.

Referring now to the drawings wherein like reference numerals identify corresponding or similar elements throughout the several views, FIG. 1 is a top-view schematic of an exemplary autonomous cleaning device 100 in which a debris sensor according to the present invention may be incorporated. FIG. 2 is a block diagram of the hardware of the robot device 100 of FIG. 1.

Examples of hardware and behavioral modes (coverage behaviors or patterns of movement for cleaning operations; escape behaviors for transitory movement patterns; and safety behaviors for emergency conditions) of an autonomous cleaning device 100 marketed by the iRobot Corporation of Burlington, Mass. under the ROOMBA trademark, will next be described to provide a more complete understanding of how the debris sensing system of the present invention may be employed. However, the invention can also be employed in non-autonomous cleaning devices, and an example is described below in connection with FIG. 7.

In the following description, the terms "forward" and "fore" are used to refer to the primary direction of motion (forward) of the robotic device (see arrow identified by reference character "FM" in FIG. 1). The fore/aft axis $FA_x$ of the robotic device 100 coincides with the medial diameter of the robotic device 100 that divides the robotic device 100 into generally symmetrical right and left halves, which are defined as the dominant and non-dominant sides, respectively.

An example of such a robotic cleaning device 100 has a generally disk-like housing infrastructure that includes a chassis 102 and an outer shell 104 secured to the chassis 102 that define a structural envelope of minimal height (to facilitate movement under furniture). The hardware comprising the robotic device 100 can be generally categorized as the functional elements of a power system, a motive power system (also referred to herein as a "drive system"), a sensor system, a control module, a side brush assembly, or a self-adjusting cleaning head system, respectively, all of which are integrated in combination with the housing infrastructure. In addition to such categorized hardware, the robotic device 100 further includes a forward bumper 106 having a generally arcuate configuration and a nose-wheel assembly 108.

The forward bumper 106 (illustrated as a single component; alternatively, a two-segment component) is integrated in movable combination with the chassis 102 (by means of displaceable support members pairs) to extend outwardly therefrom. Whenever the robotic device 100 impacts an obstacle (e.g., wall, furniture) during movement thereof, the bumper 106 is displaced (compressed) towards the chassis 102 and returns to its extended (operating) position when contact with the obstacle is terminated.

The nose-wheel assembly 108 is mounted in biased combination with the chassis 102 so that the nose-wheel subassembly 108 is in a retracted position (due to the weight of the robotic device 100) during cleaning operations wherein it rotates freely over the surface being cleaned. When the nose-wheel subassembly 108 encounters a drop-off during operation (e.g., descending stairs, split-level floors), the nose-wheel assembly 108 is biased to an extended position.

The hardware of the power system, which provides the energy to power the electrically-operated hardware of the robotic device 100, comprises a rechargeable battery pack 110 (and associated conduction lines, not shown) that is integrated in combination with the chassis 102.

As shown in FIG. 1, the motive power system provides the means that propels the robotic device 100 and operates the cleaning mechanisms, e.g., side brush assembly and the self-adjusting cleaning head system, during movement of the robotic device 100. The motive power system comprises left and right main drive wheel assemblies 112L, 112R, their associated independent electric motors 114L, 114R, and electric motors 116, 118 for operation of the side brush assembly and the self-adjusting cleaning head subsystem, respectively.

The electric motors 114L, 114R are mechanically coupled to the main drive wheel assemblies 112L, 112R, respectively, and independently operated by control signals generated by the control module as a response to the implementation of a behavioral mode, or, as discussed in greater detail below, in response to debris signals generated by left and right debris sensors 125L, 125R shown in FIG. 1.

Independent operation of the electric motors 114L, 114R allows the main wheel assemblies 112L, 112R to be: (1) rotated at the same speed in the same direction to propel the robotic device 100 in a straight line, forward or aft; (2) differentially rotated (including the condition wherein one wheel assembly is not rotated) to effect a variety of right and/or left turning patterns (over a spectrum of sharp to shallow turns) for the robotic device 100; and (3) rotated at the same speed in opposite directions to cause the robotic device 100 to turn in place, i.e., "spin on a dime", to provide an extensive repertoire of movement capability for the robotic device 100.

As shown in FIG. 1, the sensor system comprises a variety of different sensor units that are operative to generate signals that control the behavioral mode operations of the robotic device 100. The described robotic device 100 includes obstacle detection units 120, cliff detection units 122, wheel drop sensors 124, an obstacle-following unit 126, a virtual wall omnidirectional detector 128, stall-sensor units 130, main wheel encoder units 132, and, in accordance with the present invention, left and right debris sensors 125L and 125R described in greater detail below.

In the illustrated embodiment, the obstacle ("bump") detection units 120 can be IR break beam sensors mounted in combination with the displaceable support member pairs of the forward bumper 106. These detection units 120 are operative to generate one or more signals indicating relative displacement between one or more support member pairs whenever the robotic device 100 impacts an obstacle such that the forward bumper 106 is compressed. These signals are processed by the control module to determine an approximate point of contact with the obstacle relative to the fore-aft axis FAX of the robotic device 100 (and the behavioral mode(s) to be implemented).

The cliff detection units 122 are mounted in combination with the forward bumper 106. Each cliff detection unit 122 comprises an IR emitter-detector pair configured and operative to establish a focal point such that radiation emitted downwardly by the emitter is reflected from the surface being traversed and detected by the detector. If reflected radiation is not detected by the detector, i.e., a drop-off is encountered, the cliff detection unit 122 transmits a signal to the control module (which causes one or more behavioral modes to be implemented).

A wheel drop sensor 124 such as a contact switch is integrated in combination with each of the main drive wheel assemblies 112L, 112R and the nose wheel assembly 108 and is operative to generate a signal whenever any of the wheel assemblies is in an extended position, i.e., not in contact with the surface being traversed, (which causes the control module to implement one or more behavioral modes).

The obstacle-following unit 126 for the described embodiment is an IR emitter-detector pair mounted on the 'dominant' side (right hand side of FIG. 1) of the robotic device 100. The emitter-detector pair is similar in configuration to the cliff detection units 112, but is positioned so that the emitter emits radiation laterally from the dominant side of the robotic device 100. The unit 126 is operative to transmit a signal to the control module whenever an obstacle is detected as a result of radiation reflected from the obstacle and detected by the detector. The control module, in response to this signal, causes one or more behavioral modes to be implemented.

A virtual wall detection system for use in conjunction with the described embodiment of the robotic device 100 comprises an omnidirectional detector 128 mounted atop the outer shell 104 and a stand-alone transmitting unit (not shown) that transmits an axially-directed confinement beam. The stand-alone transmitting unit is positioned so that the emitted confinement beam blocks an accessway to a defined working area, thereby restricting the robotic device 100 to operations within the defined working area (e.g., in a doorway to confine the robotic device 100 within a specific room to be cleaned). Upon detection of the confinement beam, the omnidirectional detector 128 transmits a signal to the control module (which causes one or more behavioral modes to be implemented to move the robotic device 100 away from the confinement beam generated by the stand-alone transmitting unit).

A stall sensor unit 130 is integrated in combination with each electric motor 114L, 114R, 116, 118 and operative to transmit a signal to the control module when a change in current is detected in the associated electric motor (which is indicative of a dysfunctional condition in the corresponding driven hardware). The control module is operative in response to such a signal to implement one or more behavioral modes.

An IR encoder unit 132 (see FIG. 2) is integrated in combination with each main wheel assembly 112L, 112R and operative to detect the rotation of the corresponding wheel and transmit signals corresponding thereto the control module (wheel rotation can be used to provide an estimate of distance traveled for the robotic device 100).

Figure 2:
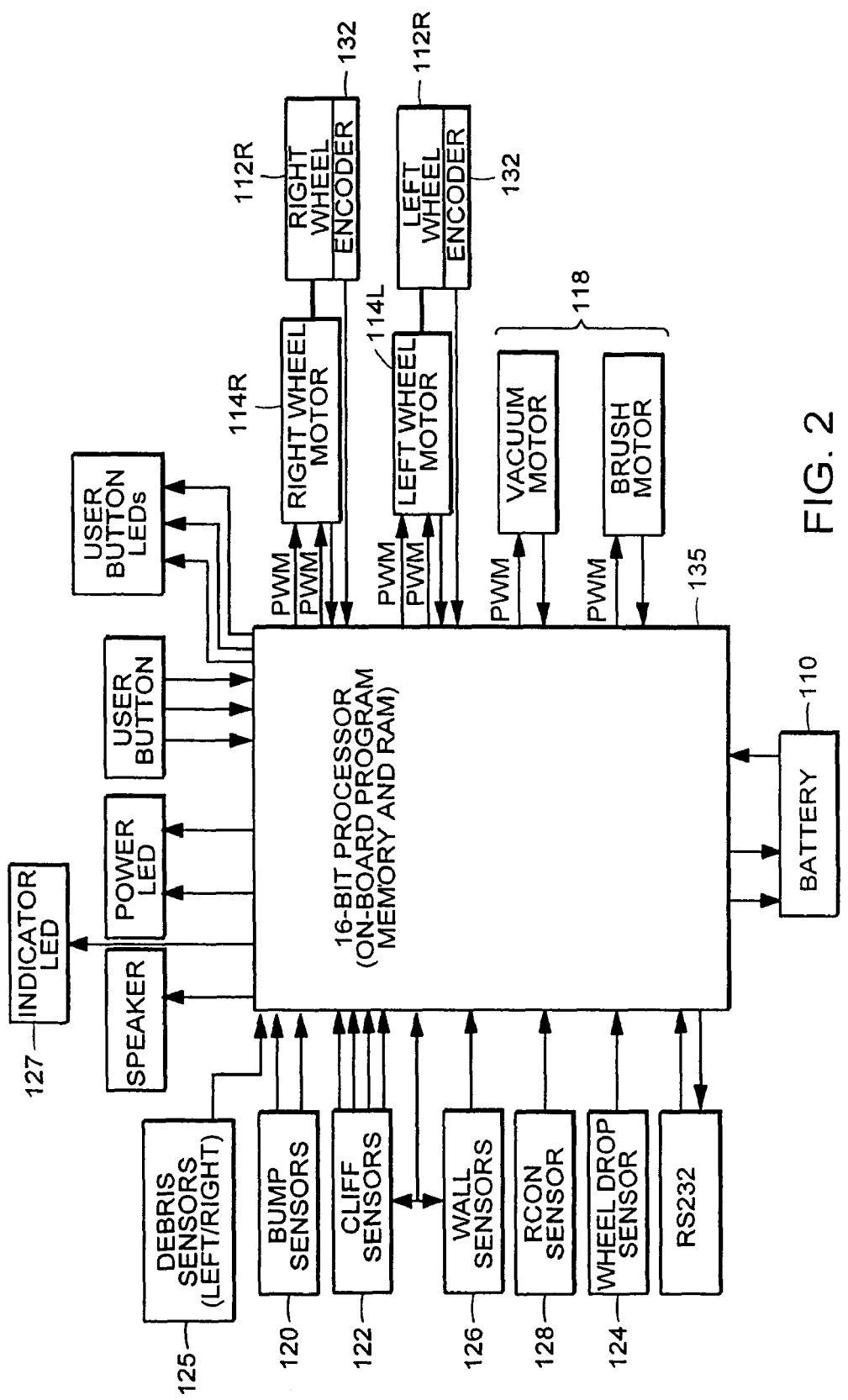
FIG. 2 is a block diagram of exemplary hardware elements of the robotic device of FIG. 1, including a debris sensor subsystem of the invention.

Control Module:

Referring now to FIG. 2, the control module comprises the microprocessing unit 135 that includes I/O ports connected to the sensors and controllable hardware of the robotic device 100, a microcontroller (such as a Motorola MC9512E128CPV 16-bit controller), and ROM and RAM memory. The I/O ports function as the interface between the microcontroller and the sensor units (including left and right debris sensors 125 discussed in greater detail below) and controllable hardware, transferring signals generated by the sensor units to the microcontroller and transferring control (instruction) signals generated by the microcontroller to the controllable hardware to implement a specific behavioral mode.

The microcontroller is operative to execute instruction sets for processing sensor signals, implementing specific behavioral modes based upon such processed signals, and generating control (instruction) signals for the controllable hardware based upon implemented behavioral modes for the robotic device 100. The cleaning coverage and control programs for the robotic device 100 are stored in the ROM of the microprocessing unit 135, which includes the behavioral modes, sensor processing algorithms, control signal generation algorithms and a prioritization algorithm for determining which behavioral mode or modes are to be given control of the robotic device 100. The RAM of the microprocessing unit 135 is used to store the active state of the robotic device 100, including the ID of the behavioral mode(s) under which the robotic device 100 is currently being operated and the hardware commands associated therewith.

Referring again to FIG. 1, there is shown a brush assembly 140, configured and operative to entrain particulates outside the periphery of the housing infrastructure and to direct such particulates towards the self-adjusting cleaning head system. The side brush assembly 140 provides the robotic device 100 with the capability of cleaning surfaces adjacent to baseboards when the robotic device is operated in an Obstacle-Following behavioral mode. As shown in FIG. 1, the side brush assembly 140 is preferably mounted in combination with the chassis 102 in the forward quadrant on the dominant side of the robotic device 100.

The self-adjusting cleaning head system 145 for the described robotic device 100 comprises a dual-stage brush assembly and a vacuum assembly, each of which is independently powered by an electric motor (reference numeral 118 in FIG. 1 actually identifies two independent electric motors—one for the brush assembly and one for the vacuum assembly). The cleaning capability of the robotic device 100 is commonly characterized in terms of the width of the cleaning head system 145 (see reference character W in FIG. 1).

Figure 3:
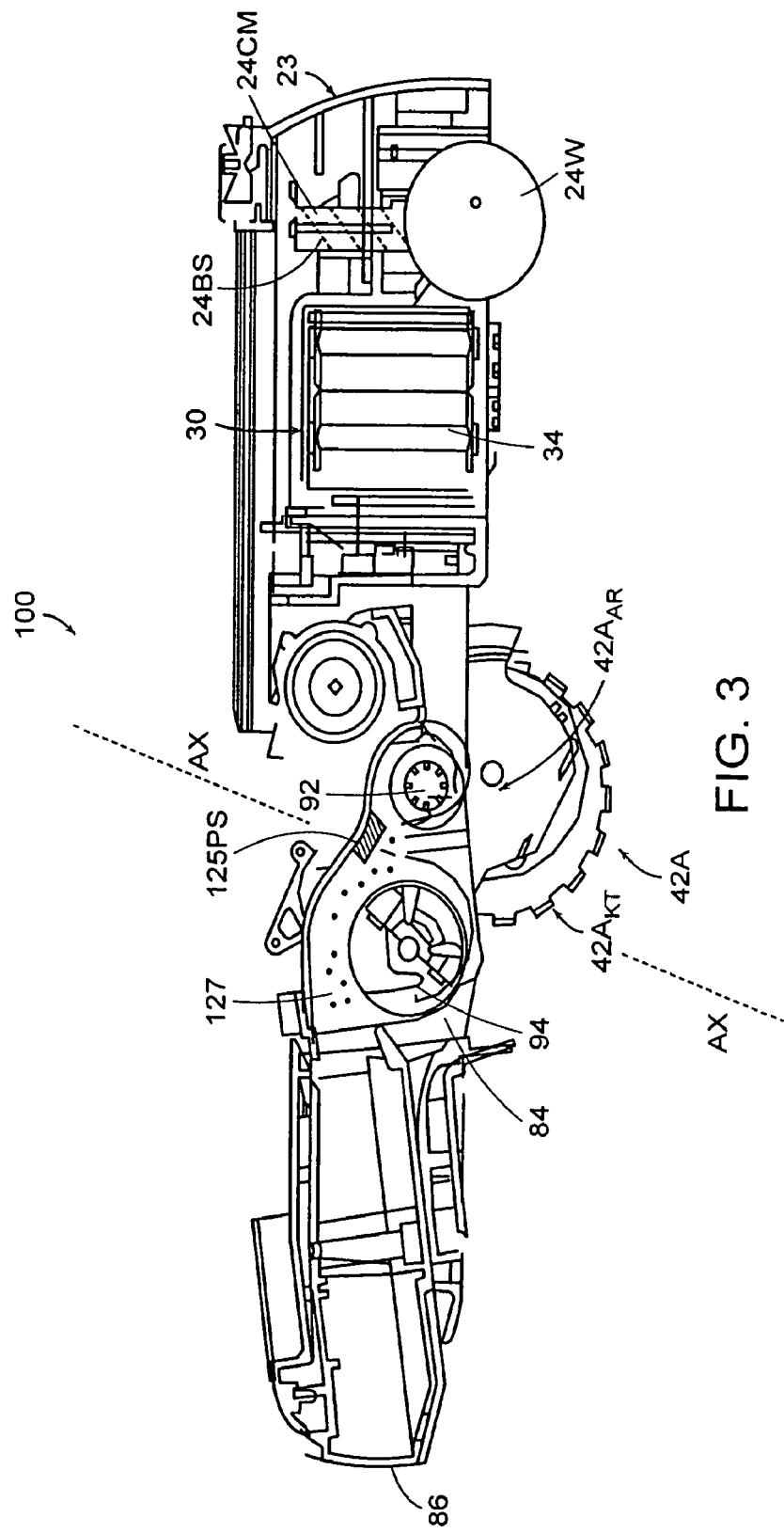
FIG. 3 is a side view of the robotic device of FIG. 1, showing a debris sensor according to the invention situated in a cleaning or vacuum pathway, where it will be struck by debris upswept by the main cleaning brush element.

Referring now to FIG. 3, in one embodiment of a robotic cleaning device, the cleaning brush assembly comprises asymmetric, counter-rotating flapper and main brush elements 92 and 94, respectively, that are positioned forward of the vacuum assembly inlet 84, and operative to direct particulate debris 127 into a removable dust cartridge 86. As shown in FIG. 3, the autonomous cleaning apparatus can also include left and right debris sensor elements 125PS, which can be piezoelectric sensor elements, as described in detail below. The piezoelectric debris sensor elements 125PS can be situated in a cleaning pathway of the cleaning device, mounted, for example, in the roof of the cleaning head, so that when struck by particles 127 swept up by the brush elements and/or pulled up by vacuum, the debris sensor elements 125PS generate electrical pulses representative of debris impacts and thus, of the presence of debris in an area in which the autonomous cleaning device is operating.

More particularly, in the arrangement shown in FIG. 3, the sensor elements 125PS are located substantially at an axis AX along which main and flapper brushes 94, 92 meet, so that particles strike the sensor elements 125PS with maximum force.

As shown in FIG. 1, and described in greater detail below, the robotic cleaning device can be fitted with left and right side piezoelectric debris sensors, to generate separate left and right side debris signals that can be processed to signal the robotic device to turn in the direction of a "dirty" area.

The operation of the piezoelectric debris sensors, as well as signal processing and selection of behavioral modes based on the debris signals they generate, will be discussed below following a brief discussion of general aspects of behavioral modes for the cleaning device.

II. BEHAVIORAL MODES

The robotic device 100 can employ a variety of behavioral modes to effectively clean a defined working area where behavioral modes are layers of control systems that can be operated in parallel. The microprocessor unit 135 is operative to execute a prioritized arbitration scheme to identify and implement one or more dominant behavioral modes for any given scenario based upon inputs from the sensor system.

The behavioral modes for the described robotic device 100 can be characterized as: (1) coverage behavioral modes; (2) escape behavioral modes; and (3) safety behavioral modes. Coverage behavioral modes are primarily designed to allow the robotic device 100 to perform its cleaning operations in an efficient and effective manner and the escape and safety behavioral modes are priority behavioral modes implemented when a signal from the sensor system indicates that normal operation of the robotic device 100 is impaired, e.g., obstacle encountered, or is likely to be impaired, e.g., drop-off detected.

Representative and illustrative coverage behavioral (cleaning) modes for the robotic device 100 include: (1) a Spot Coverage pattern; (2) an Obstacle-Following (or Edge-Cleaning) Coverage pattern, and (3) a Room Coverage pattern. The Spot Coverage pattern causes the robotic device 100 to clean a limited area within the defined working area, e.g., a high-traffic area. In a preferred embodiment the Spot Coverage pattern is implemented by means of a spiral algorithm (but other types of self-bounded area algorithms, e.g., polygonal, can be used). The spiral algorithm, which causes outward spiraling (preferred) or inward spiraling movement of the robotic device 100, is implemented by control signals from the microprocessing unit 135 to the main wheel assemblies 112L, 112R to change the turn radius/radii thereof as a function of time (thereby increasing/decreasing the spiral movement pattern of the robotic device 100).

The robotic device 100 is operated in the Spot Coverage pattern for a predetermined or random period of time, for a predetermined or random distance (e.g., a maximum spiral distance) and/or until the occurrence of a specified event, e.g., activation of one or more of the obstacle detection units 120 (collectively a transition condition). Once a transition condition occurs, the robotic device 100 can implement or transition to a different behavioral mode, e.g., a Straight Line behavioral mode (in a preferred embodiment of the robotic device 100, the Straight Line behavioral mode is a low priority, default behavior that propels the robot in an approximately straight line at a preset velocity of approximately 0.306 m/s) or a Bounce behavioral mode in combination with a Straight Line behavioral mode.

If the transition condition is the result of the robotic device 100 encountering an obstacle, the robotic device 100 can take other actions in lieu of transitioning to a different behavioral mode. The robotic device 100 can momentarily implement a behavioral mode to avoid or escape the obstacle and resume operation under control of the spiral algorithm (i.e., continue spiraling in the same direction). Alternatively, the robotic device 100 can momentarily implement a behavioral mode to avoid or escape the obstacle and resume operation under control of the spiral algorithm (but in the opposite direction—reflective spiraling).

The Obstacle-Following Coverage pattern causes the robotic device 100 to clean the perimeter of the defined working area, e.g., a room bounded by walls, and/or the perimeter of an obstacle (e.g., furniture) within the defined working area. Preferably the robotic device 100 of FIG. 1 utilizes obstacle-following unit 126 (see FIG. 1) to continuously maintain its position with respect to an obstacle, e.g., wall, furniture, so that the motion of the robotic device 100 causes it to travel adjacent to and concomitantly clean along the perimeter of the obstacle. Different embodiments of the obstacle-following unit 126 can be used to implement the Obstacle-Following behavioral pattern.

In a first embodiment, the obstacle-following unit 126 is operated to detect the presence or absence of the obstacle. In an alternative embodiment, the obstacle-following unit 126 is operated to detect an obstacle and then maintain a predetermined distance between the obstacle and the robotic device 100. In the first embodiment, the microprocessing unit 135 is operative, in response to signals from the obstacle-following unit, to implement small CW or CCW turns to maintain its position with respect to the obstacle. The robotic device 100 implements a small CW when the robotic device 100 transitions from obstacle detection to non-detection (reflection to non-reflection) or to implement a small CCW turn when the robotic device 100 transitions from non-detection to detection (non-reflection to reflection). Similar turning behaviors are implemented by the robotic device 100 to maintain the predetermined distance from the obstacle.

The robotic device 100 is operated in the Obstacle-Following behavioral mode for a predetermined or random period of time, for a predetermined or random distance (e.g., a maximum or minimum distance) and/or until the occurrence of a specified event, e.g., activation of one or more of the obstacle detection units 120 a predetermined number of times (collectively a transition condition). In certain embodiments, the microprocessor 135 will cause the robotic device to implement an Align behavioral mode upon activation of the obstacle-detection units 120 in the Obstacle-Following behavioral mode wherein the implements a minimum angle CCW turn to align the robotic device 100 with the obstacle.

The Room Coverage pattern can be used by the robotic device 100 to clean any defined working area that is bounded by walls, stairs, obstacles or other barriers (e.g., a virtual wall unit). A preferred embodiment for the Room Coverage pattern comprises the Random-Bounce behavioral mode in combination with the Straight Line behavioral mode. Initially, the robotic device 100 travels under control of the Straight-Line behavioral mode, i.e., straight-line algorithm (main drive wheel assemblies 112L, 112R operating at the same rotational speed in the same direction) until an obstacle is encountered. Upon activation of one or more of the obstacle detection units 120, the microprocessing unit 135 is operative to compute an acceptable range of new directions based upon the obstacle detection unit(s) 126 activated. The microprocessing unit 135 selects a new heading from within the acceptable range and implements a CW or CCW turn to achieve the new heading with minimal movement. In some embodiments, the new turn heading may be followed by forward movement to increase the cleaning efficiency of the robotic device 100. The new heading may be randomly selected across the acceptable range of headings, or based upon some statistical selection scheme, e.g., Gaussian distribution. In other embodiments of the Room Coverage behavioral mode, the microprocessing unit 135 can be programmed to change headings randomly or at predetermined times, without input from the sensor system.

The robotic device 100 is operated in the Room Coverage behavioral mode for a predetermined or random period of time, for a predetermined or random distance (e.g., a maximum or minimum distance) and/or until the occurrence of a specified event, e.g., activation of the obstacle-detection units 120 a predetermined number of times (collectively a transition condition).

By way of example, the robotic device 100 can include four escape behavioral modes: a Turn behavioral mode, an Edge behavioral mode, a Wheel Drop behavioral mode, and a Slow behavioral mode. One skilled in the art will appreciate that other behavioral modes can be utilized by the robotic device 100. One or more of these behavioral modes may be implemented, for example, in response to a current rise in one of the electric motors 116, 118 of the side brush assembly 140 or dual-stage brush assembly above a low or high stall threshold, forward bumper 106 in compressed position for determined time period, detection of a wheel-drop event.

In the Turn behavioral mode, the robotic device 100 turns in place in a random direction, starting at higher velocity (e.g., twice normal turning velocity) and decreasing to a lower velocity (one-half normal turning velocity), i.e., small panic turns and large panic turns, respectively. Low panic turns are preferably in the range of 45° to 90°, large panic turns are preferably in the range of 90° to 270°. The Turn behavioral mode prevents the robotic device 100 from becoming stuck on room impediments, e.g., high spot in carpet, ramped lamp base, from becoming stuck under room impediments, e.g., under a sofa, or from becoming trapped in a confined area.

In the Edge behavioral mode follows the edge of an obstacle unit it has turned through a predetermined number of degrees, e.g., 60°, without activation of any of the obstacle detection units 120, or until the robotic device has turned through a predetermined number of degrees, e.g., 170°, since initiation of the Edge behavioral mode. The Edge behavioral mode allows the robotic device 100 to move through the smallest possible openings to escape from confined areas.

In the Wheel Drop behavioral mode, the microprocessor 135 reverses the direction of the main wheel drive assemblies 112L, 112R momentarily, then stops them. If the activated wheel drop sensor 124 deactivates within a predetermined time, the microprocessor 135 then reimplements the behavioral mode that was being executed prior to the activation of the wheel drop sensor 124.

In response to certain events, e.g., activation of a wheel drop sensor 124 or a cliff detector 122, the Slow behavioral mode is implemented to slowed down the robotic device 100 for a predetermined distance and then ramped back up to its normal operating speed.

When a safety condition is detected by the sensor subsystem, e.g., a series of brush or wheel stalls that cause the corresponding electric motors to be temporarily cycled off, wheel drop sensor 124 or a cliff detection sensor 122 activated for greater that a predetermined period of time, the robotic device 100 is generally cycled to an off state. In addition, an audible alarm may be generated.

The foregoing description of behavioral modes for the robotic device 100 is merely representative of the types of operating modes that can be implemented by the robotic device 100. One skilled in the art will appreciate that the behavioral modes described above can be implemented in other combinations and/or circumstances, and other behavioral modes and patterns of movement are also possible.

III. DEBRIS SENSOR STRUCTURE AND OPERATION

Figure 7:
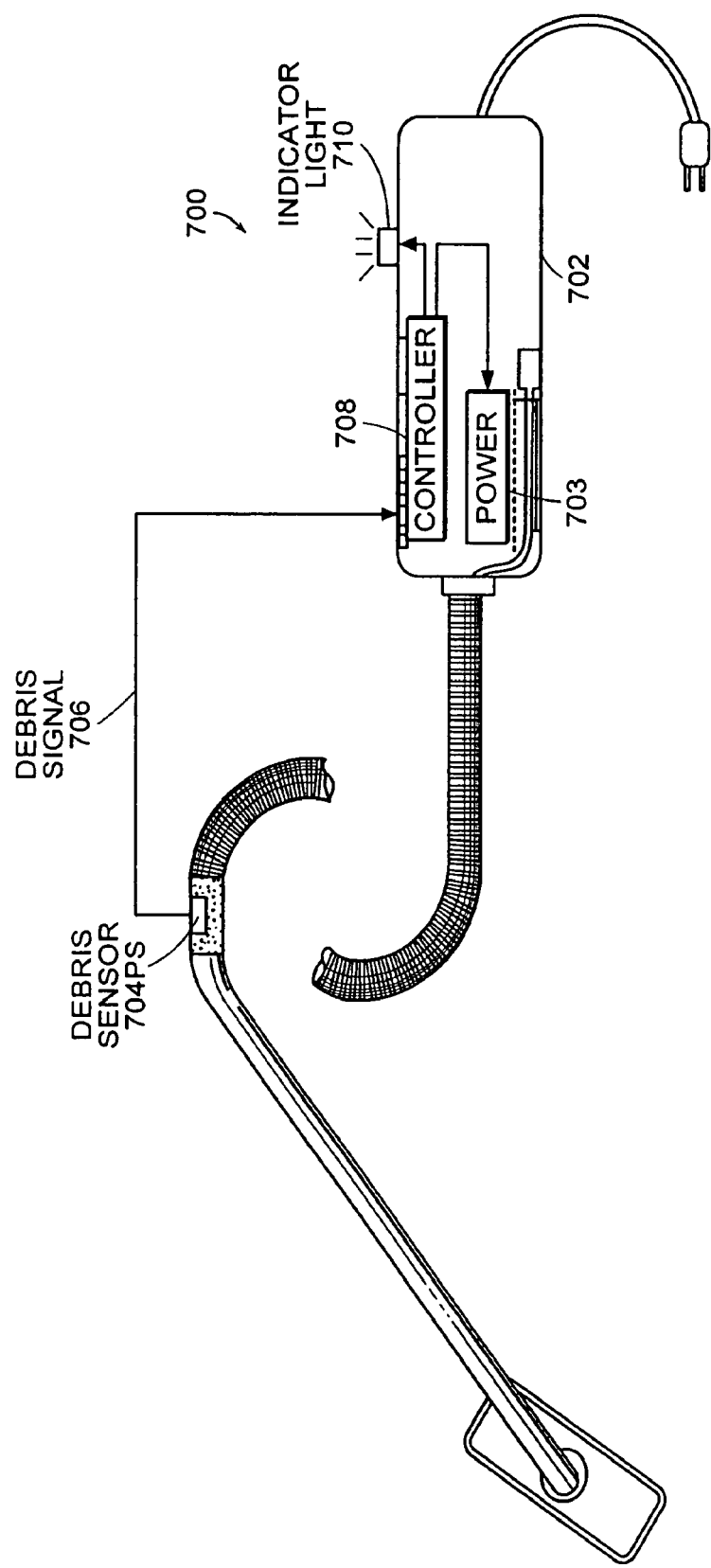
FIG. 7 is a schematic diagram showing the debris sensor in a non-autonomous cleaning apparatus.

As shown in FIGS. 1-3, in accordance with the present invention, an autonomous cleaning device (and similarly, a non-autonomous cleaning device as shown by way of example in FIG. 7) can be improved by incorporation of a debris sensor. In the embodiment illustrated in FIGS. 1 and 3, the debris sensor subsystem comprises left and right piezoelectric sensing elements 125L, 125R situated proximate to or within a cleaning pathway of a cleaning device, and electronics for processing the debris signal from the sensor for forwarding to a microprocessor 135 or other controller.

When employed in an autonomous, robot cleaning device, the debris signal from the debris sensor can be used to select a behavioral mode (such as entering into a spot cleaning mode), change an operational condition (such as speed, power or other), steer in the direction of debris (particularly when spaced-apart left and right debris sensors are used to create a differential signal), or take other actions.

A debris sensor according to the present invention can also be incorporated into a non-autonomous cleaning device. When employed in a non-autonomous cleaning device such as, for example, an otherwise relatively conventional vacuum cleaner 700 like that shown in FIG. 7, the debris signal 706 generated by a piezoelectric debris sensor 704PS situated within a cleaning or vacuum pathway of the device can be employed by a controlling microprocessor 708 in the body of the vacuum cleaner 702 to generate a user-perceptible signal (such as by lighting a light 710), to increase power from the power system 703, or take some combination of actions (such as lighting a "high power" light and simultaneously increasing power).

The algorithmic aspects of the operation of the debris sensor subsystem are summarized in FIG. 8. As shown therein, a method according to the invention can include detecting left and right debris signals representative of debris strikes, and thus, of the presence, quantity or volume, and direction of debris (802); selecting an operational mode or pattern of movement (such as Spot Coverage) based on the debris signal values (804); selecting a direction of movement based on differential left/right debris signals (e.g., steering toward the side with more debris) (806); generating a user-perceptible signal representative of the presence of debris or other characteristic (e.g., by illuminating a user-perceptible LED) (808); or otherwise varying or controlling an operational condition, such as power (810).

A further practice of the invention takes advantage of the motion of an autonomous cleaning device across a floor or other surface, processing the debris signal in conjunction with knowledge of the cleaning device's movement to calculate a debris gradient (812 in FIG. 8). The debris gradient is representative of changes in debris strikes count as the autonomous cleaning apparatus moves along a surface. By examining the sign of the gradient (positive or negative, associated with increasing or decreasing debris), an autonomous cleaning device controller can continuously adjust the path or pattern of movement of the device to clean a debris field most effectively (812).

Piezoelectric Sensor:

As noted above, a piezoelectric transducer element can be used in the debris sensor subsystem of the invention. Piezoelectric sensors provide instantaneous response to debris strikes and are relatively immune to accretion that would degrade the performance of an optical debris sensor typical of the prior art.

Figure 4:
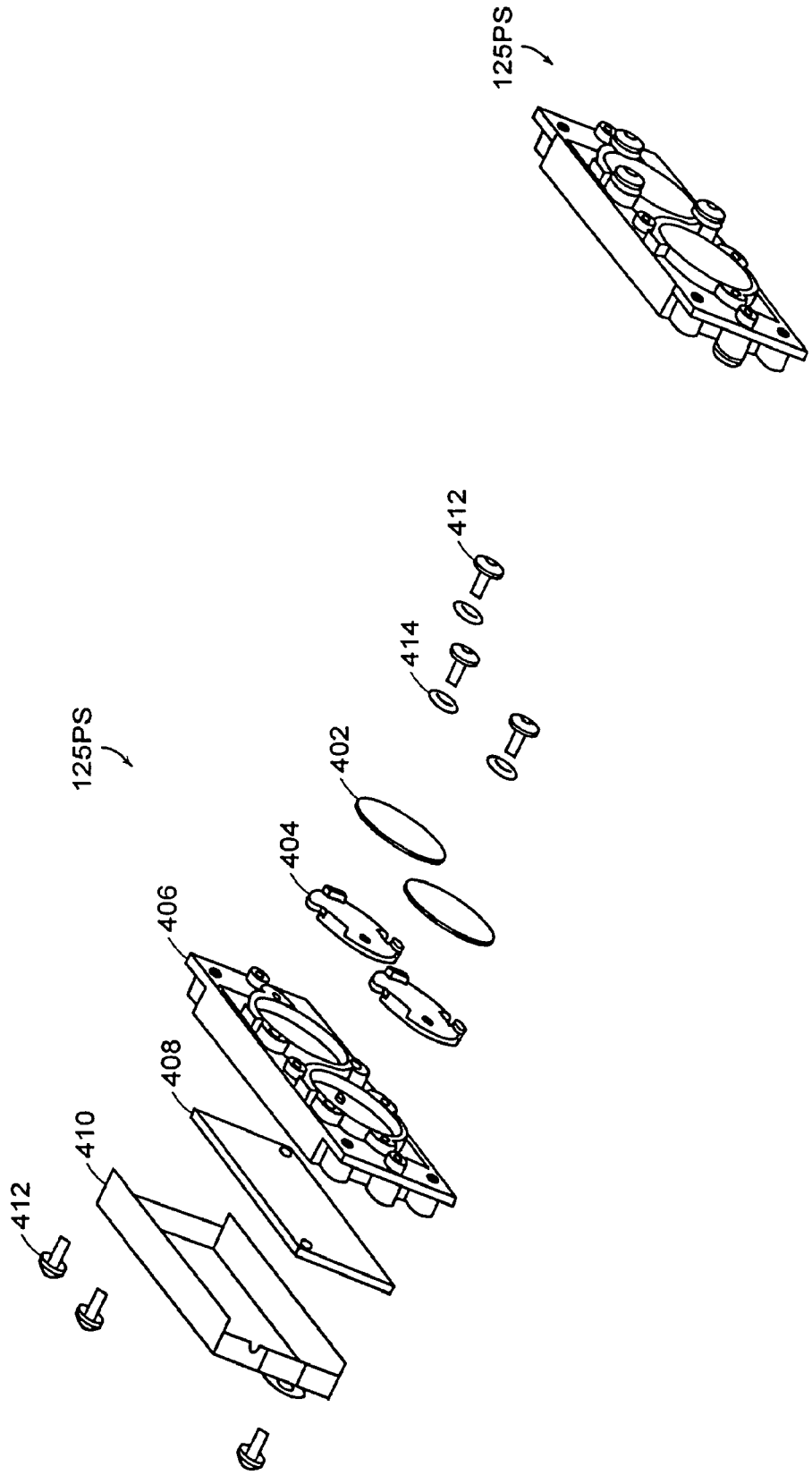
FIG. 4 is an exploded diagram of a piezoelectric debris sensor in accordance with the invention.

An example of a piezoelectric transducer 125PS is shown in FIG. 4. Referring now to FIG. 4, the piezoelectric sensor element 125PS can include one or more 0.20 millimeter thick, 20 millimeter diameter brass disks 402 with the piezoelectric material and electrodes bonded to the topside (with a total thickness of 0.51 mm), mounted to an elastomer pad 404, a plastic dirt sensor cap 406, a debris sensor PC board with associated electronics 408, grounded metal shield 410, and retained by mounting screws (or bolts or the like) 412 and elastomer grommets 414. The elastomer grommets provide a degree of vibration dampening or isolation between the piezoelectric sensor element 125PS and the cleaning device.

In the example shown in FIG. 4, a rigid piezoelectric disk, of the type typically used as inexpensive sounders, can be used. However, flexible piezoelectric film can also be advantageously employed. Since the film can be produced in arbitrary shapes, its use affords the possibility of sensitivity to debris across the entire cleaning width of the cleaning device, rather than sensitivity in selected areas where, for example, the disks may be located. Conversely, however, film is at present substantially more expensive and is subject to degradation over time. In contrast, brass disks have proven to be extremely robust.

The exemplary mounting configuration shown in FIG. 4 is substantially optimized for use within a platform that is mechanically quite noisy, such as an autonomous vacuum cleaner like that shown in FIG. 3. In such a device, vibration dampening or isolation of the sensor is extremely useful. However, in an application involving a non-autonomous cleaning device such as a canister-type vacuum cleaner like that shown in FIG. 7, the dampening aspects of the mounting system of FIG. 4 may not be necessary. In a non-autonomous cleaning apparatus, an alternative mounting system may involve heat staking the piezoelectric element directly to its housing. In either case, a key consideration for achieving enhanced performance is the reduction of the surface area required to clamp, bolt, or otherwise maintain the piezoelectric element in place. The smaller the footprint of this clamped "dead zone", the more sensitive the piezoelectric element will be.

In operation, debris thrown up by the cleaning brush assembly (e.g., brush 94 of FIG. 3), or otherwise flowing through a cleaning pathway within the cleaning device (e.g., vacuum compartment 104 of FIG. 3) can strike the bottom, all-brass side of the sensor 125PS (see FIG. 3). In an autonomous cleaning device, as shown in FIG. 3, the debris sensor 125PS can be located substantially at an axis AX along which main brush 94 and flapper brush 92 meet, so that the particles 127 are thrown up and strike the sensor 125PS with maximum force.

As is well known, a piezoelectric sensor converts mechanical energy (e.g., the kinetic energy of a debris strike and vibration of the brass disk) into electrical energy—in this case, generating an electrical pulse each time it is struck by debris—and it is this electrical pulse that can be processed and transmitted to a system controller (e.g., controller 135 of FIGS. 1 and 2 or 708 of FIG. 8) to control or cause a change in operational mode, in accordance with the invention. Piezoelectric elements are typically designed for use as audio transducers, for example, to generate beep tones. When an AC voltage is applied, they vibrate mechanically in step with the AC waveform, and generate an audible output. Conversely, if they are mechanically vibrated, they produce an AC voltage output. This is the manner in which they are employed in the present invention. In particular, when an object first strikes the brass face of the sensor, it causes the disk to flex inward, which produces a voltage pulse.

Filtering:

However, since the sensor element 125PS is in direct or indirect contact with the cleaning device chassis or body through its mounting system (see FIGS. 3 and 4), it is subject to the mechanical vibrations normally produced by motors, brushes, fans and other moving parts when the cleaning device is functioning. This mechanical vibration can cause the sensor to output an undesirable noise signal that can be larger in amplitude than the signal created by small, low mass debris (such as crushed black pepper) striking the sensor. The end result is that the sensor would output a composite signal composed of lower frequency noise components (up to approximately 16 kHz) and higher frequency, possibly lower amplitude, debris-strike components (greater than 30 kHz, up to hundreds of kHz). Thus, it is useful to provide a way to filter out extraneous signals.

Accordingly, as described below, an electronic filter is used to greatly attenuate the lower frequency signal components to improve signal-to-noise performance. Examples of the architecture and circuitry of such filtering and signal processing elements will next be described in connection with FIGS. 5 and 6.

IV. SIGNAL PROCESSING

Figure 5:
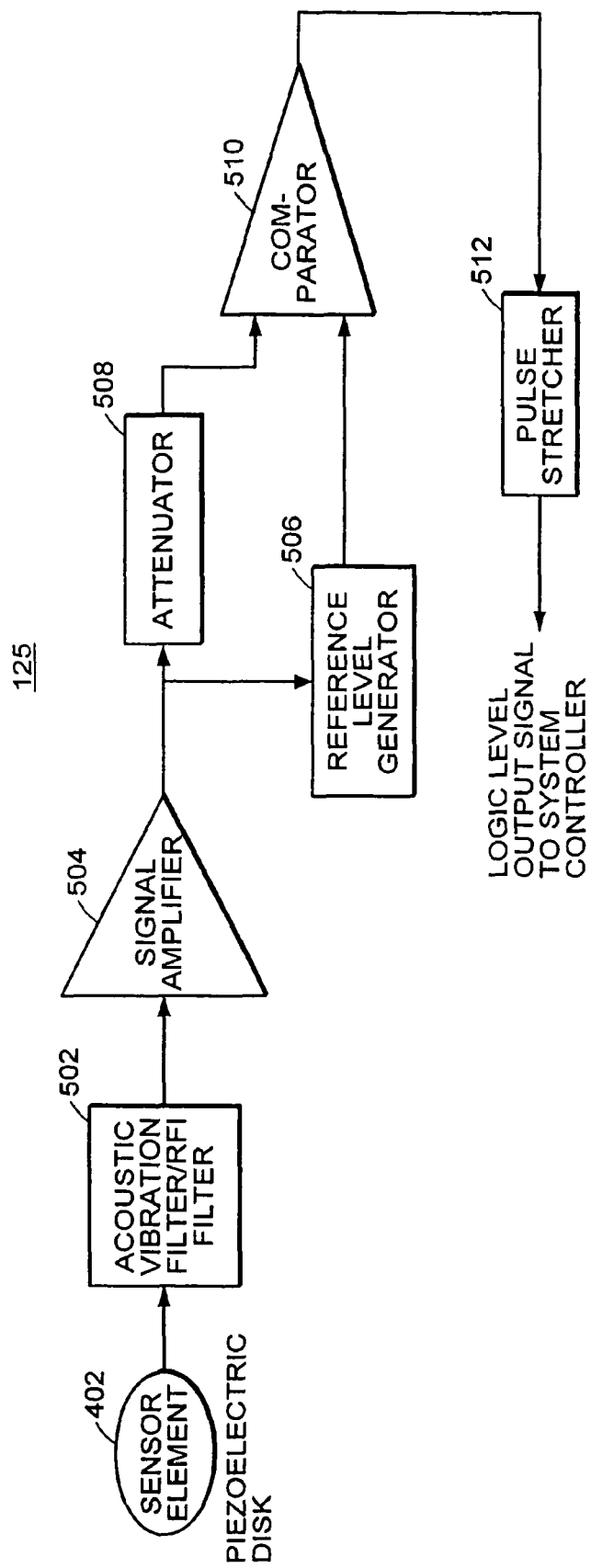
FIG. 5 is a schematic diagram of a debris sensor signal processing architecture according to the present invention.

FIG. 5 is a schematic diagram of the signal processing elements of a debris sensor subsystem in one practice of the invention.

As noted above, one purpose of a debris sensor is to enable an autonomous cleaning apparatus to sense when it is picking up debris or otherwise encountering a debris field. This information can be used as an input to effect a change in the cleaning behavior or cause the apparatus to enter a selected operational or behavioral mode, such as, for example, the spot cleaning mode described above when debris is encountered. In an non-autonomous cleaning apparatus like that shown in FIG. 7, the debris signal 706 from the debris sensor 704PS can be used to cause a user-perceptible light 710 to be illuminated (e.g., to signal to the user that debris is being encountered), to raise power output from the power until 703 to the cleaning systems, or to cause some other operational change or combination of changes (e.g., lighting a user-perceptible "high power" light and simultaneously raising power).

Moreover, as noted above, two debris sensor circuit modules (i.e., left and right channels like 125L and 125R of FIG. 1) can be used to enable an autonomous cleaning device to sense the difference between the amounts of debris picked up on the right and left sides of the cleaning head assembly. For example, if the robot encounters a field of dirt off to its left side, the left side debris sensor may indicate debris hits, while the right side sensor indicates no (or a low rate of) debris hits. This differential output could be used by the microprocessor controller of an autonomous cleaning device (such as controller 135 of FIGS. 1 and 2) to steer the device in the direction of the debris (e.g., to steer left if the left-side debris sensor is generating higher signal values than the right-side debris sensor); to otherwise choose a vector in the direction of the debris; or to otherwise select a pattern of movement or behavior pattern such as spot coverage or other.

Thus, FIG. 5 illustrates one channel (for example, the left-side channel) of a debris sensor subsystem that can contain both left and right side channels. The right side channel is substantially identical, and its structure and operation will therefore be understood from the following discussion.

As shown in FIG. 5, the left channel consists of a sensor element (piezoelectric disk) 402, an acoustic vibration filter/RFI filter module 502, a signal amplifier 504, a reference level generator 506, an attenuator 508, a comparator 510 for comparing the outputs of the attenuator and reference level generator, and a pulse stretcher 512. The output of the pulse stretcher is a logic level output signal to a system controller like the processor 135 shown in FIG. 2; i.e., a controller suitable for use in selecting an operational behavior.

The Acoustic Vibration Filter/RFI Filter block 502 can be designed to provide significant attenuation (in one embodiment, better than −45 dB Volts), and to block most of the lower frequency, slow rate of change mechanical vibration signals, while permitting higher frequency, fast rate of change debris-strike signals to pass. However, even though these higher frequency signals get through the filter, they are attenuated, and thus require amplification by the Signal Amplifier block 504.

In addition to amplifying the desired higher frequency debris strike signals, the very small residual mechanical noise signals that do pass through the filter also get amplified, along with electrical noise generated by the amplifier itself, and any radio frequency interference (RFI) components generated by the motors and radiated through the air, or picked up by the sensor and its conducting wires. The signal amplifier's high frequency response is designed to minimize the amplification of very high frequency RFI. This constant background noise signal, which has much lower frequency components than the desired debris strike signals, is fed into the Reference Level Generator block 506. The purpose of module 506 is to create a reference signal that follows the instantaneous peak value, or envelope, of the noise signal. It can be seen in FIG. 5 that the signal of interest, i.e., the signal that results when debris strikes the sensor, is also fed into this block. Thus, the Reference Level Generator block circuitry is designed so that it does not respond quickly enough to high frequency, fast rate of change debris-strike signals to be able to track the instantaneous peak value of these signals. The resulting reference signal will be used to make a comparison as described below.

Referring again to FIG. 5, it will be seen that the signal from amplifier 504 is also fed into the Attenuator block. This is the same signal that goes to the Reference Level Generator 506, so it is a composite signal containing both the high frequency signal of interest (i.e., when debris strikes the sensor) and the lower frequency noise. The Attenuator 508 reduces the amplitude of this signal so that it normally is below the amplitude of the signal from the Reference Level Generator 506 when no debris is striking the sensor element.

The Comparator 510 compares the instantaneous voltage amplitude value of the signal from the Attenuator 508 to the signal from the Reference Level Generator 506. Normally, when the cleaning device operating is running and debris are not striking the sensor element, the instantaneous voltage coming out of the Reference Level Generator 506 will be higher than the voltage coming out of the Attenuator block 508. This causes the Comparator block 510 to output a high logic level signal (logic one), which is then inverted by the Pulse Stretcher block 512 to create a low logic level (logic zero).

However, when debris strikes the sensor, the voltage from the Attenuator 508 exceeds the voltage from the Reference Level Generator 506 (since this circuit cannot track the high frequency, fast rate of change signal component from the Amplifier 504) and the signal produced by a debris strike is higher in voltage amplitude than the constant background mechanical noise signal which is more severely attenuated by the Acoustic Vibration Filter 502. This causes the comparator to momentarily change state to a logic level zero. The Pulse Stretcher block 512 extends this very brief (typically under 10-microsecond) event to a constant 1 millisecond (+0.3 mS, −0 mS) event, so as to provide the system controller (e.g., controller 135 of FIG. 2) sufficient time to sample the signal.

When the system controller "sees" this 1-millisecond logic zero pulse, it interprets the event as a debris strike.

Referring now to the RFI Filter portion of the Acoustic Vibration Filter/RFI Filter block 502, this filter serves to attenuate the very high frequency radiated electrical noise (RFI), which is generated by the motors and motor driver circuits.

In summary, the illustrated circuitry connected to the sensor element uses both amplitude and frequency information to discriminate a debris strike (representative of the cleaning device picking up debris) from the normal background mechanical noise also picked up by the sensor element, and the radiated radio frequency electrical noise produced by the motors and motor driver circuits. The normal, though undesirable, constant background noise is used to establish a dynamic reference that prevents false debris-strike indications while maintaining a good signal-to-noise ratio.

In practice, the mechanical mounting system for the sensor element (see FIG. 4) is also designed to help minimize the mechanical acoustic noise vibration coupling that affects the sensor element.

Figures 6, 6A:
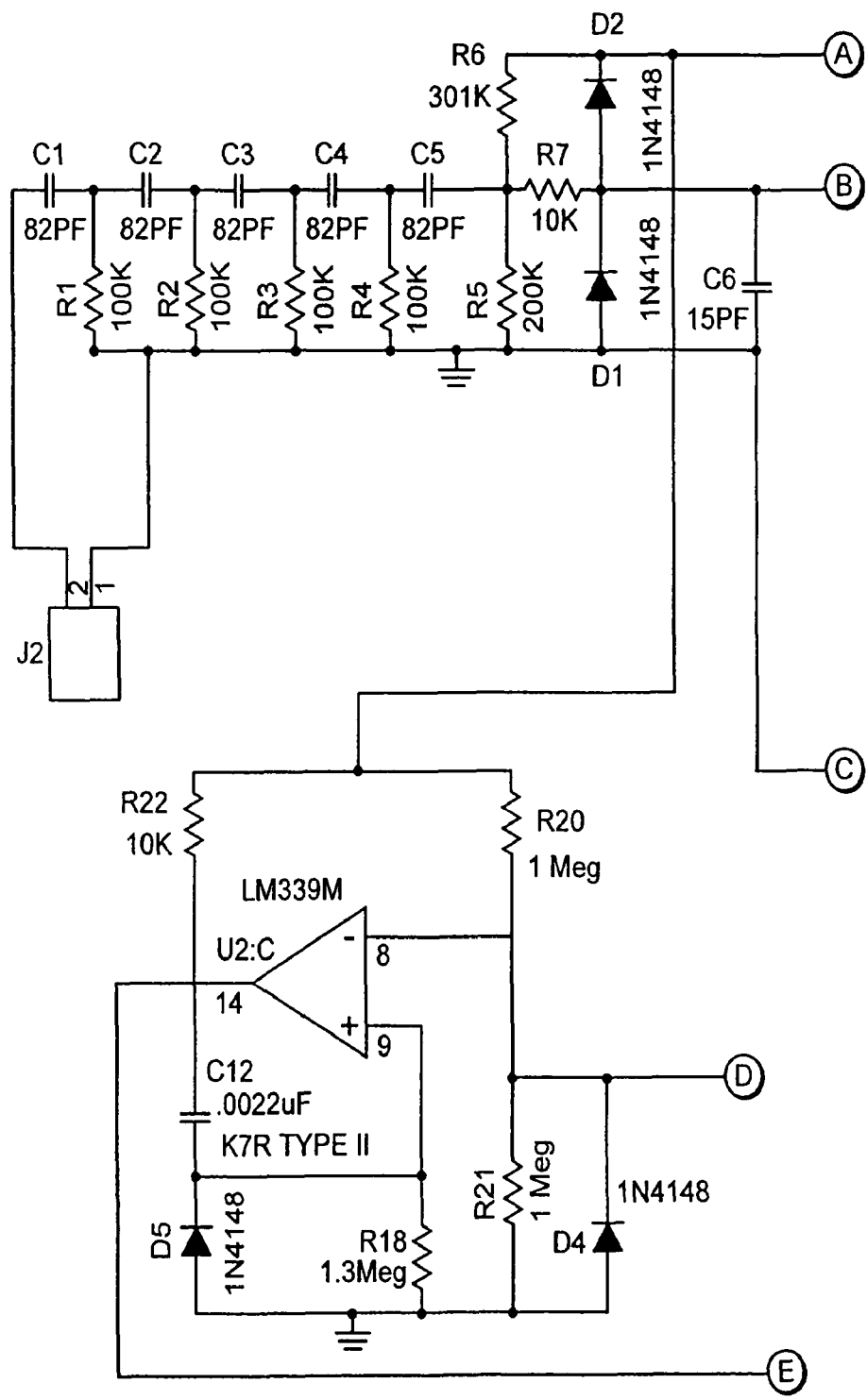
FIG. 6 is a schematic diagram of signal processing circuitry for the debris sensor architecture of FIG. 5.
Figure 6B:
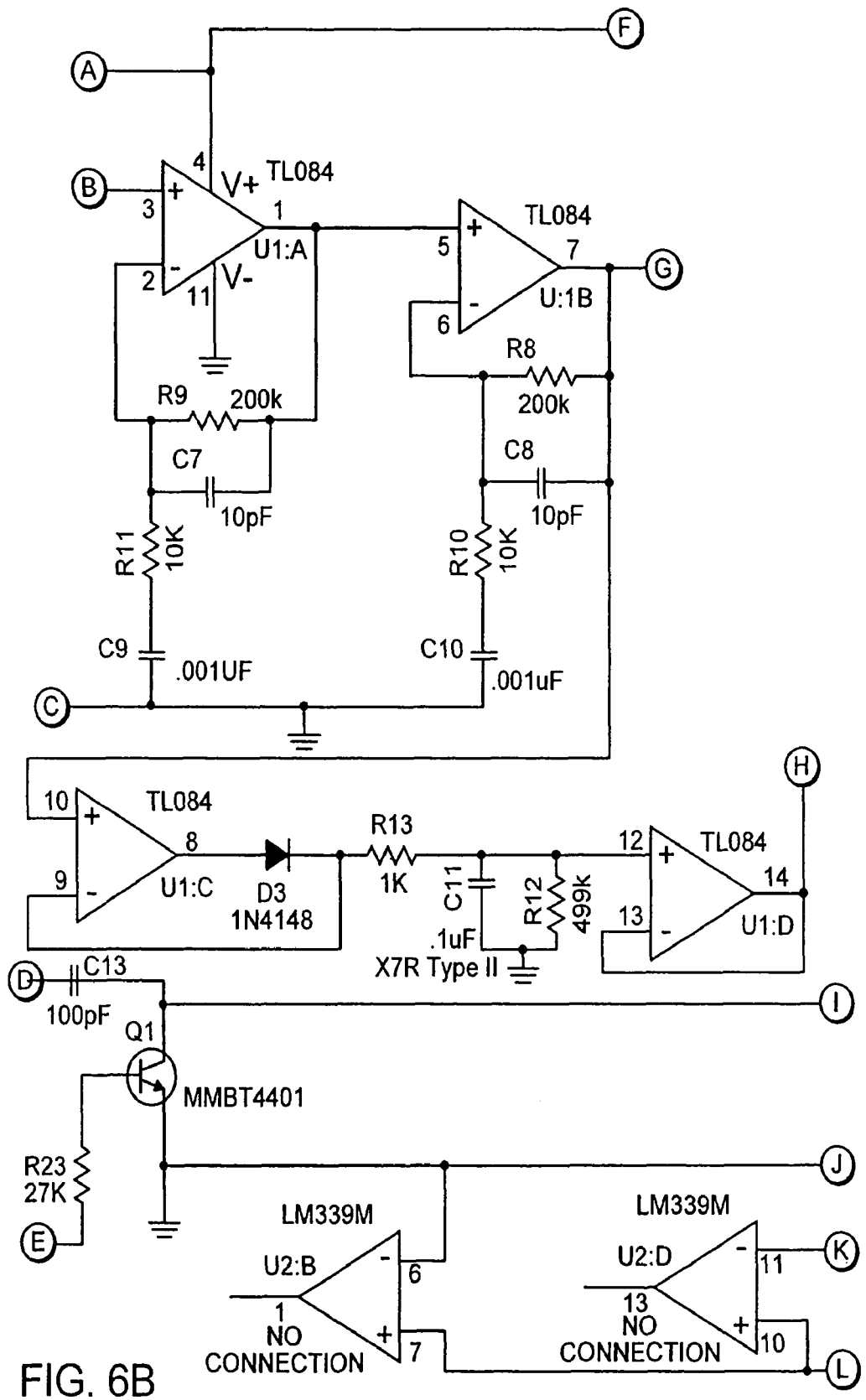
Figure 6C:
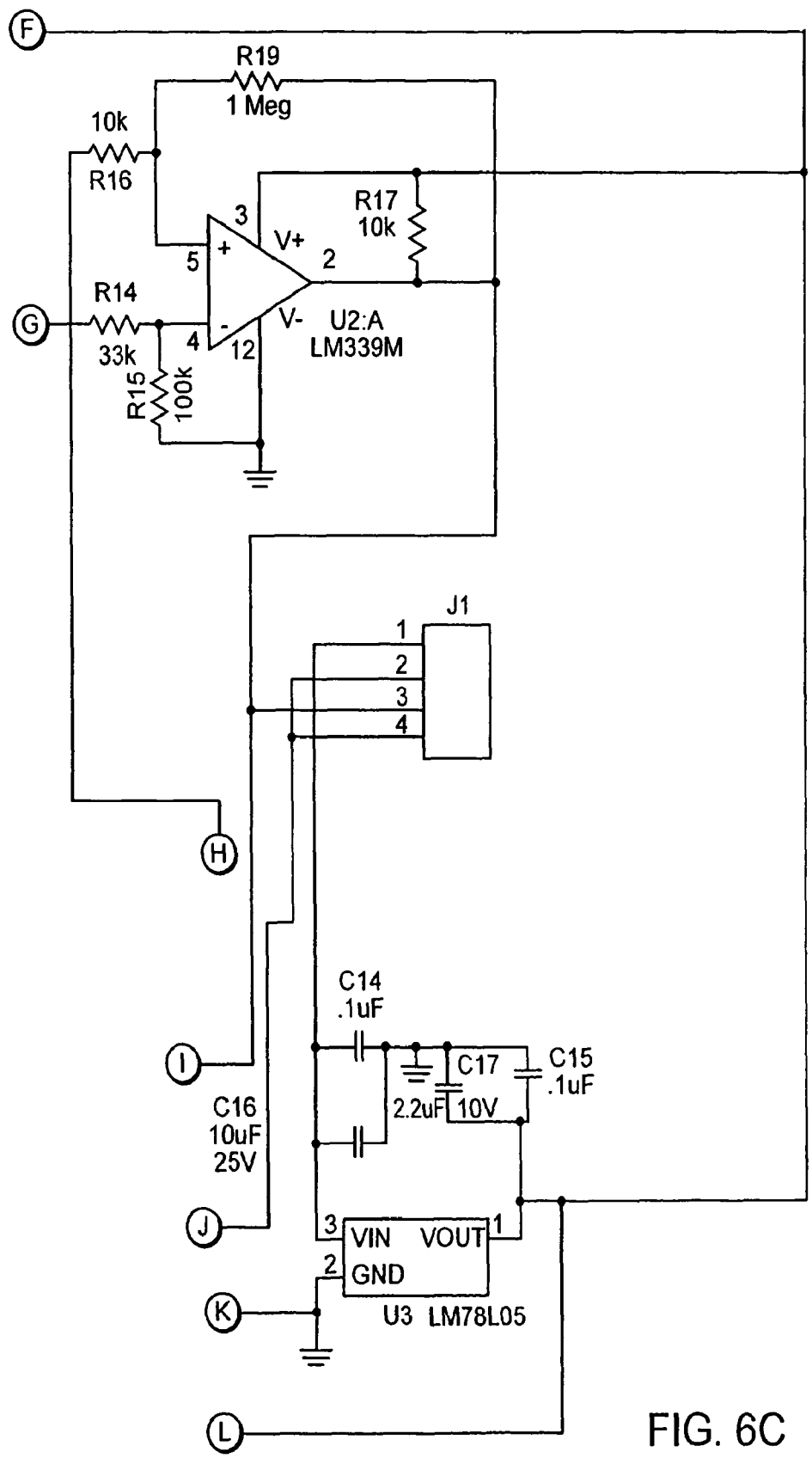

Signal Processing Circuitry:

FIG. 6 is a detailed schematic diagram of exemplary debris sensor circuitry. Those skilled in the art will understand that in other embodiments, the signal processing can be partially or entirely contained and executed within the software of the microcontroller 135. With reference to FIG. 6, the illustrated example of suitable signal processing circuitry contains the following elements, operating in accordance with the following description:

The ground referenced, composite signal from the piezoelectric sensor disk (see piezoelectric disk 402 of FIG. 4) is fed into the capacitor C1, which is the input to the 5-pole, high pass, passive R-C filter designed to attenuate the low frequency, acoustic mechanical vibrations conducted into the sensor through the mounting system. This filter has a 21.5 kHz, −3 dB corner frequency rolling off at −100 dB/Decade. The output of this filter is fed to a signal pole, low pass, passive R-C filter designed to attenuate any very high frequency RFI. This filter has a 1.06 MHz, −3 dB corner frequency rolling off at −20 dB/Decade. The output of this filter is diode clamped by D1 and D2 in order to protect U1 from high voltage transients in the event the sensor element sustains a severe strike that generates a voltage pulse greater than the amplifier's supply rails. The DC biasing required for signal-supply operation for the amplifier chain and subsequent comparator circuitry is created by R5 and R6. These two resistor values are selected such that their thevenin impedance works with C5 to maintain the filter's fifth pole frequency response correctly.

U1A, U1B and their associated components form a two stage, ac-coupled, non-inverting amplifier with a theoretical AC gain of 441. C9 and C10 serve to minimize gain at low frequencies while C7 and C8 work to roll the gain off at RFI frequencies. The net theoretical frequency response from the filter input to the amplifier output is a single pole high pass response with −3 dB at 32.5 kHz, −100 dB/Decade, and a 2-pole low pass response with break frequencies at 100 kHz, −32 dB/Decade, and 5.4 MHz, −100 dB/Decade, together forming a band-pass filter.

The output from the amplifier is split, with one output going into R14, and the other to the non-inverting input of U1C. The signal going into R14 is attenuated by the R14-R15 voltage divider, and then fed into the inverting input of comparator U2A. The other signal branch from the output of U1B is fed into the non-inverting input of amplifier U1C. U1C along with U1D and the components therebetween (as shown in FIG. 2) form a half-wave, positive peak detector. The attack and decay times are set by R13 and R12, respectively. The output from this circuit is fed to the non-inverting input of U2A through R16. R16 along with R19 provide hysteresis to improve switching time and noise immunity. U2A functions to compare the instantaneous value between the output of the peak detector to the output of the R14-R15 attenuator.

Normally, when debris is not striking the sensor, the output of the peak detector will be greater in amplitude than the output of the attenuator network. When debris strikes the sensor, a high frequency pulse is created that has a higher amplitude coming out of the front-end high pass filter going into U1A than the lower frequency mechanical noise signal component. This signal will be larger in amplitude, even after coming out of the R14-R15 attenuator network, than the signal coming out of the peak detector, because the peak detector cannot track high-speed pulses due to the component values in the R13, C11, R12 network. The comparator then changes state from high to low for as long as the amplitude of the debris-strike pulse stays above the dynamic, noise generated, reference-level signal coming out of the peak detector. Since this comparator output pulse can be too short for the system controller to see, a pulse stretcher is used.

The pulse stretcher is a one-shot monostable design with a lockout mechanism to prevent re-triggering until the end of the timeout period. The output from U2A is fed into the junction of C13 and Q1. C13 couples the signal into the monostable formed by U2C and its associated components. Q1 functions as the lockout by holding the output of U2A low until the monostable times out. The timeout period is set by the time constant formed by R22, C12 and R18, and the reference level set by the R20-R21 voltage divider. This time can adjusted for 1 mS, −0.00 mS as dictated by the requirements of the software used by the controller/processor.

Power for the debris sensor circuit is provided by U3 and associated components. U3 is a low power linear regulator that provides a 5-volt output. The unregulated voltage from the robot's onboard battery provides the power input.

When required, circuit adjustments can be set by R14 and R12. These adjustments will allow the circuit response to be tuned in a short period of time In a production device of this kind, it is expected that power into, and signal out of the debris sensor circuit printed circuit board (PCB) will be transferred to the main board via shielded cable. Alternatively, noise filters may be substituted for the use of shielded cable, reducing the cost of wiring. The cable shield drain wire can be grounded at the sensor circuit PCB side only. The shield is not to carry any ground current. A separate conductor inside the cable will carry power ground. To reduce noise, the production sensor PCB should have all components on the topside with solid ground plane on the bottom side. The sensor PCB should be housed in a mounting assembly that has a grounded metal shield that covers the topside of the board to shield the components from radiated noise pick up from the robot's motors. The piezoelectric sensor disk can be mounted under the sensor circuit PCB on a suitable mechanical mounting system, such as that shown in FIG. 4, in order to keep the connecting leads as short as possible for noise immunity.

V. CONCLUSIONS

The invention provides a debris sensor that is not subject to degradation by accretion of debris, but is capable of instantaneously sensing and responding to debris strikes, and thus immediately responsive to debris on a floor or other surface to be cleaned, with reduced sensitivity to variations in airflow, instantaneous power, or other operational conditions of the cleaning device.

When employed as described herein, the invention enables an autonomous cleaning device to control its operation or select from among operational modes, patterns of movement or behaviors responsive to detected debris, for example, by steering the device toward "dirtier" areas based on signals generated by the debris sensor.

The debris sensor can also be employed in non-autonomous cleaning devices to control, select or vary operational modes of either an autonomous or non-autonomous cleaning apparatus.

In addition, the disclosed signal processing architecture and circuitry is particularly useful in conjunction with a piezoelectric debris sensor to provide high signal to noise ratios.

Those skilled in the art will appreciate that a wide range of modifications and variations of the present invention are possible and within the scope of the invention. The debris sensor can also be employed for purposes, and in devices, other than those described herein. Accordingly, the foregoing is presented solely by way of example, and the scope of the invention is limited solely by the appended claims.

We claim:

1. An autonomous cleaning apparatus comprising:
a chassis;
a drive system disposed on the chassis and configured to move the cleaning apparatus over a cleaning surface;
a receptacle disposed on the chassis;
a cleaning head system disposed on the chassis and configured to move debris from the cleaning surface toward the receptacle;
a first and a second debris sensing element, each debris sensing element carried by the chassis and arranged to detect the debris moved toward the receptacle, each debris sensing element being within the chassis and proximate the other debris sensing element; and
a controller in communication with the drive system and the first and second debris sensing elements, the controller configured to steer the drive system immediately in a pattern of movement based at least in part on first and second signals received from the first and second debris sensing elements.

2. The autonomous cleaning apparatus of claim 1 wherein the chassis has a right side and a left side and the first debris sensing element is disposed on the right side of the chassis and the second debris sensing element is disposed on the left side of the chassis.

3. The autonomous cleaning apparatus of claim 2 wherein the controller is further configured to steer the drive system in the direction of the signal received from at least one of the first and second debris sensing elements.

4. The autonomous cleaning apparatus of claim 1 wherein the cleaning head system defines a cleaning width and at least one of the first and second debris sensing elements is sensitive to debris across the entire cleaning width.

5. The autonomous cleaning apparatus of claim 1 further comprising an electronic filter in electrical communication with the first debris sensing element, the electronic filter configured to attenuate at least a portion of the signal received from the first debris sensing element.

6. The autonomous cleaning apparatus of claim 1 wherein the first debris sensing element is spaced apart from the second debris sensing element and the controller is further configured to determine a debris gradient based at least in part on the first and second signals.

7. The autonomous cleaning apparatus of claim 6 wherein the controller is further configured to steer the drive system in the direction of debris based at least in part on the determined debris gradient.

8. The autonomous cleaning apparatus of claim 6 wherein the controller is further configured to adjust continuously the movement of the drive system based at least in part on the determined debris gradient.

9. The autonomous cleaning apparatus of claim 1 wherein the controller is further configured to select a pattern of movement of the drive system based at least in part on the signal received from the at least one of the first and second debris sensing elements.

10. The autonomous cleaning apparatus of claim 9 wherein the pattern of movement of the drive system comprises a spot coverage mode.

11. The autonomous cleaning apparatus of claim 10 wherein the spot coverage mode comprises movement of the drive system in a self-bounded area.

12. The autonomous cleaning apparatus of claim 1 wherein the receptacle is a removable dust cartridge and the cleaning head system comprises a brush arranged to direct debris to the removable dust cartridge.

13. The autonomous cleaning apparatus of claim 1 further comprising a user-perceptible signal in communication with the first and second debris sensing elements, wherein the user-perceptible signal is configured to alert a user to debris encountered by at least one of the first and second debris sensing elements.

14. The autonomous cleaning apparatus of claim 1 wherein each of the first and second debris sensing elements is configured to convert kinetic energy of a debris strike into electrical energy.

15. The autonomous cleaning apparatus of claim 14 wherein each of the first and second debris sensing elements comprises a piezoelectric transducer.

16. The autonomous cleaning apparatus of claim 1 wherein each of the first and second debris sensing elements is configured to generate an electrical pulse in response to being struck with debris.

17. A method of controlling an autonomous cleaning apparatus, the method comprising:
moving the autonomous cleaning apparatus over a cleaning surface;
receiving first and second signals from first and second debris sensing elements carried on the autonomous cleaning apparatus, the signals representative of the presence of debris on a cleaning surface, each of the first and second debris sensing elements being proximate the other; and
steering the autonomous cleaning apparatus immediately in a pattern of movement based at least in part on the received signals.

18. The method of claim 17 further comprising determining a debris gradient based at least in part on at least one of the first and second signals, wherein steering the autonomous cleaning apparatus immediately in a pattern of movement comprises steering the autonomous cleaning apparatus in the direction of the determined debris gradient.

19. The method of claim 18 further comprising continuously adjusting movement of the autonomous cleaning apparatus based at least in part on the determined debris gradient.

20. The method of claim 17 further comprising selecting a pattern of movement of the autonomous cleaning apparatus based at least in part on the received signals.

21. The method of claim 20 wherein selecting a pattern of movement of the autonomous cleaning apparatus comprises selecting a spot coverage mode.

* * * * *